United States Patent
Kawakami et al.

(10) Patent No.: US 6,949,312 B1
(45) Date of Patent: Sep. 27, 2005

(54) ELECTRODE MATERIAL FOR ANODE OF RECHARGEABLE LITHIUM BATTERY, ELECTRODE STRUCTURAL BODY USING SAID ELECTRODE MATERIAL, RECHARGEABLE LITHIUM BATTERY USING SAID ELECTRODE STRUCTURAL BODY, PROCESS FOR PRODUCING SAID ELECTRODE STRUCTURAL BODY, AND PROCESS FOR PRODUCING SAID RECHARGEABLE LITHIUM BATTERY

(75) Inventors: Soichiro Kawakami, Nara (JP); Masaya Asao, Kyotanabe (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,794

(22) PCT Filed: Sep. 17, 1999

(86) PCT No.: PCT/JP99/05092

§ 371 (c)(1),
(2), (4) Date: Aug. 14, 2000

(87) PCT Pub. No.: WO00/17948

PCT Pub. Date: Mar. 30, 2000

(30) Foreign Application Priority Data

| Sep. 18, 1998 | (JP) | 10-282087 |
| Feb. 26, 1999 | (JP) | 11-050471 |
| Sep. 16, 1999 | (JP) | 11-261516 |

(51) Int. Cl.$^7$ .............................................. H01M 4/58
(52) U.S. Cl. ................... 429/218.1; 429/219; 429/220; 429/221; 429/223; 429/224; 429/225; 429/226; 429/231.1; 429/231.7; 429/233
(58) Field of Search ............................ 429/218.1, 219, 429/220, 221, 223, 224, 225, 226, 231.1, 231.7, 233

(56) References Cited

U.S. PATENT DOCUMENTS

| 4,163,829 A | 8/1979 | Kronenberg ................ 429/194 |
| 4,537,674 A | * 8/1985 | Ovshinsky et al. .... 204/290.01 |

(Continued)

FOREIGN PATENT DOCUMENTS

| EP | 0 651 450 A1 | 5/1995 |
| EP | 0 823 741 | * 2/1998 |

(Continued)

OTHER PUBLICATIONS

J. O. Besenhard, et al., "Will Advanced Li–Alloy Anodes Have a Chance in Lithium–Ion Batteries?", Extended Abstracts, 8$^{th}$ International Meeting on Lithium Batteries, Nagoya, Japan, Jun. 16–21, 1996, pp. 69–72.
Birchon, D.: "Dictionary of Metallurgy", 1965, London XP002279165, pp. 8–9.

*Primary Examiner*—Laura Weiner
(74) *Attorney, Agent, or Firm*—Fitzpatrick, Cella, Harper & Scinto

(57) ABSTRACT

An electrode material for an anode of a rechargeable lithium battery, containing a particulate comprising an amorphous Sn.A.X alloy with a substantially non-stoichiometric ratio composition. For said formula Sn.A.X, A indicates at least one kind of an element selected from a group consisting of transition metal elements, X indicates at least one kind of an element selected from a group consisting of O, F, N, Mg, Ba, Sr, Ca, La, Ce, Si, Ge, C, P, B, Pb, Bi, Sb, Al, Ga, In, Tl, Zn, Be, Pr, Nd, Sm, Eu, Gd, Tb, Dy, Ho, Er, Tm, Yb, Lu, As, Se, Te, Li and S, where the element X is not always necessary to be contained. The content of the constituent element Sn of the amorphous Sn.A.X alloy is Sn/(Sn+A+X)=20 to 80 atomic %. An electrode structural body for a rechargeable lithium battery, comprising said electrode material for an anode and a collector comprising a material incapable of being alloyed with lithium in electrochemical reaction, and a rechargeable lithium battery having an anode comprising said electrode structural body.

63 Claims, 40 Drawing Sheets

U.S. PATENT DOCUMENTS

| | | | |
|---|---|---|---|
| 5,039,582 A | 8/1991 | Pistoia | 429/218 |
| 5,283,136 A * | 2/1994 | Peled et al. | 429/306 |
| 5,547,484 A | 8/1996 | Vianco et al. | 65/42 |
| 5,641,591 A | 6/1997 | Kawakami et al. | 429/218 |
| 5,702,845 A | 12/1997 | Kawakami et al. | 429/224 |
| 5,780,181 A * | 7/1998 | Idota et al. | 429/221 |
| 5,824,434 A | 10/1998 | Kawakami et al. | 429/209 |
| 5,919,589 A | 7/1999 | Kawakami et al. | 429/231.8 |
| 5,998,063 A | 12/1999 | Kobayashi et al. | 429/218.1 |
| 6,007,945 A * | 12/1999 | Jacobs et al. | 429/218.1 |
| 6,203,944 B1 * | 3/2001 | Turner et al. | 429/231.95 |
| 6,242,132 B1 * | 6/2001 | Neudecker et al. | 429/218.1 |

FOREIGN PATENT DOCUMENTS

| | | | |
|---|---|---|---|
| JP | 54-078434 | | 6/1979 |
| JP | 62-015761 | | 1/1987 |
| JP | 62-093866 | | 4/1987 |
| JP | 62-113366 | | 5/1987 |
| JP | 63-013264 | | 1/1988 |
| JP | 63-013267 | | 1/1988 |
| JP | 63-114057 | | 5/1988 |
| JP | 63-223101 | | 9/1988 |
| JP | 02-012768 | | 1/1990 |
| JP | 3-062464 | | 3/1991 |
| JP | 05-047381 | | 2/1993 |
| JP | 5-190171 | | 7/1993 |
| JP | 05-234585 | | 9/1993 |
| JP | 7-249409 | | 9/1995 |
| JP | 08-064239 | | 3/1996 |
| JP | 8-115745 | * | 5/1996 |
| JP | 8-315858 | | 11/1996 |
| JP | 10-223221 | | 8/1998 |
| JP | 11-45712 | | 2/1999 |

* cited by examiner

Example 8 (after the treatment)

charging-and-discharging cycle life at 1C

ELECTRODE MATERIAL FOR ANODE OF RECHARGEABLE LITHIUM BATTERY, ELECTRODE STRUCTURAL BODY USING SAID ELECTRODE MATERIAL, RECHARGEABLE LITHIUM BATTERY USING SAID ELECTRODE STRUCTURAL BODY, PROCESS FOR PRODUCING SAID ELECTRODE STRUCTURAL BODY, AND PROCESS FOR PRODUCING SAID RECHARGEABLE LITHIUM BATTERY

BACKGROUND OF THE INVENTION

1. Field of the Invention

The present invention relates to an electrode material for an anode of a rechargeable lithium battery in which oxidation-reduction reaction of lithium is used (this battery will be hereinafter referred to as rechargeable lithium battery for simplification purpose), an electrode structural body using said electrode material, a rechargeable lithium battery having an anode comprising said electrode structural body, a process for producing said electrode structural body, and a process for producing said rechargeable lithium battery. More particularly, the present invention relates to an electrode structural body for a rechargeable lithium battery, which is constituted by an electrode material comprising a specific amorphous alloy and which provides a high capacity and a prolonged cycle life for said battery and to a rechargeable lithium battery having an anode comprising said electrode structural body. The present invention includes a process for producing said electrode structural body and a process for producing said rechargeable lithium battery.

2. Prior Art

In recent years, the global warming of the earth because of the so-called greenhouse effect to an increase in the content of $CO_2$ gas in the air has been predicted. For instance, in thermal electric power plants, thermal energy obtained by burning a fossil fuel is being converted into electric energy, and along with burning of such fossil fuel, a large amount of $CO_2$ gas is being exhausted in the air. Accordingly, in order to suppress this situation, there is a tendency of prohibiting to newly establish a thermal electric power plant. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust any air polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, word processors, video cameras, and cellular phones.

As such miniature, lightweight and high performance rechargeable battery, there has proposed various rocking chair type lithium ion batteries in which a carbonous material such as graphite capable of intercalating lithium ion at intercalation sites of its six-membered network plane provided by carbon atoms in the battery reaction upon charging is used as an anode material and a lithium intercalation compound capable of deintercalating said lithium ion from the intercalation in the battery reaction upon charging is used as a cathode material. Some of these lithium ion batteries have been practically used. However, for any of these lithium ion batteries whose anode comprising the carbonous material (the graphite), the theoretical amount of lithium which can be intercalated by the anode is only an amount of ⅙ per carbon atom. Because of this, in such lithium ion battery, when the amount of lithium intercalated by the anode comprising the carbonous material (the graphite) is made greater than the theoretical amount upon performing charging operation or when charging operation is performed under condition of high electric current density, there will be an unavoidable problem such that lithium is deposited in a dendritic state (that is, in the form of a dendrite) on the surface of the anode. This will result in causing internal-shorts between the anode and the cathode upon repeating the charging and discharging cycle. Therefore, it is difficult for the lithium ion battery whose anode comprising the carbonous material (the graphite) to achieve a sufficient charging and discharging cycle life. In addition, using this battery design, it is extremely difficult to attain a desirable rechargeable battery having a high energy density comparable to that of a primary lithium battery in which a metallic lithium is used as the anode active material.

Now, rechargeable lithium batteries in which a metallic lithium is used as the anode have been proposed and they have attracted public attention in a viewpoint that they exhibit a high energy density. However, such rechargeable battery is not practicalloy usable one because its charging and discharging cycle life is extremely short. A main reason why the charging and discharging cycle life is extremely short has been generalloy considered as will be described in the following. The metallic lithium as the anode reacts with impurities such as moisture or an organic solvent contained in an electrolyte solution to form an insulating film or/and the metallic lithium as the anode has an irregular surface with portions to which electric field is converged, and these factors lead to generating a dendrite of lithium upon repeating the charging and discharging cycle, resulting in internal-shorts between the anode and cathode. As a result, the charging and discharging cycle life of the rechargeable battery is extremely shortened.

When the lithium dendrite is grown to make the anode and cathode such that the anode is internally shorted with the cathode as above described, the energy possessed by the battery is rapidly consumed at the internally shorted portion. This situation often creates problems in that the battery is heated or the solvent of the electrolyte is decomposed by virtue of heat to generate gas, resulting in an increase in the inner pressure of the battery. Thus, the growth of the lithium dendrite tends to cause internal-shorts between the anode and the cathode whereby occurring such problems as above described, where the battery is damaged or/and the lifetime of the battery is shortened.

In order to eliminate the above problems for such rechargeable battery in which the metallic lithium is used as the anode, specifically, in order to suppress the progress of the reaction between the metallic lithium of the anode and the moisture or the organic solvent contained in the electrolyte solution, there has been proposed a method of using a lithium alloy such as a lithium-aluminum alloy as the anode. However, this method is not widely applicable in practice for the following reasons. The lithium alloy is hard and is difficult to wind into a spiral form and therefore, it is difficult to produce a spiral-wound cylindrical rechargeable battery. Accordingly, it is difficult to attain a rechargeable battery having a sufficiently long charging and discharging cycle life. It is also difficult to attain a rechargeable battery having a desirable energy density similar to that of a primary battery in which a metallic lithium is used as the anode.

Japanese Unexamined Patent Publications Nos. 64239/1996, 62464/1991, 12768/1990, 113366/1987, 15761/1987, 93866/1987, and 78434/1979 disclose various metals, i.e., Al, Cd, In, Sn, Sb, Pb, and Bi which are capable of forming an alloy with lithium in a rechargeable battery when the battery is subjected to charging, and rechargeable batteries in which these metals, alloys of these metals, or alloys of these metals with lithium are used as the anodes. However, the above-mentioned publications do not detail about the configurations of the anodes.

By the way, when any of the foregoing alloy materials is fabricated into a plate-like form such as a foil form which is generally adopted as an electrode of a rechargeable battery and it is used as an anode of a rechargeable battery in which lithium is used as the anode active material, the specific surface area of a portion in the anode's electrode material layer contributing to the battery reaction is relatively small and therefore, the charging and discharging cycle is difficult to be effectively repeated with a large electric current.

Further, for a rechargeable battery in which any of the foregoing alloy materials is used the anode, there are such problems as will be described in the following. The anode is expanded with respect to the volume because of alloying with lithium upon charging and shrunk upon discharging, where the anode suffers from repetitive variations with respect the volume. Because of this, the anode has a tendency that it is eventually distorted and cracked. In the case where the anode becomes to be in such state, when the charging and discharging cycle is repeated over a long period of time, in the worst case, the anode is converted into a pulverized state to have an increased impedance, resulting in shortening the charging and discharging cycle life. Hence, none of the rechargeable batteries disclosed in the above-mentioned Japanese publications has been put to practical use.

In Extended Abstracts WED-2 (pages 69–72) of 8th INTERNATIONAL MEETING ON LITHIUM BATTERIES (hereinafter referred to as document), there is described that by electrochemically depositing a Sn or a Sn-alloy on a copper wire having a diameter of 0.07 mm as a collector, an electrode having a deposited layer comprising a grained tin material with a small particle size of 200 to 400 nm can be formed, and a cell in which the electrode having such deposited layer with a thin thickness of about 3 $\mu$m and a counter electrode comprising a lithium metal are used has an improved charging and discharging cycle life. The above document also describes that in the evaluation wherein a cycle of operating charging up to 1.7 Li/Sn (one atom of Sn is alloyed with 1.7 atoms of Li) at a current density of 0.25 mA/cm$^2$ and operating discharging up to 0.9 V vs Li/Li$^+$ is repeated, an electrode comprising a fine-grained Sn material with a particle size of 200 to 400 nm, an electrode comprising a $Sn_{0.91}Ag_{0.09}$ alloy and an electrode comprising a $Sn_{0.72}Sb_{0.28}$ alloy were greater than an electrode comprising a coase-grained Sn alloy material with a particle size of 2000 to 4000 nm deposited on a collector comprising a copper wire having a diameter of 1.0 mm obtained in the same manner as in the above, in terms of the charging and discharging cycle life, respectively by about 4 times, about 9 times, and about 11 times. However, the evaluated results described in the above document are of the case where the lithium metal was used as the counter electrode and therefore, they are not evaluated results obtained in practical battery configurations. In addition, the foregoing electrodes are those prepared by depositing such grained material as above described on the collector comprising a copper wire having a diameter of 0.07 and therefore, any of them is not of a practically usable electrode form. Further in addition, according to the description of the above-mentioned document, in the case where a Sn alloy is deposited on a large area having a diameter of 1.0 mm for example, it is understood that there is afforded an electrode having a layer comprising a coarse-grained tin alloy material with a particle size of 2000 to 4000 nm. However, for this electrode, the lifetime as a battery will be extremely shortened.

Japanese Unexamined Patent Publications Nos. 190171/1993, 47381/1993, 114057/1988, and 13264/1988 disclose rechargeable lithium batteries in which various lithium alloys are used as the anodes. In these publications, there are described that these rechargeable lithium batteries prevent deposition of lithium dendrite and have an improved charging efficiency and an improved charging and discharging cycle life. Japanese Unexamined Patent Publication No. 234585/1993 discloses a rechargeable lithium battery having an anode comprising a metal powder, which is difficult to form an intermetallic compound with lithium, is uniformly bonded on the surface of a lithium metal. In this publication, it is described that this rechargeable lithium battery prevents deposition of lithium dendrite and has an improved charging efficiency and an improved charging and discharging cycle life.

However, any of the anodes described in the above-mentioned publications is not decisive one which can markedly prolong the charging and discharging cycle life of the rechargeable lithium battery.

Japanese Unexamined Patent Publication No. 13267/1988 discloses a rechargeable lithium battery in which a lithium alloy obtained by electrochemically alloying an amorphous metal comprising a plate-like aluminum alloy as a main example with lithium is used as the anode. This publication describes that this rechargeable lithium battery excels in charge-discharge characteristics. However, according to the technique described in this publication, it is difficult to realize a practically usable rechargeable lithium battery having a high capacity and a charging and discharging cycle life which falls in a practically usable region.

Japanese Unexamined Patent Publication No. 223221/1998 discloses a rechargeable lithium battery in which a low crystalline or amorphous intermetallic compound of an element selected from a group consisting of Al, Ge, Pb, Si, Sn, and Zn is used as the anode. This publication describes that this rechargeable lithium battery has a high capacity and excels in cycle characteristics. However, it is extremely difficult to industrially produce such low crystalline or amorphous intermetallic compound in practice. According to the technique described in this publication, it is difficult to realize a practically usable rechargeable lithium battery having a high capacity and a prolonged charging and discharging cycle life.

As above described, for the conventional rechargeable lithium batteries in which oxidation-reduction reaction of lithium is used, enlargement of their energy density and prolongation of their charging and discharging cycle life are massive subjects to be solved.

SUMMARY OF THE INVENTION

The present invention has been accomplished in view of the foregoing situation in the prior art for rechargeable lithium batteries.

An object of the present invention is to provide an electrode material for an anode which comprises an amorphous alloy, has excellent characteristics, and is suitable as a constituent of an anode of a rechargeable lithium battery (that is, a rechargeable battery in which oxidation-reduction reaction of lithium is used).

Another object of the present invention is to provide an electrode structural body constituted by said electrode material and which has a high capacity and a prolonged cycle life and is usable as an anode of a rechargeable lithium battery.

A further object of the present invention is to provide a rechargeable lithium battery having an anode comprising said electrode structural body and which has a prolonged charging and discharging cycle life and a high energy density.

A further object of the present invention is to provide a process for producing said electrode structural body and said rechargeable lithium battery.

The electrode material for an anode of a rechargeable lithium battery (the electrode material for an anode) provided according to the present invention is specifically characterized in that it contains a particulate comprising an amorphous Sn.A.X alloy with a substantially non-stoichiometric ratio composition. For the formula Sn.A.X, A indicates at least one kind of an element selected from a group consisting of transition metal elements, X indicates at least one kind of an element selected from a group consisting of O, F, N, Mg, Ba, Sr, Ca, La, Ce, Si, Ge, C, P, B, Bi, Sb, Al, In, and Zn, where the element X is not always necessary to be contained. The content of the constituent element Sn of the amorphous Sn.A.X alloy is Sn/(Sn+A+X)=20 to 80 atomic % in terms of the number of atoms of each element (atom) of the entire constituent elements Sn, A and X. The electrode material has excellent characteristics and it is extremely suitable as a constituent (that is, an anode active material) of an anode of a rechargeable lithium battery.

The electrode structural body for an anode of a rechargeable lithium battery provided according to the present invention is specifically characterized in that it comprises an electrode material for an anode, containing a particulate comprising aforesaid amorphous Sn.A.X alloy. The electrode structural body has a high capacity and a prolonged cycle life and it is extremely suitable for use as an anode of a rechargeable lithium battery. Particularly, in the case of using this electrode structural body as an anode of a rechargeable lithium battery, the problems of the anode in the conventional rechargeable lithium battery in that when the charging and discharging cycle is repeated over a long period of time, the anode is expanded to deteriorate its current connecting performance, and therefore, it is difficult for the charging and discharging cycle life to be prolonged as desired are desirably solved.

The rechargeable lithium battery provided according to the present invention is specifically a rechargeable lithium battery comprising at least an anode, a cathode and an electrolyte and in which oxidation-reduction reaction is used, characterized in that said anode comprises aforesaid electrode structural body for an anode. The rechargeable lithium battery has a prolonged charging and discharging cycle life and provides a gently-sloping discharge curve, and it has a high capacity and a high energy density.

DESCRIPTION OF THE INVENTION AND PREFERRED EMBODIMENTS

Figure 1A:
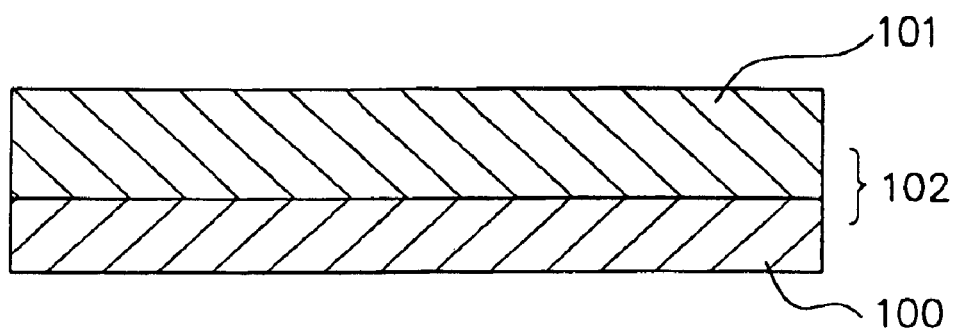
FIG. 1 shows schematic cross-sectional views respectively illustrating the structure of an example of an electrode structural body according to the present invention.

In order to solve the foregoing subjects in the prior art for rechargeable lithium batteries in which oxidation-reduction reaction of lithium in terms of electrochemical reaction is used, the present inventors made extensive studies while focusing on constituent materials of their anodes. Particularly, there were provided a variety of alloy materials which have never been used as the anode of a rechargeable battery and which could be used as the anode, and extensive studies were made of these alloy materials through various experiments. As a result, there were obtained findings as will be described in the following. For a rechargeable lithium battery in which oxidation-reduction reaction of lithium in terms of electrochemical reaction is used, in the case where an electrode structural body constituted by a material (that is, an electrode material) containing a particulate comprising an amorphous Sn.A.X alloy with a substantially non-stoichiometric ratio composition which is capable of being alloyed with lithium in the electrochemical reaction at least upon charging is used as the anode, there can be attained a rechargeable lithium battery which has a very high capacity and a markedly prolonged charging and discharging cycle life which could not be achieved in the prior art. The present invention is based on this finding.

For the above formula Sn.A.X, A indicates at least one kind of an element selected from a group consisting of transition metal elements, X indicates at least one kind of an element selected from a group consisting of O, F, N, Mg, Ba, Sr, Ca, La, Ce, Si, Ge, C, P, B. Bi, Sb, Al. In, and Zn, where the element X is not always necessary to be contained. The content of the constituent element Sn of the amorphous Sn.A.X alloy is Sn/(Sn+A+X) 20 to 80 atomic % in terms of the number of atoms of each element (atom) of the entire constituent elements Sn, A and X.

The above "amorphous alloy with a substantially non-stoichiometric ratio composition" in the present invention means an amorphous alloy in which more than two kinds of metal elements are not bonded at a simple integral ratio. That is, the "amorphous alloy with a substantially non-stoichiometric ratio composition" in the present invention is distinguished from an intermetallic compound in which more than two kinds of metal elements are bonded at a simple integral ratio. More concretely, the element composition of the "amorphous alloy" in the present invention is distinguished from that of any of known intermetallic compounds (which have a regular atomic arrangement and a crystalline structure which is quite different from that of each constituent metal), namely, it is distinguished from the composition (the stoichiometric composition) expressed by a prescribed structural formula in which more than two kinds of metal elements are bonded at a simple integral ratio. It should be noted to the fact that those compounds in which more than two kinds of metal elements are bonded at a simple integral ratio and which have a regular atomic arrangement and a crystalline structure which is quite different from that of each constituent metal are known as intermetallic compounds.

The "amorphous alloy with a substantially non-stoichiometric ratio composition" in the present invention is distinguished from such intermetallic compound.

For instance, as for Sn—Co alloy, it is widely known that $Sn_2Co_3$, SnCo, and $Sn_2Co$ which have a composition ratio in which the atomic ratio of Sn and Co is a simple integral ratio are intermetallic compounds.

However, as will be shown in examples which will be later described, the composition ratio of a Sn—Co alloy with the non-stoichiometric ratio composition in the present invention is deviated from that of said intermetallic compound and therefore, the former is clearly distinguished from the latter. In this way, the "amorphous alloy" in the present invention is of the composition which is quite different from the stoichiometric composition. In view of this, the "amorphous alloy" in the present invention is identified by the term "amorphous allow with a non-stoichiometric ratio composition".

As previously described, the present invention provides an electrode material containing a particulate comprising an amorphous Sn.A.X alloy with a substantially non-stoichiometric ratio composition. The electrode material has excellent characteristics and it is extremely suitable as a constituent (that is, an anode active material) of an anode of a rechargeable lithium battery. This electrode material will be hereinafter referred to as "electrode material for an anode".

The "particulate comprising an amorphous Sn.A.X alloy" in the present invention includes the following embodiments.

(1) A Sn.A.X alloy particulate having an amorphous phase only.

(2) A Sn.A.X alloy particulate having principalloy an amorphous phase and also a crystalline phase.

(3) A Sn.A.X alloy particulate which is nanocrystalline and has a crystallite size of less than 100 Å=10 nanometers.

(4) Any of the Sn.A.X alloy particulates (1) to (3) coated by a non-metallic material such as a carbon material or an organic polymer resin material.

The present invention also provides an electrode structural body comprising the above-described electrode material for an anode of a rechargeable lithium battery. Specifically, the electrode structural body of the present invention comprises the above-described electrode material and a collector comprising a material which is not alloyed with lithium in the electrochemical reaction. The electrode structural body has a high capacity and a prolonged cycle life, and it is extremely suitable for use as an anode of a rechargeable lithium battery. Particularly, in the case of using this electrode structural body as an anode of a rechargeable lithium battery, the problems of the anode in the conventional rechargeable lithium battery in that when the charging and discharging cycle is repeated over a long period of time, the anode is expanded to deteriorate its current collecting performance and therefore, it is difficult for the charging and discharging cycle life to be prolonged as desired are desirably solved.

The present invention further provides a rechargeable lithium battery in which the above-described electrode structural body is used. Specifically, the present invention provides a rechargeable lithium battery comprising at least an anode, a cathode and an electrolyte and in which oxidation-reduction reaction of lithium is used, characterized in that said anode comprises the above-described electrode structural body, and said cathode comprises a material capable of intercalating lithium ion. The rechargeable lithium battery provided according to the present invention has a prolonged charging and discharging cycle life and provides a gently-sloping discharge curve, and it has a high capacity and a high energy density.

In the following, description in more detail will be made of the present invention.

As previously described, the electrode material for anode contains a particulate substantialloy comprising the foregoing amorphous Sn.A.X alloy. The element A as a constituent of the amorphous Sn.A.X alloy comprises at least one kind of an element selected from a group consisting of transition metal elements. The element X as a constituent of the amorphous Sn.A.X alloy comprises at least one kind of an element selected from a group consisting of O, F, N, Mg, Ba, Sr, Ca, La, Ce, Si, Ge, C, P, B, Bi, Sb, Al, In, and Zn.

The transition metal element as the constituent element A preferably comprises at least one kind of an element selected from a group consisting of Cr, Mn, Fe, Co, Ni, Cu, Mo, Tc, Ru, Rh, Pd, Ag, Ir, Pt, Au, Ti, V, Y, Sc, Zr, Nb, Hf, Ta, and W.

The amorphous Sn.A.X alloy in the present invention is desired to have a peak appeared in a range of $2\theta=20°$ to $50°$ in X-ray diffraction using K$\alpha$-rays of Cu as a radiation source, having a half width of preferably more than $0.2°$, more preferably more than $0.5°$, most preferably more than $1.0°$.

In a preferred embodiment, the amorphous Sn.A.X alloy in the present invention is desired to have a peak appeared in a range of $2\theta=40°$ to $50°$ in X-ray diffraction using K$\alpha$-rays of Cu as a radiation source, having a half width of preferably more than $0.5°$, more preferably more than $1.0°$.

The particulate comprising the amorphous Sn.A.X alloy in the present invention is desired to be of a crystallite size calculated from X-ray diffraction analysis, which is preferably less than 500 Å, more preferably less than 200 Å, most preferably less than 100 Å.

Further, the particulate comprising the amorphous Sn.A.X alloy in the present invention is desired to be of an average particle size which is preferably in a range of from 0.5 $\mu$m to 20 $\mu$m more preferably in a range of from 1 $\mu$m to 10 $\mu$m.

In addition, the particulate comprising the amorphous Sn.A.X alloy in the present invention is desired to be of a specific surface area which is preferably more than 1 m$^2$/g, more preferably more than 5 m$^2$/g.

Further in addition, the particulate comprising the amorphous Sn.A.X alloy in the present invention is desired to contain at least 30% by weight or more.

The electrode material for anode containing the particulate comprising the amorphous Sn.A.X alloy in the present invention is desired to contain the particulate in a range of from 80% by weight to 100% by weight.

The electrode material for anode containing the particulate comprising the amorphous Sn.A.X alloy in the present invention may contain a binder comprising a water-soluble or water-insoluble resin (organic polymer). In this case, the amount of the binder contained is desired to be in a range of from 1% by weight to 10% by weight.

The particulate comprising the amorphous Sn.A.X alloy in the present invention may contain oxygen element or/and fluorine element as a small amount element even in the case where it contains neither oxygen element nor fluorine element as the element X. In this case, the amount of the oxygen element is preferably in a range of from 0.05% by weight to 5% by weight, more preferably in a range of from 0.1% by weight to 3% by weight. The amount of the fluorine element is preferably less than 5% by weight, more preferably less than 3% by weight.

The amorphous Sn.A.X alloy of the present invention is preferred to contain carbon element.

Specifically, the amorphous Sn.A.X alloy of the present invention may be, for example, of such element constitutions as will be described below.

(1) The amorphous Sn.A.X alloy of the present invention contains, other than Sn element, at least one kind of an element selected from three groups, i.e., a group (a) consisting of Pb, Bi, Al, Ga, In, Tl, Zn, Be, Mg, Ca, and Sr; a group (b) consisting of rare earth elements; and a group (c) consisting of metalloide elements. In this case, the group (b) consisting of rare earth elements is desired to consist of La, Ce, Pr, Nd, Sm, Eu, Gd, Tb, Dy, Ho, Er, Tm, Yb, and Lu. The group (c) consisting of metalloide elements is desired to consist of B, C, Si, P, Ge, As, Se, Sb, and Te.

(2) The amorphous Sn.A.X alloy of the present invention contains, other than Sn element, at least two kinds of elements selected from the foregoing group (a), group (b) and group (c).

(3) The amorphous Sn.A.X alloy of the present invention contains, other than Sn element, at least three kinds of elements selected from the foregoing group (a), group (b) and group (c).

(4) The amorphous Sn.A.X alloy of the present invention contains, other than Sn element, at least one kind of an element selected from the foregoing group (a) and at least one kind of an element selected from the foregoing group (b).

(5) The amorphous Sn.A.X alloy of the present invention contains, other than Sn element, at least one kind of an element selected from the foregoing group (a) and at least one kind of an element selected from the foregoing group (c).

(6) The amorphous Sn.A.X alloy of the present invention contains, other than Sn element, at least one kind of an element selected from the foregoing group (b) and at least one kind of an element selected from the foregoing group (c).

(7) The amorphous Sn.A.X alloy of the present invention contains, other than Sn element, one kind of an element selected from the foregoing group (a), one kind of an element selected from the foregoing group (b), and one kind of an element selected from the foregoing group (c).

(8) The amorphous Sn.A.X alloy of the present invention contains other than Sn element, one kind of an element selected from a group consisting of Si, Ge, Al, Zn, Ca, La, and Mg, and one kind of an element selected from a group consisting of Co, Ni, Fe, Cr, and Cu.

(9) The amorphous Sn.A.X alloy of the present invention contains, other than Sn element, one kind of an element selected from a group consisting of Si, Ge, Al, Zn, Ca, La, and Mg, one kind of an element selected from a group consisting of Co, Ni, Fe, Cr, and Cu, and one kind of an element selected from a group consisting of C, B, and P.

For the amorphous Sn.A.X alloy of the present invention, when two or more kinds of elements are used and they are different from each other also in terms of atomic size, amorphization is readily occurred. For instance, in the case where two kinds of elements are used and they are different from each other also in terms of atomic size, it is desired for their atomic sizes to be different preferably by more than 10% or more preferably by more than 12%. Further, in the case where three kinds of elements are used and they are different from each other also in terms of atomic size, packing density is increased and the atoms involved are prevented from being readily diffused to provide a more stable amorphous state, where amorphization is more readily occurred.

Specific preferable examples of the amorphous Sn.A.X alloy of the present invention are those as will be illustrated below.

(1) Specific preferable examples of the amorphous alloy with a composition comprising Sn element and the foregoing element A which comprises at least one kind of a transition metal element selected from a group consisting of Co, Ni, Fe, Cu, Mo, Cr, Ag, Zr, Ti, Nb, Y, and Mn are: Sn—Co amorphous alloy, Sn—Ni amorphous alloy, Sn—Fe amorphous alloy, Sn—Cu amorphous alloy, Sn—Mo amorphous alloy, Sn—Cr amorphous alloy, Sn—Ag amorphous alloy, Sn—Zr amorphous alloy, Sn—Ti amorphous alloy, Sn—Nb amorphous alloy, Sn—Y amorphous alloy, Sn—Co—Ni amorphous alloy, Sn—Co—Cu amorphous alloy, Sn—Co—Fe amorphous alloy, Sn—Co—Ag amorphous alloy, Sn—Co—Mo amorphous alloy, Sn—Co—Nb amorphous alloy, Sn—Ni—Cu amorphous alloy, Sn—Ni—Fe amorphous alloy, Sn—Cu—Fe amorphous alloy, Sn—Co—Fe—Ni—Cr amorphous alloy, Sn—Co—Fe—Ni—Cr—Mn amorphous alloy, Sn—Co—Cu—Fe—Ni—Cr amorphous alloy, Sn—Co—Cu—Fe—Ni—Cr—Mn amorphous alloy, Sn—Zr—Fe—Ni—Cr—Mn amorphous alloy, Sn—Zr—Cu—Fe—Ni—Cr—Mn amorphous alloy, Sn—Mo—Fe—Ni—Cr amorphous alloy, Sn—Mo—Cu—Fe—Ni—Cr—Mn amorphous alloy, Sn—Ti—Fe—Ni—Cr—Mn amorphous alloy, Sn—Ti—Cu—Fe—Ni—Cr—Mn amorphous alloy, Sn—Ti—Co—Fe—Ni—Cr—Mn amorphous alloy, Sn—Y—Co amorphous alloy, Sn—Y—Ni amorphous alloy, Sn—Y—Cu amorphous alloy, Sn—Y—Fe amorphous alloy, and Sn—Y—Fe—Ni—Cr amorphous alloy.

(2) Specific preferable examples of the amorphous alloy comprising any of the compositions described in the above (1) to which the foregoing element X which comprises at least one kind of an element selected from a group consisting C, P, B, La, Ce, Mg, Al, Zn, Bi, Si, Ge, and Ca is added are: Sn—Co—C amorphous alloy, Sn—Ni—C amorphous alloy, Sn—Fe—C amorphous alloy, Sn—Cu—C amorphous alloy, Sn—Fe—Ni—Cr—C amorphous alloy, Sn—Co—Fe—Ni—Cr—C amorphous alloy, Sn—Cu—Fe—Ni—Cr—C amorphous alloy. Sn—Co—Fe—Ni—Cr—Mn—C amorphous alloy, Sn—Co—Cu—Fe—Ni—Cr—C amorphous alloy, Sn—Co—Cu—Fe—Ni—Cr—Mn—C amorphous alloy, Sn—Co—Mg amorphous alloy, Sn—Ni—Mg amorphous alloy, Sn—Fe—Mg amorphous alloy, Sn—Cu—Mg amorphous alloy, Sn—Co—Mg—Fe—Ni—Cr amorphous alloy, Sn—Cu—Mg—Fe—Ni—Cr amorphous alloy, Sn—Mg—Fe—Ni—Cr amorphous alloy, Sn—Co—Si amorphous alloy, Sn—Ni—Si amorphous alloy, Sn—Fe—Si amorphous alloy, Sn—Cu—Si amorphous alloy, Sn—Co—Si—Fe—Ni—Cr amorphous alloy, Sn—Cu—Si—Fe—Ni—Cr amorphous alloy, Sn—Si—Fe—Ni—Cr amorphous alloy, Sn—Co—Ge amorphous alloy, Sn—Ni—Ge amorphous alloy, Sn—Fe—Ge amorphous alloy, Sn—Cu—Ge amorphous alloy, Sn—Co—Ge—Fe—Ni—Cr amorphous alloy, Sn—Cu—Ge—Fe—Ni—Cr amorphous alloy, Sn—Ge—Fe—Ni—Cr amorphous alloy, Sn—Co—La amorphous alloy, Sn—Ni—La amorphous alloy, Sn—Fe—La amorphous alloy, Sn—Cu—La amorphous alloy, Sn—Co—La—Fe—Ni—Cr amorphous alloy, Sn—Cu—La—Fe—Ni—Cr amorphous alloy, Sn—La—Fe—Ni—Cr amorphous alloy, Sn—Co—Ca amorphous alloy, Sn—Ni—Ca amorphous alloy, Sn—Fe—Ca amorphous alloy, Sn—Cu—Ca amorphous alloy, Sn—Co—Ca—Fe—Ni—Cr amorphous alloy, Sn—Cu—Ca—Fe—Ni—Cr amorphous alloy. Sn—Ca—Fe—Ni—Cr amorphous alloy, Sn—Co—Zn amorphous alloy, Sn—Ni—Zn amorphous alloy, Sn—Fe—Zn amorphous alloy, Sn—Cu—Zn amorphous alloy, Sn—Co—Zn—Fe—Ni—Cr amorphous alloy, Sn—Cu—Zn—Fe—Ni—Cr amorphous alloy, Sn—Zn—Fe—Ni—Cr amorphous alloy, Sn—Co—Al amorphous alloy, Sn—Ni—Al amorphous alloy, Sn—Fe—Al amorphous alloy, Sn—Cu—Al amorphous alloy, Sn—Co—Al—Fe—Ni—Cr amorphous alloy, Sn—Cu—Al—Fe—Ni—Cr amorphous alloy, Sn—Al—Fe—Ni—Cr amorphous alloy, Sn—Co—P amorphous alloy, Sn—Ni—P amorphous alloy, Sn—Fe—P amorphous alloy, Sn—Cu—P amorphous alloy, Sn—Co—P—Fe—Ni—Cr amorphous alloy, Sn—Cu—P—Fe—Ni—Cr amorphous alloy, Sn—P—Fe—Ni—Cr amorphous alloy, Sn—Co—B amorphous alloy, Sn—Ni—B amorphous alloy, Sn—Fe—B amorphous alloy, Sn—Cu—B amorphous alloy, Sn—Co—B—Fe—Ni—Cr amorphous alloy, Sn—Cu—B—Fe—Ni—Cr amorphous alloy, and Sn—B—Fe—Ni—Cr amorphous alloy.

In a preferred embodiment, the amorphous Sn.A.X alloy of the present invention contains Li element in an amount in a range of from 2 atomic % to 30 atomic %.

It is possible for the amorphous Sn.A.X alloy of the present invention to contain nitrogen element (N) or/and sulfur element (S) in an amount in a range of from 1 atomic % to 30 atomic %.

Now, as previously described, the electrode structural body according to the present invention comprises the foregoing electrode material for anode and a collector comprising a material incapable of being alloyed with lithium in the electrochemical reaction. It is preferred that the electrode material is formed on the collector. The amount of the particulate comprising the amorphous Sn.A.X alloy which is contained in the electrode structural body is preferred to be 25% by weight or more.

And, as previously described, it is desired that the particulate comprising the amorphous Sn.A.X alloy which constitutes the electrode material for anode contains the amorphous Sn.A.X alloy in an amount of 30% by weight or more.

The electrode material as the constituent of the electrode structural body is desired to contain a binder comprising a water-soluble or water-insoluble organic polymer.

As previously described, the rechargeable lithium battery according to the invention comprises at least an anode comprising the above-described electrode structural body, a cathode and an electrolyte and in which oxidation-reduction reaction of lithium is used. It is desired that the cathode in the rechargeable lithium battery of the present invention is constituted by a cathode active material containing an amorphous phase having a function of intercalating lithium ion and deintercalating said lithium ion intercalated in the discharge-and-charge reaction. As such cathode active material, it is desired to use a material containing an amorphous oxide material.

As previously described, the present invention provides a process for producing the foregoing electrode structural body. The production process is characterized by including a step of arranging the foregoing electrode material for anode on the foregoing collector. The step of arranging the electrode material for anode on the collector may include a step of arranging the electrode material for anode on the collector by way of press forming. Otherwise, the step of arranging the electrode material for anode on the collector may include steps of mixing the electrode material for anode with the foregoing binder, if necessary while adding a solvent, to obtain a paste-like product and arranging said paste-like product on the collector.

Further, as previously described, the present invention provides a process for producing a rechargeable lithium battery. Specifically, the present invention provides a process for producing a rechargeable lithium battery at least having an anode, a cathode and an electrolyte and in which oxidation-reduction reaction of lithium is used, characterized by having a step of forming an electrode structural body as said anode by arranging an electrode material containing a particulate comprising the foregoing amorphous Sn.A.X alloy on an anode collector. This step of forming the anode may include a step of arranging said electrode material on said collector by way of press forming. Otherwise, the step of forming the anode may include steps of mixing the electrode material with the foregoing binder, if necessary while adding a solvent, to obtain a paste-like product and arranging said paste-like product on the collector.

In the following, the present invention will be detailed with reference to the drawings.

[Electrode Structural Body]

Figure 1B:
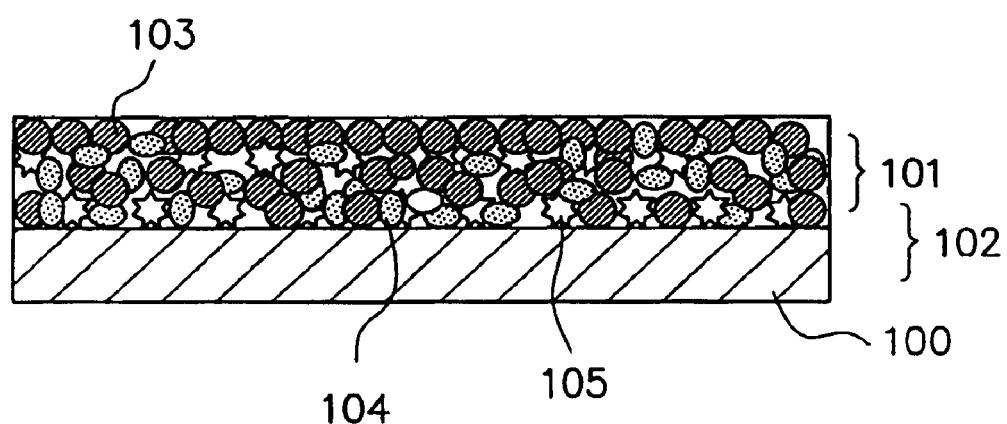

FIG. 1(FIGS. 1(a) and 1(b)) is a schematic cross-sectional view illustrating a cross section of an electrode structural body 102 which contains an amorphous phase-containing particulate comprising the foregoing amorphous Sn.A.X alloy of the present invention which is capable of being alloyed with lithium in the electrochemical reaction (this amorphous phase-containing particulate will be hereinafter referred to as "amorphous phase-bearing alloy particulate" or "amorphous alloy particulate"). Particularly, FIG. 1(a) shows an electrode structural body 102 comprising an electrode material layer 101 in which the amorphous phase-bearing alloy particulate is used and which is provided on a collector 100. FIG. 1(b) shows an electrode structural body 102 comprising an electrode material layer provided on a collector 100. The electrode material layer 101 in FIG. 1(b) comprises the amorphous phase-bearing alloy particulate 103, an electrically conductive auxiliary 104, and a binder 105. In each of FIGS. 1(a) and 1(b), the electrode material layer 101 is provided only on one side of the collector 100. However, it is possible for the electrode material layer to be provided on each of the opposite faces of the collector 100.

In the present invention, the anode comprises the amorphous alloy particulate of the present invention which is capable of being alloyed with lithium as above described and because of this, the anode has gaps (microspaces) among particles of the amorphous alloy particulate, where these gaps serve to allow the amorphous alloy particulate constituting the anode to smoothly expand upon charging and therefore, the anode is prevented from suffering breakage. In addition, the amorphous alloy particulate has amorphous phase and because of this, its volume expansion upon alloying with lithium is diminished. In this connection, in the case where the amorphous alloy particulate of the present invention, which is capable of being alloyed with lithium in the electrochemical reaction, is used as the constituent of the anode of a rechargeable lithium battery as above described, expansion and shrinkage of the electrode material layer of the anode is diminished. Thus, it is possible to attain a rechargeable lithium battery having a satisfactory battery performance which is hardly deteriorated even when the charging and discharging cycle is repeated over a long period of time.

On the contrary, when the anode comprises a plate-like metal material capable of being alloyed with lithium in the electrochemical reaction, expansion of the anode upon charging is quite large, and cracking is liable to occur at the anode when charging and discharging are alternately repeated over a long period of time, where the anode is liable to suffer from breakage. Thus, it is difficult to attain a rechargeable battery having a long battery lifetime.

In the following, description will be made of examples of a process for producing the electrode structural body 102.

(1) The electrode structural body 102 shown in FIG. 1(a) may be produced, for example, by directly forming an electrode material layer 101 comprising a given amorphous phase-bearing particulate of the present invention which is capable of being alloyed with lithium in the electrochemical reaction on a collector 100 by a manner of press-forming said amorphous phase-bearing particulate on said collector.

(2) The electrode structural body shown in FIG. 1(b) may be formed by mixing a given amorphous phase-bearing particulate 103 of the present invention which is capable of being alloyed with lithium in the electrochemical reaction, a given electrically conductive auxiliary 104, and a given binder 105 to obtain a mixture, adding a given solvent to said mixture while adjusting the viscosity to obtain a paste, applying said paste on a collector 100, and drying the paste applied to form an electrode material layer 101 on the collector 100. In this case, the thickness or density of the electrode material layer 101 formed may be adjusted by means of roll press or the like.

[Collector 100]

The collector 100 serves to supply an electric current such that said electric current can be efficiently consumed for the electrode reaction upon charging and it also serves to collect an electric current generated upon discharging. Particularly in the case where the electrode structural body 100 is used as the anode of a rechargeable battery, as the constituent of the collector 100, it is desired to use a material having a high electric conductivity and which is inactive to the battery reaction. As preferable examples of such material, there can be mentioned metallic materials which are incapable of being alloyed with lithium in the electrochemical reaction. Specific examples of such metallic material are metals such as Cu, Ni, Fe, Ti, and the like, and alloys of these metals such as stainless steel. The collector 100 is desired to be in the form of a plate shape. The plate shape in this case may be of a thickness in a practical range. The plate shape can include a so-called "foil" configuration with a thickness of about 100 $\mu$m or less. Besides, it is possible to employ a mesh member, a sponge member, a fibrous member, a punching metal member, and a expanded metal member, respectively in the form of a plate shape.

[Electrode Material Layer]

The electrode material layer 101 is a layer comprising the foregoing amorphous phase-bearing amorphous alloy particulate of the present invention which is capable of being alloyed with lithium in the electrochemical reaction as above described. The electrode material layer 101 may be a layer constituted by the foregoing amorphous alloy particulate only or a layer constituted by a composite comprising the foregoing amorphous alloy particulate, an electrically conductive auxiliary and a binder comprising an organic polymer material (a water-soluble or water-insoluble organic polymer material). By making the amorphous alloy particulate to be the principal constituent of the electrode material layer, in the case where the electrode material layer is used in the anode of a rechargeable lithium battery, not only expansion of the electrode material layer upon charging but also cracking which is liable to occur at the electrode material layer upon the repetition of charging and discharging are restrained.

The above composite layer may be formed by mixing the amorphous alloy particulate with a given electrically conductive auxiliary and a given binder to obtain a mixture, applying said mixture on a collector, and subjecting the mixture applied to a press forming treatment. In order to make the mixture to be readily applied, it is preferred that the mixture is added with a solvent into a paste-like material prior to the application. The application of the mixture may be conducted by means of, for instance, a coater coating method or a screen printing method. Alternatively, the electrode material layer may be formed by arranging a mixture comprising the main constituent material (the amorphous alloy particulate), the electrically conductive auxiliary and the binder without adding the solvent or a mixture comprising the main constituent material and the electrically conductive auxiliary without mixing the binder on the collector and subjecting to a press forming treatment.

The amorphous alloy particulate of the present invention may be prepared by using more than two kinds of elements, preferably more than three kinds of elements, more preferably four kinds of elements. Of these elements, as the elements other than Sn as the principal element, it is desired to selectively use elements which are different from the principal element by more than about 10% in terms of the atomic size ratio. As such element, there can be mentioned elements having an atomic radius which is 1.1 times or more that of Sn. Specific examples of such element are, for example, Ce, Sr, Ba, Ca, Pb, Bi, La, Y, and the like. Besides, there can be mentioned also elements having an atomic radius which is 0.9 time or less that of Sn. Specific examples of such element are, for example, Ru, Ge, Zn, Cu, Ni, Co, Fe, Mn, Cr, V, S, P, Si, Be, B, C, N, and the like. These elements other than the principal element may be incorporated from a material constituting an alloy-preparing apparatus used.

As the method of preparing the amorphous alloy particulate of the present invention, there can be mentioned, for example, a method of directly and concurrently conducting mixing, alloying and amorphization of raw materials in an adequate grinding apparatus (an adequate pulverizing mill). Besides, there can be also mentioned a method wherein raw materials are mixed obtain a mixture, the mixture is fused into an alloy fusion, followed by quenching by means of a single or twin roll quenching method, a gas atomizing method, a water atomizing method, a disc atomizing method, or a centrifugal quenching method to obtain an amorphized alloy material. The amorphized alloy material is finely ground by means of an adequate grinding apparatus (an adequate pulverizing mill), where the alloy material is further amorphized. In this fine-grinding, there is obtained a desired amorphous alloy particulate having an increased specific surface area.

It is desired for the above grinding apparatus (the pulverizing mill) to have a high grindability. As such grinding apparatus, there can be used, for example, a roller mill, a high speed tumbling mill, a vessel-driving medium mill (a ball mill), a medium-stirring mill, a jet mill, or the like. Specifically, for instance, as described in examples which will be described later, it is preferred to use a vessel-driving medium mill such as a planetary ball mill or a vibrating ball mill in which various kinds of powdery metallic materials can be alloyed in the course of repeating cold pressure welding and grinding for them by virtue of collision of balls, for the alloying and amorphization.

The mechanical grinding and mixing treatment is preferred to be conducted in an atmosphere composed of an inert gas such as argon gas or nitrogen gas. In order to prevent a product from depositing on a inner wall face of the grinding and mixing apparatus, it is possible to add an alcohol to the materials to be treated. The amount of the alcohol to be added is preferably in a range of from 1% by weight to 10% by weight, more preferably in a range of from 1% by weight to 5% by weight.

In the case where an amorphous phase-bearing alloy particulate is prepared by way of the mechanical grinding and mixing treatment using a ball mill as a representative example of the mechanical grinding and mixing apparatus, it is important to optimize the related parameters including the constituent material of the vessel and that of the balls, the size (diameter) and quantity of the balls, the amounts of raw materials, the grinding and mixing speed, and the like. The vessel and the balls are required to be constituted by a material which is highly hard and highly dense and is highly thermal conductive. As such material, there can be mentioned, for example, stainless steel, chrome steel, silicon nitride, and the like. The balls are desired to be of a size which can be readily handled. For the influences imparted by such parameters, it is considered that the momentum of the balls provides an energy necessary for the alloying, and the heat conduction and heat radiation speed of the balls and those of the inner wall of the vessel provide a cooling speed necessary for the amorphization.

As the raw materials in order to obtain a desired amorphous alloy particulate, for each of the element Sn, the element A, and the element X of the formula Sn.A.X, it is possible to use a prescribed raw material, for example, in such a way that a powder of a Sn metal is used as the raw material for the element Sn, a powder of a given transition metal is used as the raw material for the element A, and a powder of a metallic material containing at least one kind of an element selected from a group consisting of O, F, N, Mg, Ba, Sr, Ca, La, Ce, Si, Ge, C, P, B, Bi, Sb, Al, In, and Zn is used as the raw material for the element X. Or alternatively, other than the above raw material for the element Sn, it is possible to use adequate raw materials containing those elements illustrated In the foregoing (1) to (8) as the constituent elements of the amorphous Sn.A.X alloy of the present invention. Any of these raw materials is preferred to be in a powdery form.

As the organic polymer material used as the binder in the present invention, it is possible to use an organic polymer material which is water-soluble or water-insoluble as previously described. However, it is more preferred to use a water-soluble organic polymer material as the binder.

Specific examples of such water-soluble organic polymer material are polyvinyl alcohol, carboxymethyl cellulose, methyl cellulose, ethyl cellulose, isopropyl cellulose, hydroxymethyl cellulose, hydroxyethyl cellulose, hydroxypropylmethyl cellulose, cyanoethyl cellulose, ethylhydroxyethyl cellulose, starch, dextran, pullulan, polysarcosine, polyoxyethlene, polyN-vinylpyrrolidone, gum arabic, tragacanth gum, and polyvinyl acetate.

Specific examples of such water-insoluble organic polymer material are fluorine-containing polymers such as polyvinyl fluoride, polyvinylidene fluoride, tetrafluoroethylene polymer, trifluoroethylene polymer, difluoroethylene polymer, ethylene-tetrafluoroethylene copolymer, tetrafluoroethylene-hexafluoropropylene copolymer, tetrafluoroethylene-perfluoroalkylvinyl ether copolymer, and trifluoroetylene chloride polymer; polyolefins such as polyethylene and polypropylene; ethylene-propylene-diethane terpolymer; silicone resin; polyvinyl chloride; and polyvinyl butyral.

The rate occupied by the binder in the electrode material layer is desired to be preferably in a range of from 1% weight to 20% by weight or more preferably in a range of from 2% weight to 10% by weight in order to retain a large amount of an active material in the electrode material layer upon charging.

The electrically conductive auxiliary used in the present invention can include amorphous carbon materials such as acetylene black, ketjen black, and the like, carbonous materials such as graphite structure carbon, and the like, and metallic materials such as Ni, Cu, Ag, Ti, Pt, Al, Co, Fe, Cr, and the like. As the electrically conductive auxiliary, for example, such carbon material or metallic material as above illustrated is used by blending it in an amount in a range of from 0 to 20% by weight. The electrically conductive auxiliary is preferred to be in a spherical form, a flake form, a filament form, a fabric form, a spike form, or a needle form. In a more preferred embodiment, by adopting two kinds of forms of these forms, it is possible to increase the packing density upon forming the electrode material layer so that the resulting electrode material layer has a small impedance.

[Density of Electrode Material Layer (Active Material Layer)]

The amorphous alloy particulate of the present invention has a volume expansion upon charging in comparison with a conventional carbonous material such as graphite or the like. Because of this, when the density of the electrode material layer (as an active material layer) formed on the collector using the amorphous alloy particulate as its principal constituent material is excessively high, there is a tendency that the volume of the electrode material layer is expanded upon charging and peeling is liable to occur between the electrode material layer and the collector. In the case where the density of the electrode material layer is excessively small, there is a tendency that the contact resistance among the particles of the amorphous alloy particulate is liable to increase whereby reducing the current-collecting performance. In this connection, the density of the electrode material layer (the active material layer) is desired to be preferably in a range of from 2.0 to 3.5 $g/cm^3$ or more preferably in a range of from 2.3 to 3.0 $g/cm^3$.

[Amorphous Alloy]

Because the foregoing amorphous alloy particulate of the present invention which is capable of being alloyed with lithium contains amorphous phase which has a short distance order property but does not have a long-distance order property, it does not have a large change in the crystalline structure upon the alloying with lithium, and therefore, the volume expansion is small. In this connection, when the amorphous alloy particulate is used in the anode of a rechargeable lithium battery, the electrode material layer of the anode is slightly expanded or shrunk upon charging or discharging. Thus, there can be attained a rechargeable battery whose anode is hardly cracked or ruptured even when the charging and discharging cycle is repeated over a long period of time, where the performance thereof is maintained without being deteriorated.

Whether or not the amorphous alloy particulate contains amorphous phase or whether or not it is truly amorphous may be confirmed by the following analytical method.

In a X-ray diffraction chart of a given specimen in which a peak intensity against a diffraction angle by X-ray diffraction analysis using Kα-rays of Cu is appeared, in the case where the specimen is crystalline, a sharp peak is appeared. However, in the case where the specimen contains amorphous phase, a broad peak with a widened half width is appeared, and in the case where the specimen is completely amorphous, no X-ray diffraction peak is appeared. Separately, according to a radial distribution function curve which is obtained by way of calculation on the basis of data obtained in the X-ray diffraction analysis of a specimen, said radial distribution function curve being of a function showing the situation that for a given atom, existential probability of other atom is present at a point being apart from said given atom at a given distance, in the case where the specimen is amorphous, being different from the case of a crystalline whose interatomic distance is constant wherein a sharp peak is appeared at every point of a definite distance, it is understood that the density at a short distance in the vicinity of the foregoing given atom is large but it is diminished as the distance from the atom becomes distant.

According to an electron diffraction pattern obtained by electron diffraction analysis, it is understood that in the course of shifting from a spot pattern of a crystalline to an amorphous nature, there are observed electron diffraction pattern changes from a ring pattern to a diffuse ring pattern, then to a halo pattern. In the case where a material has a diffuse ring pattern, it is understood that the material contains amorphous phase. In the case where a material has a halo pattern, it is understood that the material is amorphous.

According to analysis by means of a differential scanning calorimeter (DSC), for an amorphous phase-bearing metal powder, there is observed a calorific peak due to crystallization upon heating said metal powder (in the case of an amorphous phase-bearing Sn alloy powder, when it is heated at a temperature in a range of from 200° C. to 600° C.).

As previously described the amorphous phase-bearing alloy used in the present invention includes those two-elements series amorphous alloys, three-elements series amorphous alloys, and multi-elements series amorphous alloys containing four or more different kinds of elements illustrated in the above.

In the above description relating to the formula Sn.A.X of the amorphous Sn.A.X alloy of the present invention, there is described that the constituent elements Sn, A and X of the amorphous Sn.A.X alloy have a relationship of Sn/(Sn+A+X)=20 to 80 atomic %, where the content ratio (that is, the content) of the element Sn in the amorphous Sn.A.X alloy is 20 to 80 atomic %. However, the content ratio (that is, the content) of the element Sn is preferably in a range of from 30 atomic % to 75 atomic % or more preferably in a range of from 40 atomic % to 70 atomic %. And being large and small for the content ratio (atomic %) of each of the constituent elements Sn, A and X is desired to be in a relationship preferably of the element Sn>the element A (one element)>the element X (one element) or more preferably, of the element Sn>the entirety of the element A>the entirety of the element X.

For the content ratio (the content) of the transition metal element as the element A contained in the amorphous phase-bearing alloy particulate comprising the amorphous Sn.A.X alloy of the present invention, it is preferably in range of from 20 atomic % to 80 atomic %, more preferably in a range of from 20 atomic % to 70 atomic %, most preferably in a range of from 20 atomic % to 50 atomic %.

For the content of the element X, it is preferably in a range of from 0 atomic % to 50 atomic %, more preferably in a range of from 1 atomic % to 40 atomic %.

In the present invention, by using two or more kinds of metal elements which are different each other with respect to their atomic size, which is calculated from a metallic bond radius, a van der Waals radius or the like, at an extent of at least 10% to 12% or more, amorphization is readily occurred. Further, by using three or more kinds of such metal elements, the packing density is increased and the atoms involved are prevented from being readily diffused, where there is provided a more stable amorphous state. Thus, amorphization is more readily occurred.

By incorporating an element having an small atomic size such as C, P and B or other element having an small atomic size such as O and N, it is possible that gaps among the above metal elements are diminished and the atoms involved are more prevented from being readily diffused, where there is provided a further stable amorphous state. Thus, amorphization is further readily occurred.

In the case where the preparation of the foregoing amorphous alloy particulate is conducted in an oxygen-containing atmosphere, oxygen is incorporated and amorphization is readily occurred. However, in the case where the amount of the oxygen incorporated exceeds 5% by weight, when the resulting amorphous alloy particulate is used as an anode material of a rechargeable lithium battery, the non-reversible amount when lithium once stored is released (that is, the lithium amount which becomes impossible to release) is increased and because of this, it is not suitable for use as the anode material. In this connection, the amount of the oxygen element incorporated is desired to be preferably in a range of from 0.05% by weight to 5% by weight or more preferably in a range of from 0.1% by weight to 3% by weight.

In the present invention, for each of the metal elements such as Sn, Al, Si, and Ge contained in the electrode material layer, it is preferred to be contained with such a concentration gradient that is decreased in the vicinity of the collector situated at a central portion of the electrode structural body and is increased on the side which contacts with an electrolyte when the electrode structural body is used as the electrode of a rechargeable battery. By this, in the case where the electrode structural body is used as the anode of a rechargeable lithium battery, occurrence of peeling at the interface between the collector and the electrode material layer due to expansion and shrinkage of the electrode material layer of the anode upon charging and discharging is prevented.

The amorphous Sn.A.X alloy of the present invention is desired to contain Li element in an amount preferably in a range of from 2 atomic % to 30 atomic % or more preferably in a range of from 5 atomic % to 10 atomic %. By making the amorphous alloy to contain Li element in this way, in the case of a rechargeable battery having an anode prepared using this amorphous alloy, the foregoing non-reversible amount of lithium upon charging and discharging is decreased. Further, it is desired for the amorphous alloy of the present invention to contain one or more kinds of elements selected from a group consisting of N, S, Se, and Te in an amount in a range of from 1 atomic % to 30 atomic %. By containing one or more kinds of elements selected from a group consisting of N, S, Se, and Te in such prescribed amount, in the case where the amorphous alloy is used in the anode of a rechargeable lithium battery, it is possible to further prevent the electrode material layer of the anode from being expanded and shrunk upon charging and discharging. The incorporation of the above Li element or the above one or more kinds of elements selected from the group consisting of N, S, Se, and Te into the amorphous alloy may be conducted by mixing an adequate lithium alloy such as a Li—Al alloy, lithium nitride, lithium sulfide, lithium selenide, or lithium telluride at the time of preparing the amorphous alloy or after the preparation thereof.

In the case where the foregoing amorphous phase-bearing amorphous alloy particulate has a increased proportion of the amorphous phase, it is understood from a peak appeared in a X-ray diffraction chart that a sharp peak is appeared in the case of a crystalline, however a broad peak with a widened half width is appeared. The amorphous phase-bearing amorphous alloy particulate in the present invention is desired to have a peak appeared in a range of $2\theta=20°$ to $50°$ in X-ray diffraction with K$\alpha$-rays of Cu, having a half width of preferably more than 0.2°, more preferably more than 0.5°, most preferably more than 1.0°. In a preferred embodiment, it is desired to have a peak appeared in a range of $2\theta=40°$ to $50°$ in X-ray diffraction with K$\alpha$-rays of Cu, having a half width of preferably more than 0.5°, more preferably more than 1.0°.

In the X-ray diffraction analysis of a given amorphous Sn alloy using a K$\alpha$-rays of Cu source, there are observed peaks in a diffraction angle range of 2θ=25° to 50°, where a main peak is observed approximately in a diffraction angle range of 2θ=28° to 37° and another main peak is observed approximately in a diffraction angle range of 2θ=42° to 45°. As long as the Sn content slightly differs, there is observed a correlation between a crystallite size calculated from the diffraction angle and the half width and a cycle life of the alloy. That is, as long as the Sn content is substantially the same, the smaller the crystallite size is, the longer the cycle life of a battery in which the alloy is used is. It is ideal that a crystallite size with no X-ray diffraction peak approximates zero.

Particularly in the case of a rechargeable lithium battery having an anode comprising a metallic Sn material or a Sn—Li alloy, it is known that a maximum of 4.4 lithium atoms can be taken-in per one Sn atom, and a theoretical capacity per unit weight is 790 Ah/Kg. Thus, it can be said that the rechargeable battery theoretically has a capacity which is greater than that of 372 Ah/Kg in the case of using a graphite. However, the charging and discharging cycle life of this rechargeable battery when practically used is short. Therefore, this rechargeable battery has never put to practical use.

However, by preparing the electrode material layer comprising a prescribed amorphous phase-bearing alloy particulate comprising the amorphous Sn-containing alloy of the present invention in an optimum mode, it is possible to actualize such theoretically high capacity into practical one, prolong the charging and discharging cycle life, and improve other performances including discharging characteristics.

[Particle Size of Amorphous Alloy Particulate]

The amorphous alloy particulate of the present invention as the principal constituent material is desired to have an average particle size controlled in a range of from 0.5 μm to 20 μm. By this, it is possible to form a desirably uniform layer comprising the particulate having such average particle size on the collector. In a preferred embodiment, the amorphous alloy particulate has an average particle size controlled in a range of from 0.5 μm to 10 μm.

[Crystallite Size]

The amorphous alloy particulate of the present invention is of a crystallite size, which is calculated based on data obtained in the X-ray diffraction analysis of the alloy particulate (in an unused state) before neither charging nor discharging is operated for the electrode material layer, controlled preferably in a range of less than 500 Å, more preferably in a range of less than 200 Å, most preferably in a range of less than 100 Å. By using the alloy particulate of such minute crystallite size, the electrochemical reaction upon charging and discharging can be smoothly conducted, and the charge capacity can be greatly improved. Further, occurrence of distortion which will be occurred upon the entrance and exit of lithium can be suppressed to a minimum level, and the charging and discharging cycle life can be greatly prolonged.

Here, the above crystallite size of the alloy particulate in the present invention is one determined from the half width and diffraction angle of a peak of a X-ray diffraction curve obtained using a radiation source comprising Kα-rays of Cu and in accordance with the following Scherrer's equation.

Lc=0.94 λ/(β cos θ) [Scherrer's equation]

Lc: crystallite size
λ: wavelength of X-ray beam
β: half width (radian) of the peak
θ: Bragg angle of the diffraction line

[Proportion of Amorphous Phase]

By making a X-ray diffraction peak intensity obtained from a crystallized product, which is obtained by subjecting a given amorphous phase-bearing alloy particulate to a heat treatment at a temperature of more than 600° C. in an atmosphere composed of inert gas or hydrogen gas, to be a crystalline of 100% (intensity Ic), it is possible to readily obtain the proportion of the amorphous phase in the amorphous phase-bearing alloy particulate.

When the X-ray diffraction peak intensity of the amorphous phase-bearing alloy particulate is made to be Ia, the proportion of the amorphous phase is: (1−Ia/Ic) ×100%.

For the amorphous phase-bearing alloy particulate of the present invention, its proportion of the amorphous phase obtained by way of calculation in accordance with the above equation is preferably more than 30%, more preferably more than 50%, most preferably more than 70%.

[Preferable Specific Surface Area of Amorphous Alloy Particulate]

In the case where the amorphous alloy particulate of the present invention is used as an anode material of a rechargeable lithium battery, in order to increase the reactivity of the amorphous alloy particulate with lithium deposited upon charging so as to uniformly react with said lithium and also in order for the amorphous alloy particulate to be readily handled, it is desired for the amorphous alloy particulate to have a small particle size and also have a large specific surface area at an extent that the electron conductivity of the electrode formed is not decreased so as to heighten the impedance thereof and also at an extent that the electrode material layer can be readily formed. Particularly, it is desired for the amorphous alloy particulate to have a specific surface area preferably of more than 1 m²/g or more preferably of more than 5 m²/g. The specific surface area can be measured by means of BET (Brunauer-Emmett-Teller) method.

[Oxidation Prevention of Amorphous Alloy Particulate]

A metal in a powdery form is liable to react with air into an oxide material. For the amorphous alloy particulate of the present invention, by covering its surface by a thin oxide coat or a thin fluoride coat, it is possible to prevent the alloy particulate from being oxidized and maintain it in a stable state. To coat the alloy particulate by said thin oxide coat may be carried out by a method of preparing a prescribed amorphous alloy particulate and introducing a minor amount of oxygen into the atmosphere where the amorphous alloy particulate is present. Besides, there can be illustrated a method wherein a prescribed amorphous alloy particulate is prepared in an atmosphere containing a minor amount of oxygen to obtain an oxygen-containing amorphous alloy particulate. In the case of incorporating oxygen element in this way, amorphization of a product is readily occurred. However, in the case where the oxygen content is beyond 5% by weight, when the amorphous alloy particulate is used as an anode material of a rechargeable lithium battery, the non-reversible amount (the amount of lithium which is remained without being released) when lithium is stored and the lithium stored is then released is increased. Thus, the amorphous alloy particulate in this case is not suitable for use as the anode material.

For the oxidation prevention of the amorphous alloy particulate, other than the above-described methods, it is possible to adopt a method of adding an antioxidant upon the preparation of the amorphous alloy particulate.

To coat the amorphous alloy particulate by said thin fluoride coat may be carried out by a method wherein a given amorphous alloy particulate is prepared and said amorphous alloy particulate is immersed in a solution containing hydrofluoric acid or a fluorine compound such as ammonium fluoride.

The amorphous alloy particulate coated by such thin oxide coat or thin fluoride coat is desired to contain the oxygen element or/and the fluorine element in an amount of less than 5% by weight, specifically in a range of from 0.05% by weight to 5% by weight. In a preferred embodiment, it is desired to contain the oxygen element or/and the fluorine element in an amount of less than 3% by weight, specifically in a range of from 0.1% by weight to 3% by weight. In any case, the oxygen element or the fluorine element in such minor amount is preferred contain in the amorphous alloy particulate such that either the oxygen element or the fluorine element is locally present at the surface of the amorphous alloy particulate.

The measurement of the oxygen content may be carried out by a method wherein a specimen is heated in a crucible made of graphite to convert the oxygen contained in the specimen into carbon monoxide, followed by subjecting to detection by means of a thermal conductivity detector. The measurement of the fluorine content may be carried out by a method wherein a specimen is dissolved in an acid or the like, subjecting to analysis by way of emission spectral analysis.

[Rechargeable Battery]

Figure 2:
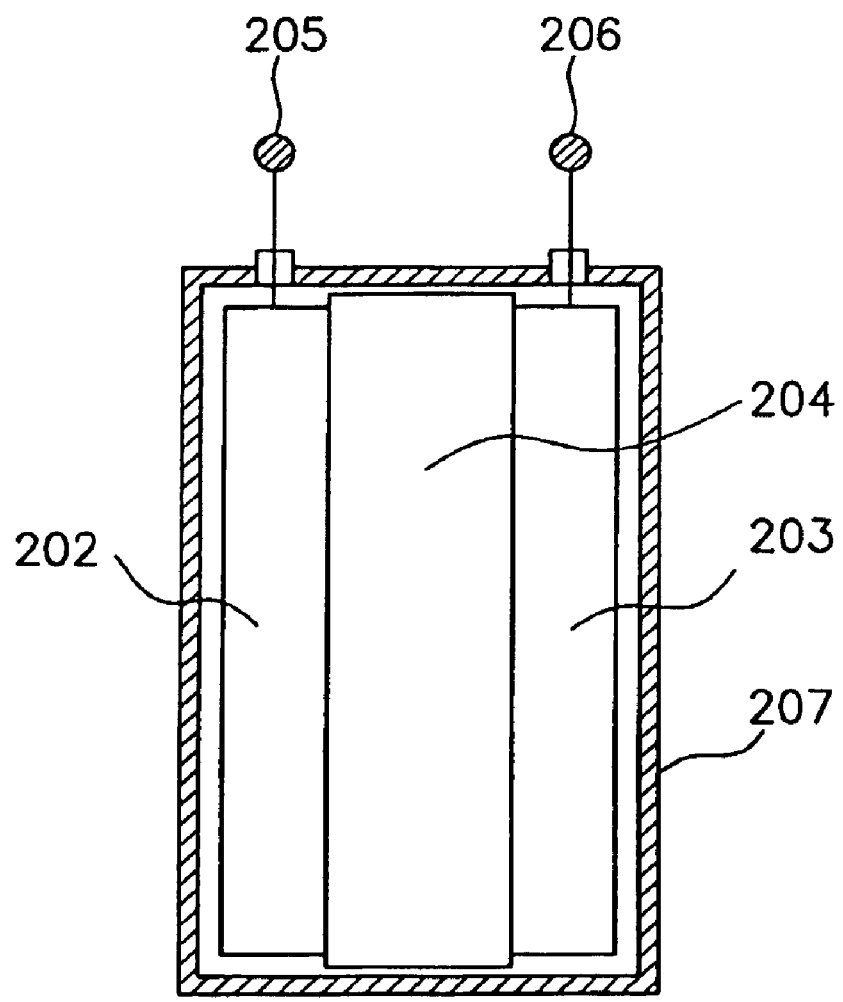
FIG. 2 is a schematic cross-sectional view illustrating a basic constitution of an example of a rechargeable battery according to the present invention.

FIG. 2 is a conceptual view schematically illustrating the constitution of a rechargeable lithium battery according to the present invention. As shown in FIG. 2, an anode 202 comprising the foregoing electrode structural body of the present invention and a cathode 203 are accommodated in a battery housing 207 (a battery case) such that they are opposed to each other through an ion conductor 204 (an electrolyte). And an anode terminal 205 is electrically connected to the anode 202, and a cathode terminal 206 is electrically connected to the cathode 203.

In the present invention, by using an electrode structural body having such configuration as shown in FIG. 1(a) or FIG. 1(b) as the anode 202, because the anode 202 comprises a specific amorphous alloy particulate which is expanded a little when it is alloyed with lithium upon charging, expansion and shrinkage of the anode are quite small in the battery housing 207 even when the charging and discharging cycle is repeated, where the electrode material layer (which retains lithium upon charging) of the anode scarcely suffers fatigue failure. Thus, the rechargeable lithium battery has a markedly prolonged charging and discharging cycle life. Further, in the case where the amorphous alloy particulate comprises an amorphous phase-bearing amorphous alloy particulate whose crystallite size is small, the release of lithium upon discharging is smoothly performed, where the anode also has an excellent discharging performance.

[Anode 202]

As the anode 202 of the rechargeable lithium battery of the present invention, any of the foregoing electrode structural bodies 102 of the present invention can be used as it is.

[Cathode 203]

The cathode 203 as a counter electrode to the anode comprising the electrode structural body of the present invention in the rechargeable lithium battery comprises at least a cathode active material capable of being a host material for lithium ion. Preferably, the cathode comprises a layer formed of said cathode active material capable of being a host material for lithium ion and a collector. The layer formed of the cathode material is preferred to comprise said cathode active material capable of being a host material for lithium ion and a binder, if necessary, also an electrically conductive auxiliary.

As the cathode active material capable of being a host material for lithium ion used in the rechargeable lithium battery, transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au.

It is preferred also for the cathode active material (or the cathode material) to comprise an amorphous phase-bearing material in order to increase the amount (that is, the storage capacity) of lithium ion which intercalates. As well as in the case of the amorphous phase-bearing amorphous alloy particulate constituting the anode, the amorphous phase-bearing material is desired to be of a crystallite size, which is calculated from data obtained in the X-ray diffraction analysis and in accordance with the foregoing Scherrer's equation, preferably in a range of less than 500 Å or more preferably in a range of less than 200 Å. And as well as in the case of the amorphous alloy particulate as the anode material, it is desired to be such that in a X-ray diffraction chart (of X-ray diffraction intensity against a diffraction angle of 2θ), has a main peak with a half width preferably of more than 0.2° or more preferably of more than 0.5° respectively against 2θ.

In the case where the cathode active material is in a powdery form, a cathode active material layer is formed by mixing said powder cathode active material with a binder and applying the mixture on the collector or by sintering said powder cathode active material on the collector, whereby forming the cathode. In the case where the conductivity of the powder cathode active material is insufficient, as well as in the case of forming the electrode material layer (as the anode active material layer) for the foregoing electrode structural body, an adequate electrically conductive auxiliary is added. As said binder and said electrically conductive auxiliary, those mentioned in the above which are used for the formation of the electrode structural body (102) of the present invention may be used.

The collector of the cathode may be constituted by a metal such as Al, Ti, Pt, or Ni, or an alloy such as stainless steel.

[Ion Conductor 204]

As the ion conductor used in the rechargeable lithium battery of the present invention, there may be used a separator having an electrolyte solution (a supporting electrolyte solution obtained by dissolving a given supporting electrolyte in an adequate solvent) retained therein, a solid electrolyte, or a solidified electrolyte obtained by gelling an adequate electrolyte solution by a high molecular gelling agent.

The ion conductor used in the rechargeable lithium battery of the present invention is necessary to have an ionic conductivity at 25° C. which is preferably more than $1 \times 10^{-3}$ S/cm or more preferably more than $5 \times 10^{-3}$ S/cm.

The supporting electrolyte can include inorganic acids such as $H_2SO_4$, HCl and $HNO_3$; salts of $Li^+$ (lithium ion) with Lewis acid ion such as $BF_4^-$, $PF_6^-$, $AsF_6^-$, $ClO_4^-$, $CF_3SO_3^-$, or $BPh_4^-$ (with Ph being a phenyl group); and mixtures of these salts. Besides these, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the supporting electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethyl sufoxide, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of these.

As for these solvents, it is desired for them to be subjected to dehydration using activated alumina, molecular sieve, phosphorous pentaoxide, or calcium chloride, prior to their use. Depending upon some of these solvents, it is desired for them to be subjected to distillation in an atmosphere composed of inert gas in the presence of an alkali metal, where moisture and foreign matter are removed.

In order to prevent leakage of the electrolyte solution, it is desired to use a solid electrolyte or solidified electrolyte.

The solid electrolyte can include a glass material such as an oxide material comprising lithium, silicon, phosphorus, and oxygen elements, a polymer chelate comprising an organic polymer having an ether structure, and the like.

The solidified electrolyte can include those obtained by gelling a given electrolyte solution by a gelling agent to solidify said electrolyte solution. As the gelling agent, it is desired to use a polymer having a property of absorbing the solvent of the electrolyte solution to swell or a porous material such as silicagel, capable of absorbing a large amount of liquid. Said polymer can include polyethylene oxide, polyvinyl alcohol, polyacrylamide, polymethylmethacrylate, and polyacrylonitrile. And these polymers are preferred to have a cross-linking structure.

The separator is disposed between the anode and the cathode, and it serves to prevent the anode and the cathode from suffering from internal-shorts. It also serves to retain an electrolyte therein depending upon the situation. The separator having the electrolyte retained therein functions as the ion conductor.

The separator is required to have a structure having a number of perforations capable of allowing lithium ion to pass therethrough and it is also required to be insoluble into and stable to the electrolyte solution. The separator is preferred to be constituted by a nonwoven fabric or a memberane having a micropore structure, made of glass, a polyolefin such as polypropylene, polyethylene or the like, or a fluororesin. Alternatively, the separator may be constituted by a metal oxide film or a resin film combined with a metal oxide, respectively having a plurality of micropores. In a preferred embodiment, the separator is constituted by a multilayered metal oxide film. In this case, the separator effectively prevents a dendrite from passing therethrough and because of this, occurrence of internal-shorts between the anode and the cathode is desirably prevented. Besides, the separator may be constituted by an incombustible material such as a fluororesin film, a glass member or a metal oxide film. In this case, the safety can be more improved.

[Shape and Structure of Rechargeable Battery]

The rechargeable battery of the present invention may be in the form of a flat round shape, a cylindrical shape, a prismatic shape, or a sheet-like shape. The structure of the rechargeable battery of the present invention may takes a single layer structure, a spiral-wound cylindrical structure, or the like. In the case where the rechargeable battery is of a spiral-wound cylindrical structure, the anode, separator, and cathode are arranged in the named order and they are spiral-wound and because of this, it has advantages such that the battery area can be increased as desired and a high electric current can be flown upon charging and discharging. In the case where the rechargeable battery is of a prismatic structure or a single layer structure, there is an advantage in that the space of a device for housing the rechargeable battery can be effectively utilized.

In the following, the shape and structure of a rechargeable battery of the present invention will be detailed with reference to FIGS. 3 and 4.

Figure 3:
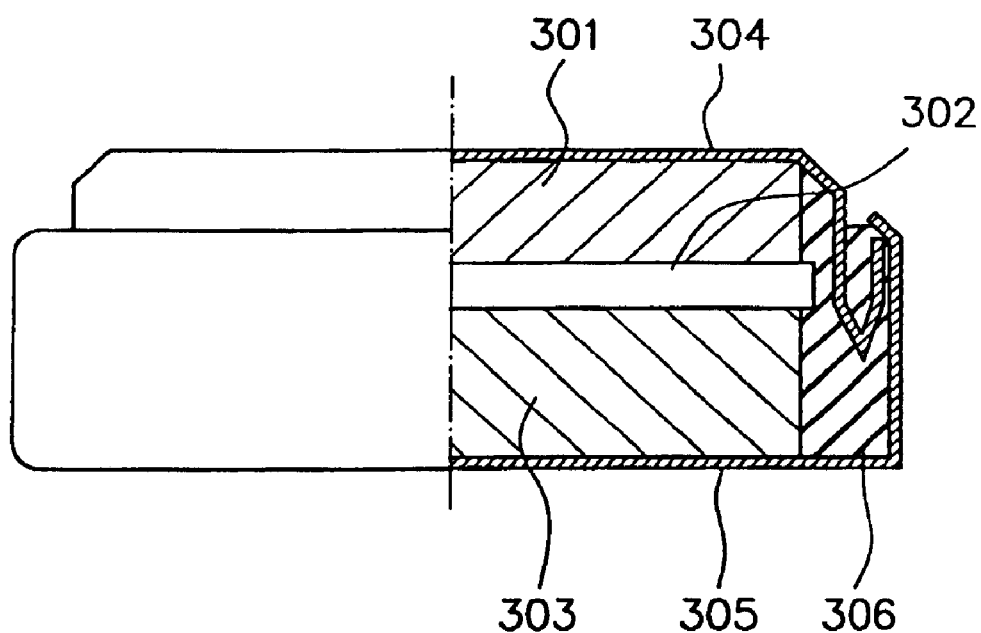
FIG. 3 is a schematic cross-sectional view illustrating an example of a single-layer structure type flat battery according to the present invention.

FIG. 3 is a schematic cross-sectional view illustrating an example of a single-layer flat round type (coin type) rechargeable battery according to the present invention. FIG. 4 is a schematic cross-sectional view illustrating an example of a spiral-wound cylindrical type rechargeable battery according to the present invention.

Figure 4:
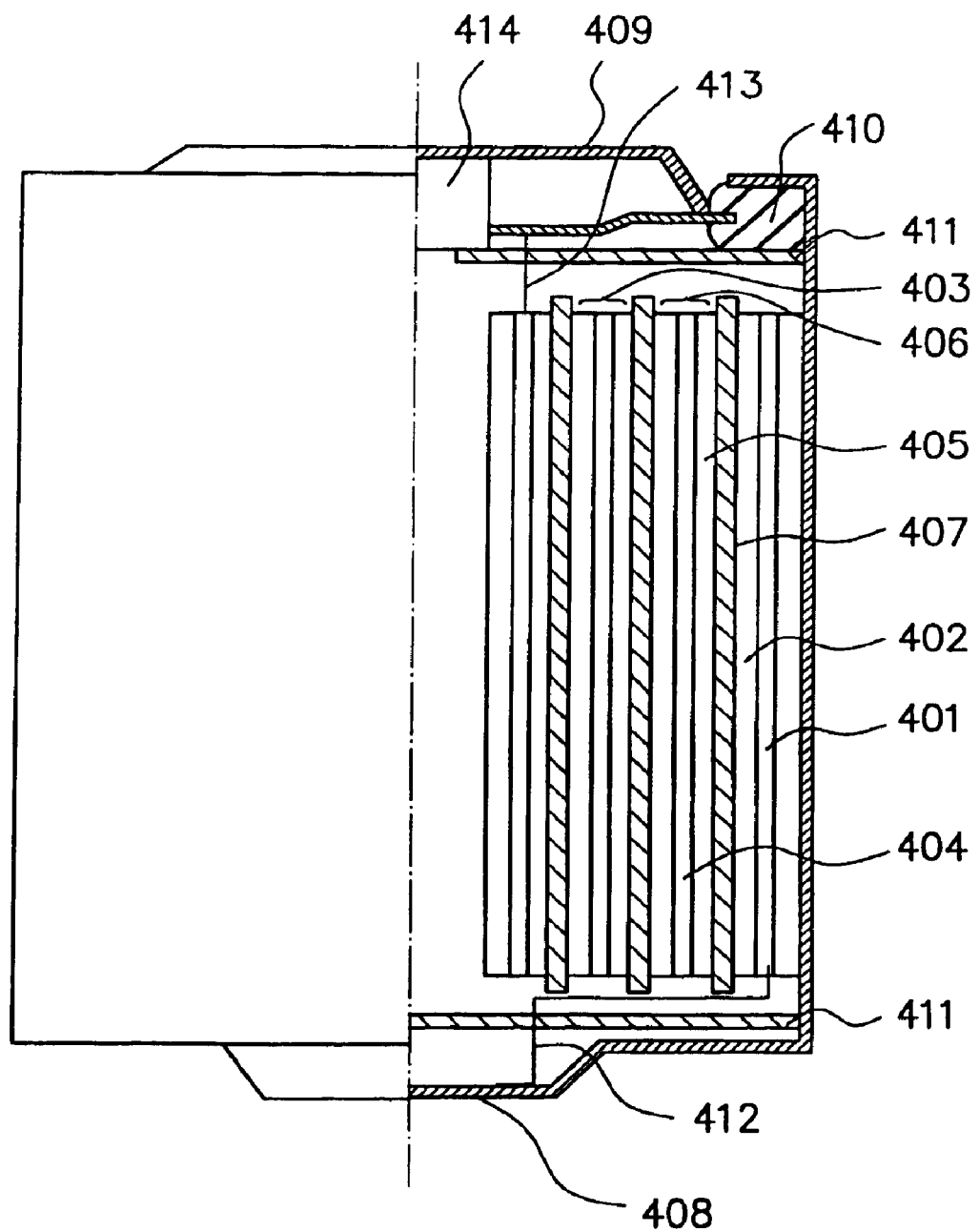
FIG. 4 is a schematic cross-sectional view illustrating an example of a spiral-wound cylindrical battery according to the present invention.

In FIGS. 3 and 4, each of reference numerals 301 and 403 indicates an anode, each of reference numerals 303 and 406 a cathode, each of reference numerals 304 and 408 an anode terminal (an anode cap or an anode can), each of reference numerals 305 and 409 a cathode terminal (a cathode can or a cathode cap), each of reference numerals 302 and 407 an ion conductor, each of reference numerals 306 and 410 a gasket, reference numeral 401 an anode collector, reference numeral 404 a cathode collector, reference numeral 411 an insulating plate, reference numeral 412 an anode lead, reference numeral 413 a cathode lead, and reference numeral 414 a safety vent.

In the flat round type (coin type) rechargeable battery shown in FIG. 3, the cathode 303 having a cathode material (active material) layer and the anode 301 having an anode material (active material) layer are stacked through the ion conductor 302 comprising a separator having at least an electrolyte solution retained therein to form a stacked body, and this stacked body is accommodated in the cathode can 305 as the cathode terminal from the cathode side, where the anode side is covered by the anode cap 304 as the anode terminal. And the gasket 306 is disposed in the remaining space of the cathode can.

In the spiral-wound cylindrical type rechargeable battery shown in FIG. 4, the cathode 406 having a cathode material (active material) layer 405 formed on the cathode collector 404 and the anode 403 having an anode material (active material) layer 402 formed on the anode collector 401 are opposed to each other through the ion conductor 407 comprising a separator having at least an electrolyte solution retained therein, and wound in multiple to form a stacked body having a multi-wound cylindrical structure. The stacked body having the cylindrical structure is accommodated in the anode can 408 as the anode terminal. The cathode cap 409 as the cathode terminal is provided on the opening side of the anode can 408, and the gasket 410 is disposed in the remaining space of the anode can. The electrode stacked body of the cylindrical structure is isolated from the cathode cap side through the insulating plate 411. The cathode 406 is electrically connected to the cathode cap 409 through the cathode lead 413. The anode 403 is electrically connected to the anode can 408 through the anode lead 412. The safety vent 414 for adjusting the internal pressure of the battery is provided on the cathode cap side.

In the above, each of the active material layer of the anode 301 and the active material layer 402 of the anode 403 comprises a layer comprising the foregoing amorphous alloy particulate of the present invention.

In the following, description will be made of an example of a process for fabricating a rechargeable battery having such configuration as shown in FIG. 3 or FIG. 4.

(1) A combination comprising the separator (302, 407) interposed between the anode (301, 403) and the cathode (303, 406) is positioned in the cathode can (305) or the anode can (408).

(2) The electrolyte is introduced thereinto, and the resultant is assembled with the anode cap (304) or the cathode cap (409) and the gasket (306, 410).

(3) The assembled body obtained in the step (2) is subjected to a caulking treatment, whereby the rechargeable battery is completed.

In the battery production, the preparation of the materials of the rechargeable lithium battery and the assembly of the battery are desired to be conducted in a dry air atmosphere whose moisture having been sufficiently removed or in a dry inert gas atmosphere.

Description will be made of the members used in the fabrication of the above rechargeable battery.

[Insulating Packing]

The gasket (306, 410) may be constituted by a fluororesin, a polyamide resin, a polysulfone resin, or a rubber material. The sealing of the battery may be conducted by way of glass-sealing, sealing using an adhesive, welding or soldering, besides the caulking using the insulating packing shown in the case shown in FIG. 3 or FIG. 4.

The insulating plate shown in FIG. 4 may be constituted by a material selected from organic resin materials and ceramics.

[Battery Housing]

The battery housing comprises the cathode can or the anode can (305, 408), and the anode cap or the cathode cap (304, 409). Such battery housing preferably comprises a stainless steel sheet. Besides, it may comprise a titanium clad stainless steel sheet, a copper clad stainless steel sheet or a nickel plating steel sheet.

In the case of FIG. 3, the cathode can (305) also functions as the battery housing, and in the case of FIG. 4, the anode can (408) also functions as the battery housing, and therefore, the battery housing in each case is desired to comprise a stainless steel. However, in the case where neither the cathode can nor the anode can also functions as the battery housing, a battery housing comprising said stainless steel, a metallic material of iron or zinc, a plastic material of polypropylene or the like, or a composite material comprising a metallic material or a glass fiber and a plastic material may be used.

[Safety Vent]

In the rechargeable battery, a safety vent may be provided in order to ensure the safety when the internal pressure in the battery is increased. The safety vent may comprise a rubber, a spring, a metal ball or a rupture foil.

In the following, the present invention will be described in more detail with reference to examples. However, the scope of the present invention is not restricted to these examples.

EXAMPLE 1

1. Preparation of an alloy powder (particulate) as an anode constituting material:

A powdery Sn material having an average particle size of 10 $\mu$m and a powdery Co material having an average particle size of 3 $\mu$m were mixed at an elemental ratio of 20:80 to obtain a mixture. 100 g of the resultant mixture and 12 Kg of chrome-made rigid balls having a diameter of 19 mm were introduced into a vessel with a volume of 3 liters made of a chrome steel (comprising 85% Fe-12% Cr-2.1% C-0.3% Si-0.3% Mn) provided in a vibration mill Model MB-1 (produced by Chuoh Kakohki Kabusiki Kaisha), where the inside atmosphere of the vessel was substituted by argon gas, and the vibration mill was operated for 10 hours to obtain a Sn—Co alloy powder.

A sample of the resultant alloy powder was subjected to composition analysis by way of X-ray microanalysis (XMA) and inductively coupled plasma emission analysis (ICP). In the ICP analysis, there was measured only 0.4 atomic % of an impurity principally comprising Fe. In this connection, the resultant alloy powder was found to be of a composition comprising substantially the starting materials.

Separately, using a HORIBA laser scattering particle size distribution analyzer LA-920 (produced by Kabusiki Kaisha Horiba Seisakusho), an sample of the resultant alloy powder was subjected to analysis with respect to its particle size distribution by dispersing said sample in water through ultrasonic irradiation. As a result, the resultant alloy powder was found to have an average particle size of 1.9 $\mu$m.

Further, using a X-ray diffraction device RINT 2000 (produced by Kabusiki Kaisha RIGAKU), a sample of the resultant alloy powder was subjected to wide angle X-ray diffraction analysis using K$\alpha$-rays of Cu as a radiation source, which gave peaks having a widened half width appeared in a region of $2\theta=25°$ to $50°$. And there were observed two main peaks one at $2\theta=30.2°$ and another at $2\theta=43.6°$ in the X-ray diffraction chart, having a half width of $1.3°$ and that of $1.8°$, respectively. The presence of these peaks having a wide half width indicates that the resultant alloy powder has amorphous phase. And calculation was carried out on the basis of the half widths and the diffraction angles of these peaks and in accordance with the foregoing Scherrer's equation. As a result, there were obtained a crystallite size of 65 Å and another crystallite size of 49 Å.

The results obtained are collectively shown in Table 1.

2. Preparation of an Electrode Structural Body:

91% by weight of the alloy powder obtained in the above, 4% by weight of a graphite powder as an electrically conductive auxiliary, 2% by weight of carboxymethyl cellulose, 3% by weight of polyvinyl alcohol, and ion exchanged water as a solvent were mixed and stirred to obtain a paste-like product. The paste-like product was applied on each of opposite sides of a copper foil having a thickness of 18 $\mu$m as a collector, followed by drying. The resultant was subjected to press-forming by means of a roll pressing machine. Thus, there was obtained an electrode structural body having a 40 $\mu$m thick electrode material layer with a density of about 2.6 g/cc formed on each of the opposite sides.

3. Preparation of a Rechargeable Battery:

In this example, there was prepared a rechargeable lithium battery of an AA-size [13.9 mm (diameter)×50 mm (thickness)], having such configuration shown in FIG. 4.

In the following, description will be made of procedures of preparing respective constituent members of the battery, starting from the preparation of an anode.

(1). Preparation of Anode 403:

The electrode structural body obtained in the above step 2 was cut to have a prescribed size. To the collector of the resultant, a lead comprising a nickel foil tub was connected by way of spot-welding. Thus, there was obtained an anode 403.

(2). Preparation of Cathode 406:

(i). Lithium carbonate and cobalt carbonate were mixed at a mol ratio of 1:2 to obtain a mixture. The mixture was subjected to heat treatment using an air stream of 800° C. to obtain a powdery Li—Co oxide material.

(ii). The powdery Li—Co oxide material obtained in the above (i) was mixed with 3 wt. % of a powdery carbonous material of acetylene black and 5 wt. % of a powdery polyvinylidene fluoride to obtain a mixture. The mixture was added with N-methyl-2-pyrroidone, followed by being stirred, to obtain a paste-like product.

(iii). The paste-like product obtained in the above (ii) was applied on an aluminum foil as a collector 404, followed by drying, to form a cathode active material layer 405 on the collector 404. The cathode active material layer 405 formed on the collector was subjected to press-forming by means of a roll pressing machine, whereby the thickness of the cathode active material layer was adjusted to be 90 μm. The resultant was cut to have a prescribed size, followed by connecting a lead comprising an aluminum foil tub to the collector by means of an ultrasonic welding machine, and dried at 150° C. under reduced pressure. Thus, there was obtained a cathode 406.

(3). Preparation of an Electrolyte Solution:

(i). Ethylene carbonate (EC) whose moisture having been sufficiently removed and dimethyl carbonate (DMC) whose moisture having been sufficiently removed were mixed at an equivalent mixing ratio, to obtain a solvent.

(ii). 1 M (mol/1) of lithium tetrafluoroborate ($LiBF_4$) was dissolved in the solvent obtained in the above (i) to obtain an electrolyte solution.

(4). Provision of a Separator:

There was provided a separator comprising a 25 μm thick polyethylene member having a number of micropores. By introducing the electrolyte solution at a later stage, the electrolyte solution becomes to retain in the micropores of the separator, where the separator having the electrolyte solution therein functions as the ion conductor 407.

(5). Fabrication of a Rechargeable Battery:

The fabrication of a rechargeable battery was conducted in a dry atmosphere controlled with respect to moisture with a dew point of less than −50° C.

(i). The separator was sandwiched between the anode and the cathode such that the separator was partly protruded at each end side, followed by spirally winding about a given axis so as to form a structure of the separator/the cathode/the separator/the anode/the separator. The resultant was inserted in an anode can 408 made of a titanium clad stainless steel.

(ii). The anode lead 412 was spot-welded to a bottom portion of the anode can 408. Then, a necking was formed at an upper portion of the anode can by means of a necking apparatus, and the cathode lead 413 was welded to the cathode cap 409 provided with a gasket 410 made of polypropylene by means of an ultrasonic welding machine.

(iii). The electrolyte solution was introduced into the resultant obtained in the above (ii), followed by putting the cathode cap 409 thereon, and the cathode cap 409 and the anode can 408 were caulked by a caulking machine. Thus, there was prepared a rechargeable lithium battery.

This rechargeable battery was made to be of an anode capacity-controlled type in that the cathode capacity was made to be larger than the anode capacity.

Evaluation of Battery Characteristics

For the rechargeable lithium battery obtained in this example, evaluation was conducted with respect to battery characteristics, i.e., battery capacity, charge-and-discharge Coulombic efficiency, charging and discharging cycle life, obtained by performing alternately charging and discharging, in the following manner.

(1). Capacity Test:

The capacity test was conducted through the following charging and discharging cycle test. That is, a cycle in that charging is performed for 10 hours wherein first charging is performed with a constant electric current of a value of 0.1 C (an electric current of 0.1 time a value of capacity/time) obtained on the basis of an electric capacitance calculated from the cathode active material of the rechargeable lithium battery, when the battery voltage reaches 4.2 V, the first charging is terminated, followed by performing second charging with a constant voltage of 4.2; a pause for 10 minutes is taken; then discharging is performed with a constant electric current of aforesaid value of 0.1 C (the electric current of 0.1 time the value of the capacity/the time) until the battery voltage reaches 2.8 V; and a pause for 10 minutes is taken, was repeated three times. The battery capacity was evaluated on the basis of a value obtained from a discharged electricity quantity provided in the third cycle.

(2). Charge-and-Discharge Coulombic Efficiency:

The charge-and-discharge Coulombic efficiency was obtained in the following manner. That is, a proportion of the discharged electricity quantity to the charged electricity quantity in the above capacity test was calculated. The resultant proportion value was made to be a charge-and-discharge Coulombic efficiency for the battery.

(3). Charging and Discharging Cycle Life:

The charging and discharging cycle life was evaluated in the following manner. The charging and discharging cycle test was conducted by repeating a cycle of alternately performing charging and discharging with a constant electric current of 0.5 C (an electric current of 0.5 time a value of the capacity/the time) on the basis of the discharged electricity quantity in the third cycle in the above capacity test and taking a pause for 10 minutes. And the number of the charging and discharging cycles when the initial battery capacity became less than 60% was made to be a charging and discharging cycle life for the battery.

In the above evaluation, the cut-off voltage upon the charging was made to be 4.5 V, and that upon the discharging was made to be 2.5 V.

The evaluated results obtained in the above are collectively shown in Table 1.

EXAMPLE 2 TO 6 AND REFERENCE EXAMPLES 1 AND 2

As shown in Tables 1 and 2, there were prepared a plurality of Sn—Co alloy powders in the same manner as in Example 1, except for changing the elemental ratio of the powdery Sn material and the powdery Co material in each case.

Using each of the Sn—Co alloy powders obtained in the above and in accordance with the procedures of Example 1, there were prepared a plurality of anodes, and using each of the resultant anodes, there were prepared a plurality of rechargeable lithium batteries.

For each of the resultant rechargeable lithium batteries, evaluation was conducted with respect to battery capacity, charge-and-discharge Coulombic efficiency, and charging and discharging cycle life, obtained by performing alternately charging and discharging, in the same manner as in Example 1.

Figure 5:
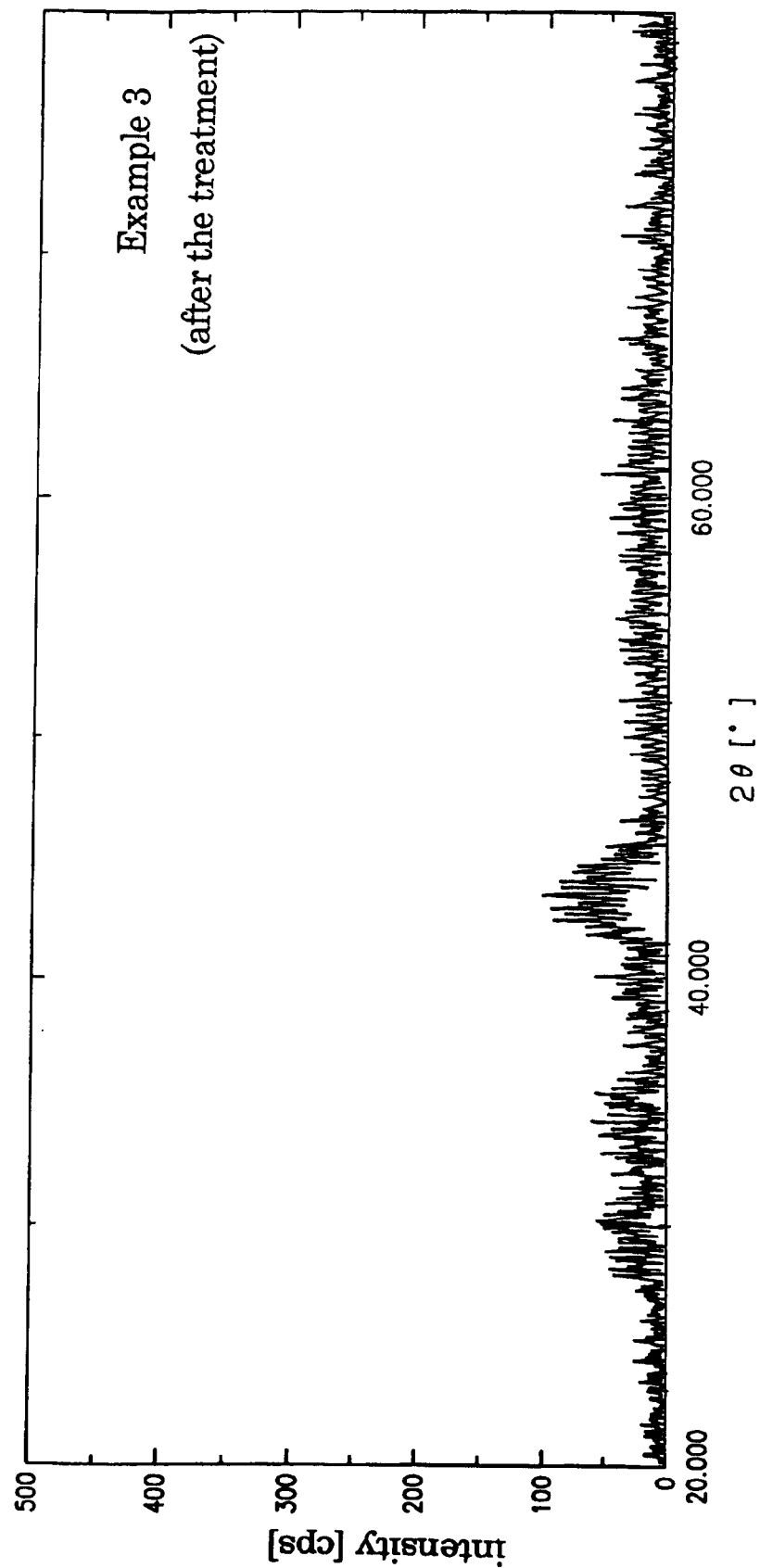
FIG. 5 shows a X-ray diffraction chart after the treatment by a vibration mill in Example 3 which will be later described.
Figure 6:
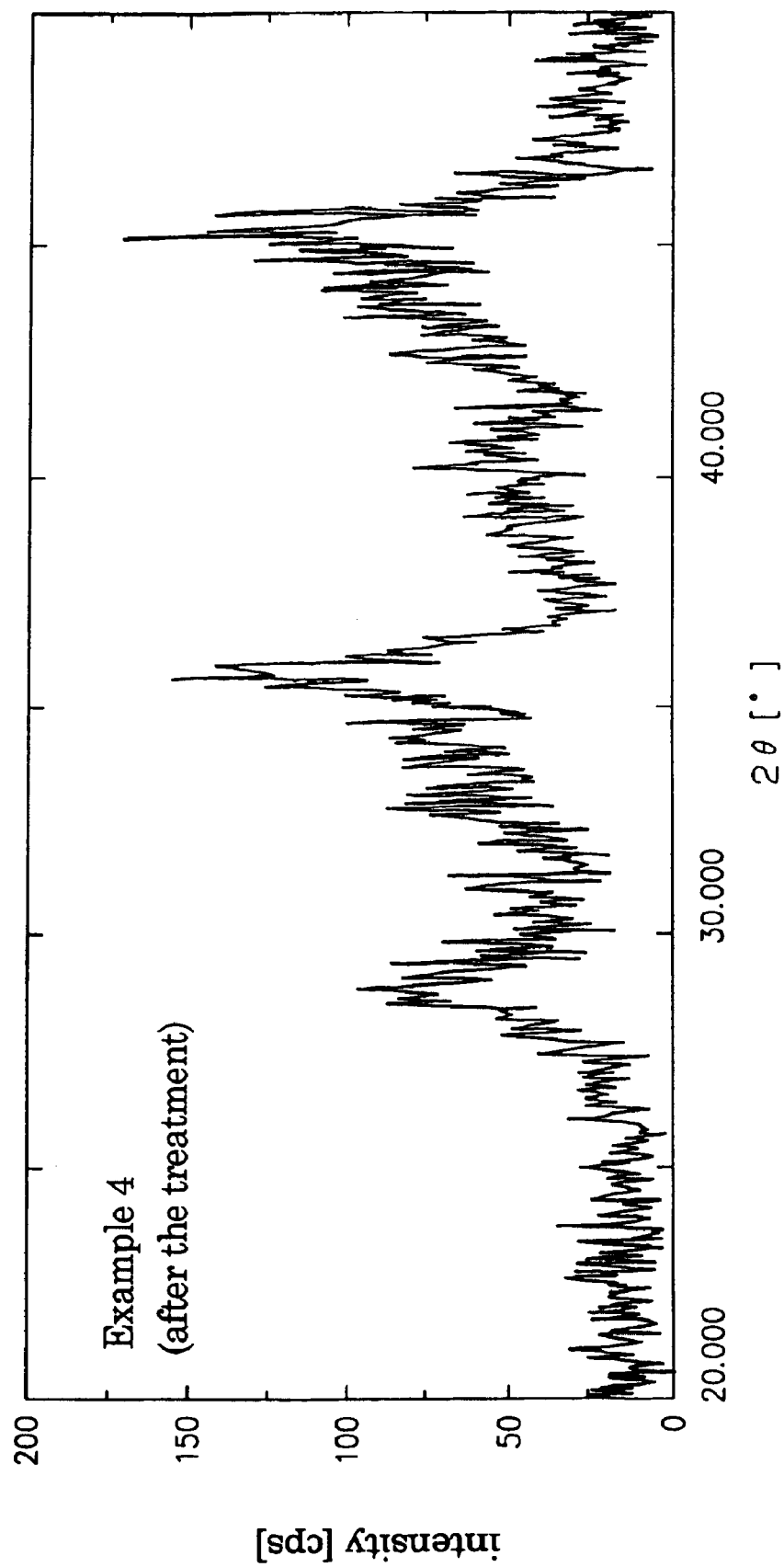
FIG. 6 shows a X-ray diffraction chart after the treatment by a vibration mill in Example 4 which will be later described.
Figure 7:
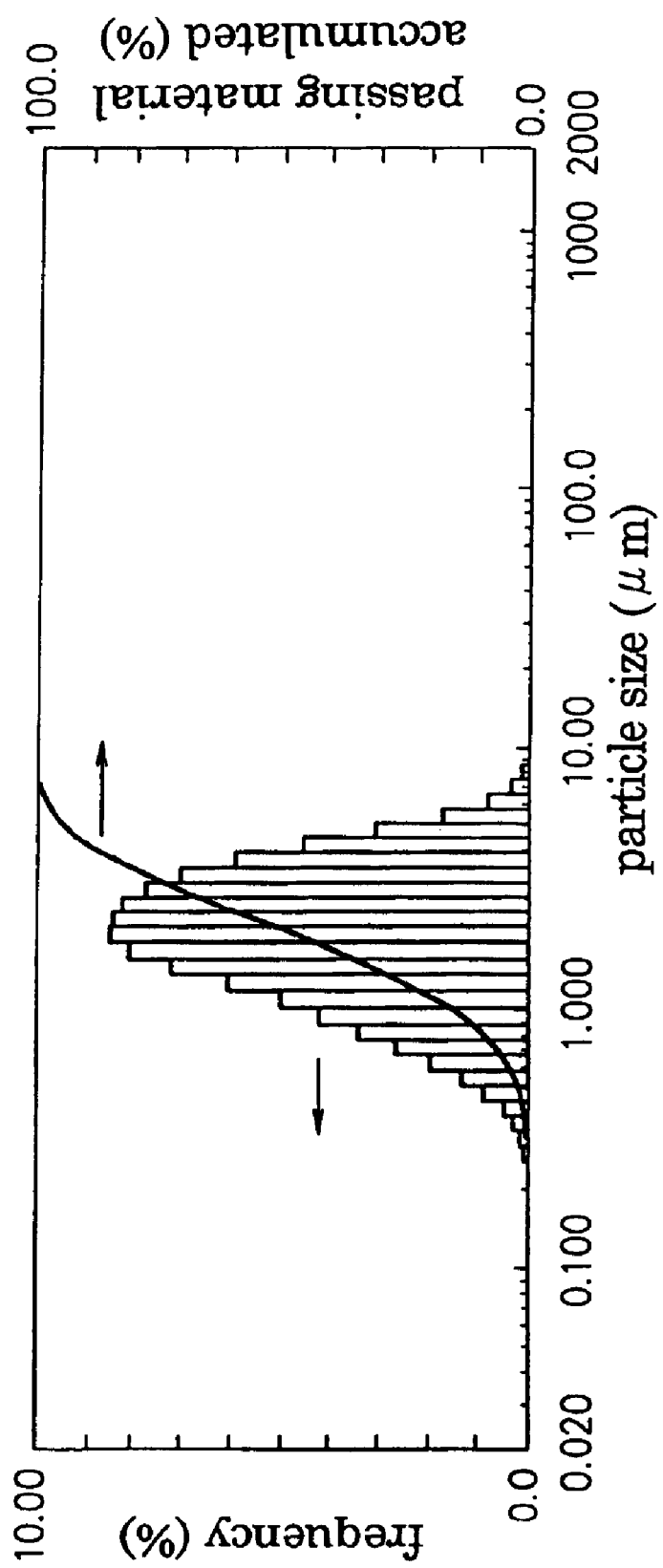
FIG. 7 is a graph showing a particle size distribution of a powdery amorphous Sn—Co alloy prepared in Example 4 which will be later described.

FIG. 5 shows a X-ray diffraction chart after the treatment by the vibration mill in Example 3. FIG. 6 shows a X-ray diffraction chart after the treatment by the vibration mill in Example 4. FIG. 7 is a graph showing a particle size distribution of the amorphous Sn—Co alloy powder prepared in Example 4. From this graph, it is understood that the alloy powder is of an average particle size (an median size) of about 2 μm.

The results measured in the same manner as in Example 1 are collectively shown in Tables 1 and 2. In Tables 1 and 2, there are shown Sn contents of the respective alloy powders.

Tables 1 and 2 illustrate the compositions and the X-ray diffraction data of the amorphous Sn—Co alloy powders prepared in Examples 1 to 6 and Reference Examples 1 and 2, the capacities of the anodes prepared using said alloy powders which were obtained through the capacity test, the charge-and-discharge Coulombic efficiencies and the charging and discharging cycle lives of the rechargeable lithium batteries respectively prepared using each of said anodes and the cathode prepared using the Li—Co oxide material ($LiCoO_2$).

From the results shown in Table 1, there were obtained findings that in the case of a rechargeable lithium battery in which a given amorphous Sn-containing alloy powder is used as the anode active material (the anode material), the charge-and-discharge Coulombic efficiency and the charging and discharging cycle life are increased as the Sn content is increased; but when the Sn content is excessive, the grinding treatment time required for the amorphization of the material involved is prolonged, where the amorphization is not readily occurred, and the charging and discharging cycle life of the battery is decreased.

In consideration of the charge-and-discharge Coulombic efficiency, the charge-and-discharge capacity, and the charging and discharging cycle life, it is understood that the Sn content is preferably in a range of from 20 atomic % to 80 atomic %, more preferably in a range of from 30 atomic % to 70 atomic %.

Separately, although not shown here, for alloys of tin element with other transition metal element(s) than cobalt element, there were obtained similar results.

TABLE 1

| $Sn_x$—$Co_y$ | Reference Example 1 | Example 1 | Example 2 | Example 3 |
|---|---|---|---|---|
| composition x | 18 | 20 | 30 | 42.8 |
| y | 82 | 80 | 70 | 57.2 |
| preparation condition | vibration mill | vibration mill | vibration mill | vibration mill |
| treatment time (h) | 10 h | 10 h | 15 h | 15 h |
| 2 θ of peak 1 (deg.) | 30.4 | 30.2 | 30.1 | 30.1 |
| half width of peak 1 (deg.) | broad | 1.3 | 1.5 | 1.8 |
| crystallite size of peak 1 (Å) | ~0 | 65 | 57 | 47 |
| 2 θ of peak 2 (deg.) | 43.6 | 43.6 | 43.6 | 43.6 |
| half width of peak 2 (deg.) | 1.8 | 1.8 | 2.0 | 2.4 |
| crystallite size of peak 2 (Å) | 49 | 49 | 45 | 38 |
| charge-and-discharge efficiency (1st cycle) | 32 | 53 | 67 | 67 |
| charge-and-discharge efficiency (3rd cycle) | 91 | 93 | 97 | 97 |
| discharged capacity (mAh/g) | 130 | 190 | 220 | 240 |
| normalized charging and discharging cycle life | 1.0 | 2.5 | 2.8 | 2.9 |

TABLE 2

| $Sn_x$—$Co_y$ | Example 4 | Example 5 | Example 6 | Reference Example 2 |
|---|---|---|---|---|
| composition x | 61 | 70 | 80 | 82 |
| y | 39 | 30 | 20 | 18 |
| preparation condition | vibration mill | vibration mill | vibration mill | vibration mill |
| treatment time (h) | 30 h | 30 h | 45 h | 45 h |
| 2 θ of peak 1 (deg.) | 35.3 | 35.3 | 35.3 | 30.4 |
| half width of peak 2 (deg.) | 1.0 | 0.9 | 0.8 | 0.6 |
| crystallite size of peak 1 (Å) | 92 | 97 | 108 | 143 |
| 2 θ of peak 2 (deg.) | 44.8 | 44.7 | 43.6 | 43.6 |
| half width of peak 2 (deg.) | 1.6 | 1.3 | 1.0 | 0.7 |
| crystallite size of peak 2 (Å) | 58 | 69 | 89 | 128 |
| charge-and-discharge efficiency (1st cycle) | 82 | 82 | 84 | 85 |
| charge-and-discharge efficiency (3rd cycle) | 98 | 98 | 99 | 98 |
| discharged capacity (mAh/g) | 380 | 400 | 410 | 410 |
| normalized charging and discharging cycle life | 3.5 | 3.0 | 2.4 | 1.6 |

NOTE:
(1). As a result of the ICP analysis in any case, the contaminated impurity in the vibration mill was principally Fe in an amount of less than 0.4 atomic %.
(2). Each value of the charging and discharging cycle life is a value relative to the cycle number when the battery reached its life time in Reference Example 1, which is set at 1.0.
(3). As the vibration mill used in each case, a vibration mill model MB-1 (produced by Chuoh Kakohki Kabusiki Kaisha) was used.

EXAMPLES 7 AND 8 AND REFERENCE EXAMPLES 3 AND 4

In the following, description showing that the foregoing alloy particulate of the present invention which is suitable for use as an anode electrode material used in a rechargeable lithium battery has a substantially non-stoichiometric ratio composition will be made.

As shown in Tables 3 and 4, there were prepared a plurality of Sn—Co alloy powders in the same manner as in Example 1, except for changing the elemental ratio of the powdery Sn material and the powdery Co material in each case.

Using each of the Sn—Co alloy powders obtained in the above and in accordance with the procedures of Example 1, there were prepared a plurality of anodes, and using each of the resultant anodes, there were prepared a plurality of rechargeable lithium batteries.

For each of the resultant rechargeable lithium batteries, evaluation was conducted with respect to battery capacity, charge-and-discharge Coulombic efficiency, and charging and discharging cycle life, obtained by performing alternately charging and discharging, in the same manner as in Example 1. The evaluated results obtained are collectively shown in Tables 3 and 4 together with those obtained previous Examples 3 and 4.

Figure 8:
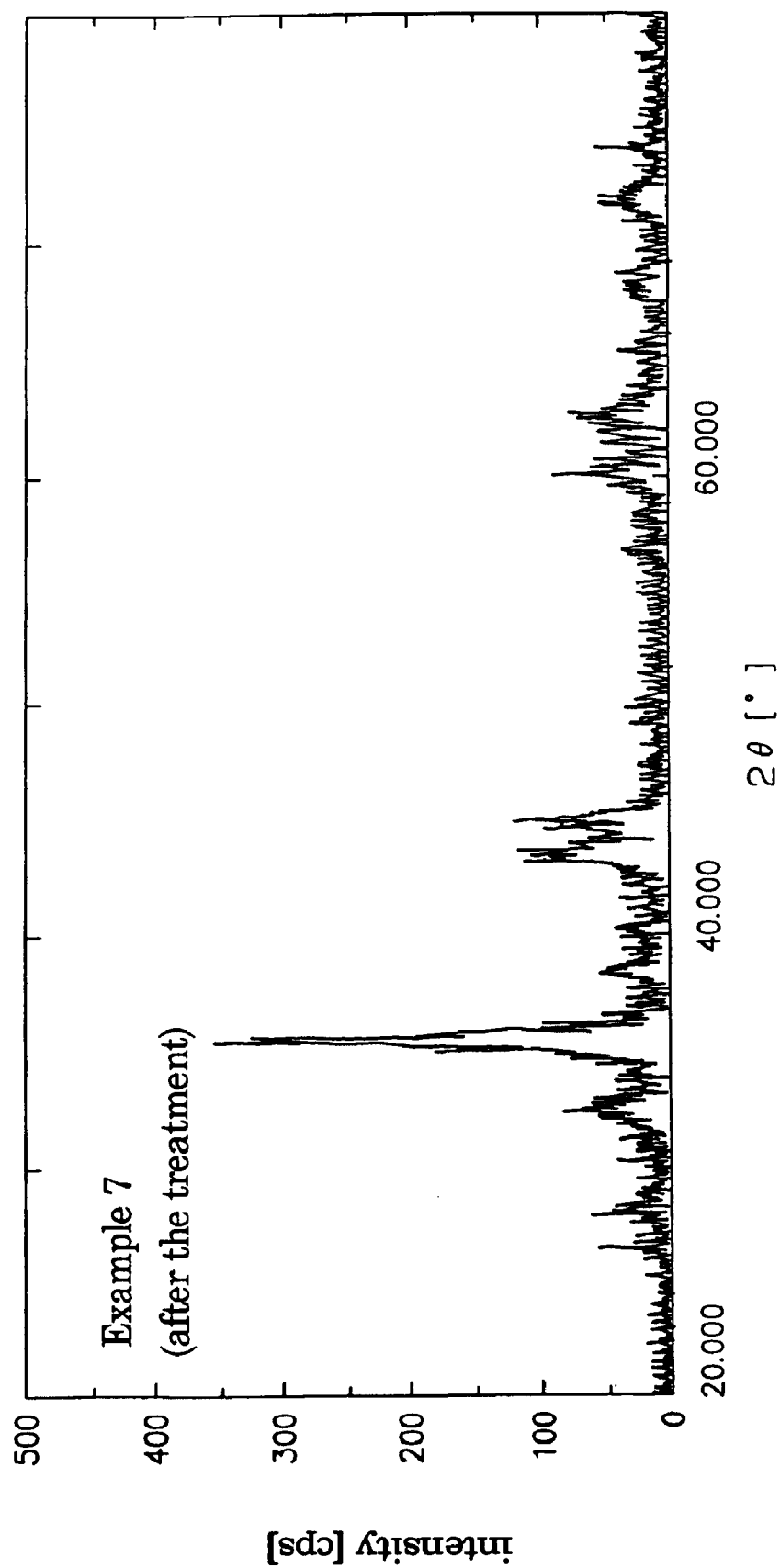
FIG. 8 shows a X-ray diffraction chart after the treatment by a vibration mill in Example 7 which will be later described.
Figure 9:
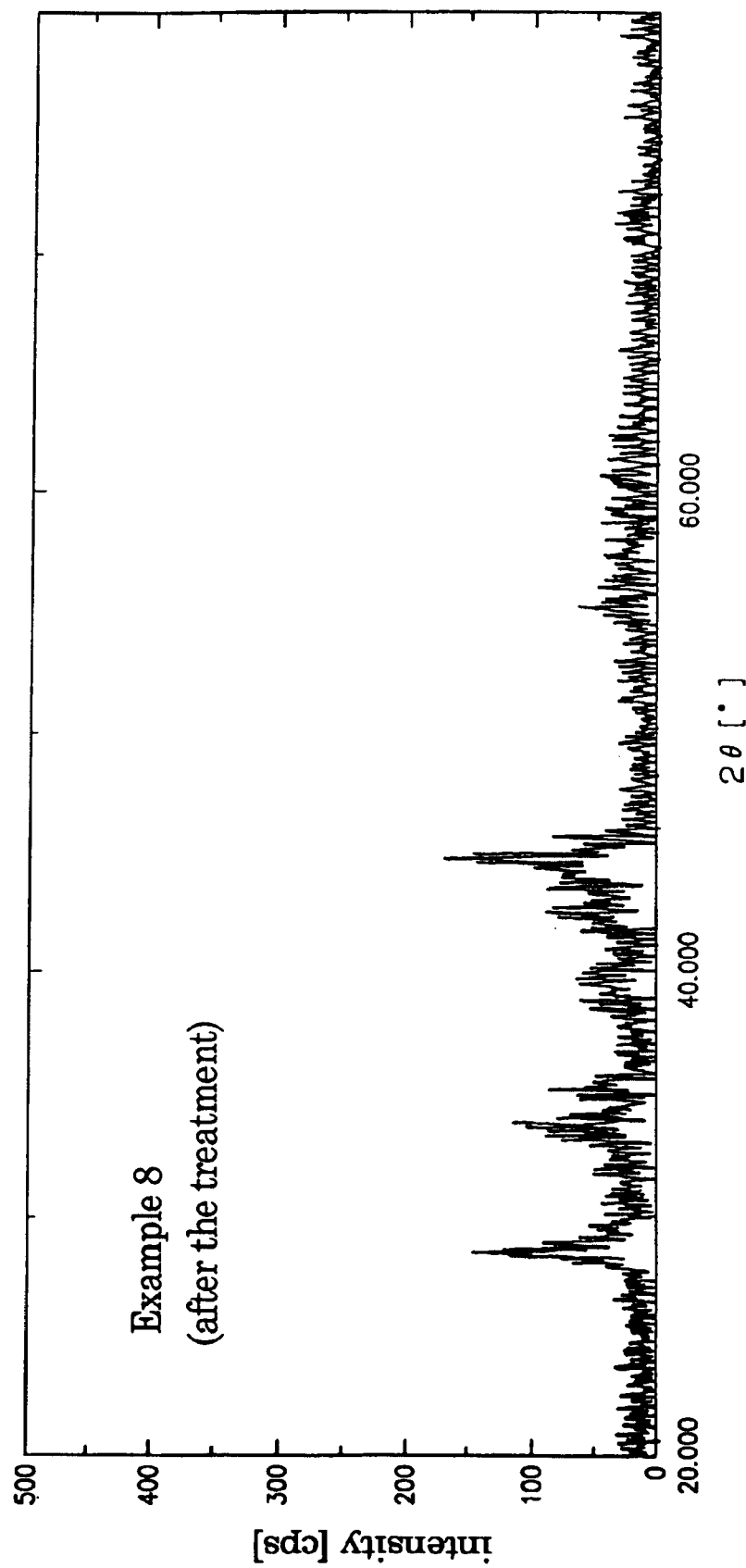
FIG. 9 shows a X-ray diffraction chart after the treatment by a vibration mill in Example 8 which will be later described.
Figure 10:
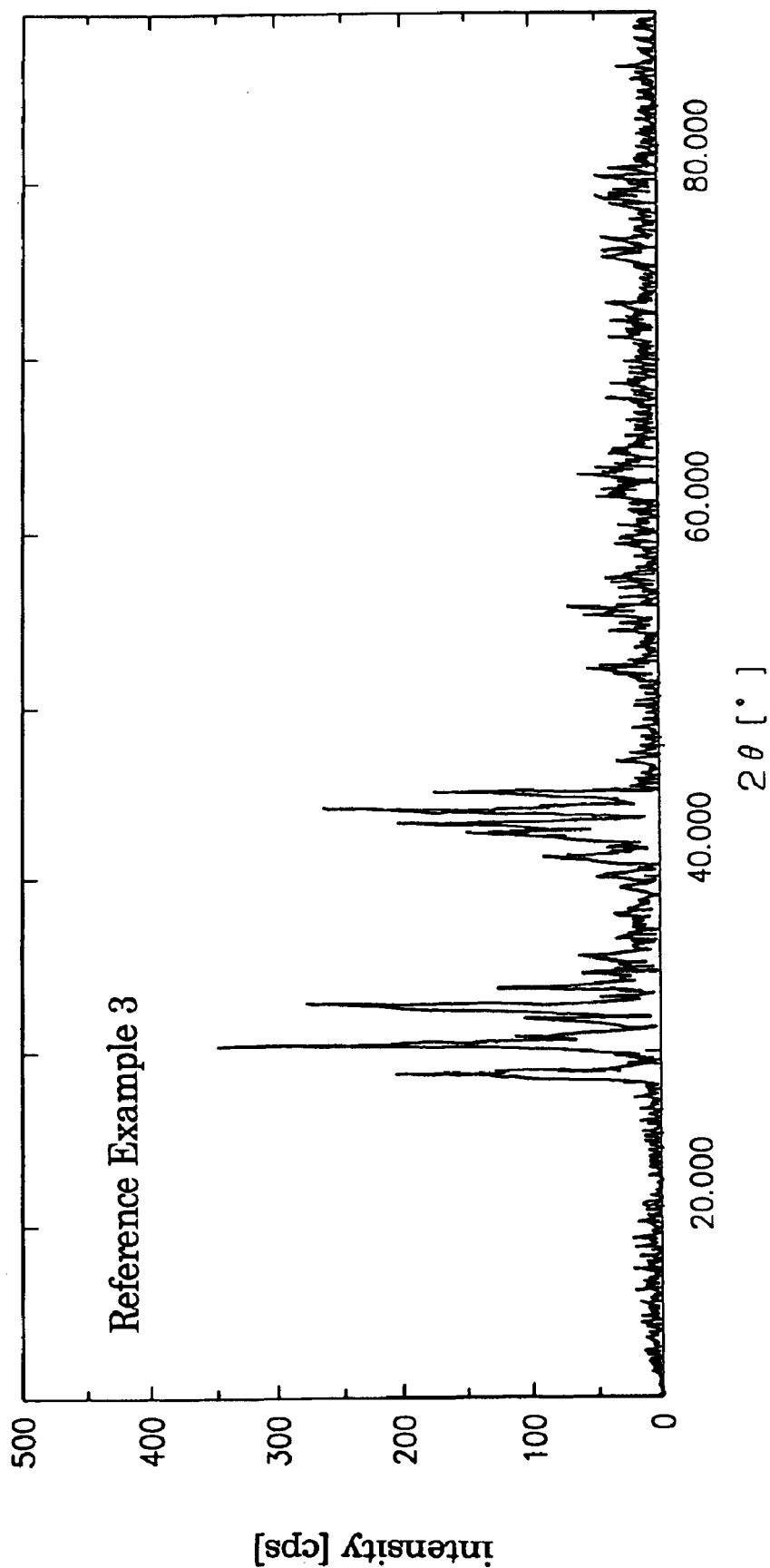
FIG. 10 shows a X-ray diffraction chart after the treatment by a gas atomizer in Reference Example 3 which will be later described.
Figure 11:
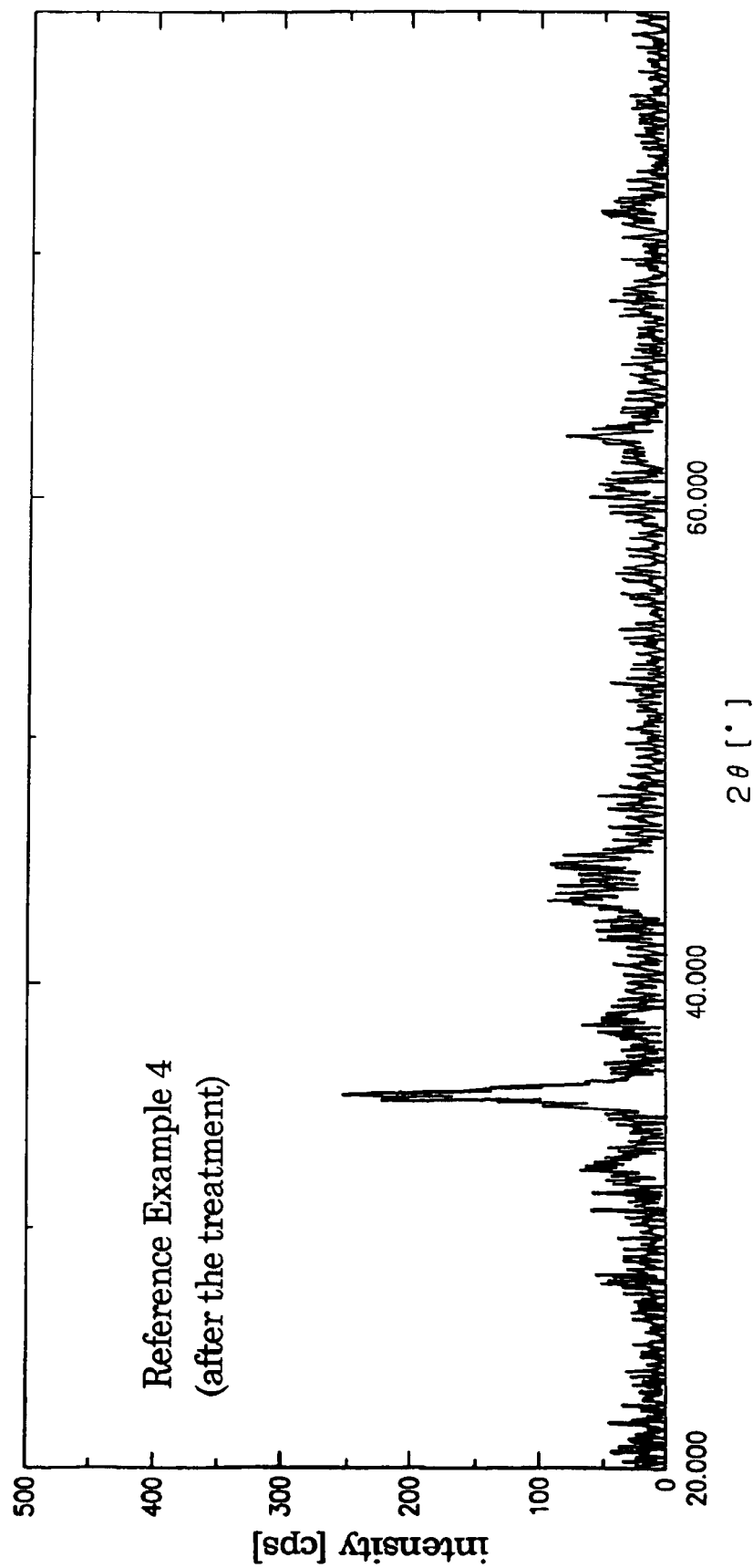
FIG. 11 shows a X-ray diffraction chart after the treatment by a vibration mill in Reference Example 4 which will be later described.

FIGS. 8 to 11 show respectively a X-ray diffraction chart for a prescribed alloy powder. Particularly, FIG. 8 shows a X-ray diffraction chart after the treatment by the vibration mill in Example 7. FIG. 9 shows a X-ray diffraction chart after the treatment by the vibration mill in Example 8. FIG. 10 shows a X-ray diffraction chart after the treatment by a gas atomizer in Reference Example 3. FIG. 11 shows a X-ray diffraction chart after the treatment by the vibration mill in Reference Example 4.

The compositions and the X-ray diffraction data obtained are collectively shown in Tables 3 and 4 together with those obtained in previous Examples 3 and 4.

Now, in Reference Example 3, a gas atomizer was used in the preparation of a metallic powder. The treatment conditions by means of the gas atomizer were as will be described in the following. A powdery Sn material having an average particle size of 10 μm and a powdery Co material having an average particle size of 3 μm were mixed at an elemental ratio of 20:80 to obtain a mixture. The mixture was introduced into the crucible of the gas atomizer. The inside of the crucible was evacuated, and it was charged with argon gas to form an atmosphere composed of the argon gas in the crucible. Then, the mixture in the crucible was fused into a molten material. The molten material was treated by way of the atomizing method using argon gas as an atomizing medium, whereby an alloy powder was obtained. The resultant alloy powder was found to have an average particle size of 7 μm.

By the way, as previously described, as for Sn—Co alloy, it is widely known that $Sn_2Co_3$, SnCo, and $Sn_2Co$ are intermetallic compounds. These intermetallic compounds are that they have a composition ratio in which the atomic ratio of Sn and Co is a simple integral ratio.

Tables 3 and 4 illustrate the compositions of the amorphous Sn—Co alloy powders prepared in Examples 3, 4, 5, 7, and 8 and Reference Examples 3 and 4, respectively having a composition ratio which is different from or substantially the same as that of the above mentioned intermetallic compound and the X-ray diffraction data of these alloy powders, the capacities of the anodes prepared using said alloy powders which were obtained through the capacity test, the charge-and-discharge Coulombic efficiencies and the charging and discharging cycle lives of the rechargeable lithium batteries respectively prepared using each of said anodes and the cathode prepared using the Li—Co oxide material ($LiCoO_2$). Now, the composition of the Sn—Co alloy powder obtained in Example 7 is of a composition ratio which is near to that of $Sn_2Co$.

From the results shown in Tables 3 and 4, there were obtained findings that the more the composition ratio is deviated from the composition ratio, i.e., the stoichiometric composition of the intermetallic compound, the more the amorphization is readily occurred; and the charging and discharging cycle life of the battery in that case is prolonged.

Separately, although not shown here, for alloys of tin element with other transition metal element(s) than cobalt element, there were obtained similar results.

TABLE 3

| $Sn_x$—$Co_y$ | Reference Example 3 | Example 7 | Example 4 |
|---|---|---|---|
| composition x | 2 | 67 | 61 |
| y | 3 | 33 | 39 |
| preparation condition | gas atomizer | vibration mill | vibration mill |
| treatment time (h) |  | 30 h | 30 h |
| 2 θ of peak 1 (deg.) | 30.4 | 35.3 | 35.3 |
| half width of peak 1 (deg.) | 0.28 | 0.53 | 0.95 |
| crystallite size of peak 1 (Å) | 307 | 166 | 92 |
| 2 θ of peak 2 (deg.) | 32.7 | 43.6 | 44.8 |
| half width of peak 2 (deg.) | 0.3 | 0.6 | 1.6 |
| crystallite size of peak 2 (Å) | 346 | 154 | 58 |
| charge-and-discharge efficiency (1st cycle) | 71 | 80 | 82 |
| charge-and-discharge efficiency (3rd cycle) | 98 | 97 | 98 |
| discharged capacity (mAh/g) | 177 | 390 | 380 |
| charging and discharging cycle life | 1.0 | 3.8 | 4.6 |

TABLE 4

| $Sn_x$—$Co_y$ | Example 8 | Reference Example 4 | Example 3 |
|---|---|---|---|
| composition x | 57.1 | 1 | 42.8 |
| y | 42.9 | 1 | 57.2 |
| preparation condition | vibration mill | vibration mill | vibration mill |
| treatment time (h) | 30 h | 15 h | 15 h |
| 2 θ of peak 1 (deg.) | 28.4 | 35.4 | 30.1 |
| half width of peak 1 (deg.) | 0.66 | 0.53 | 1.84 |
| crystallite size of peak 1 (Å) | 130 | 166 | 47 |
| 2 θ of peak 2 (deg.) | 44.7 | 44.9 | 43.6 |
| half width of peak 2 (deg.) | 0.7 | 0.7 | 2.4 |
| crystallite size of peak 2 (Å) | 136 | 137 | 38 |
| charge-and-discharge efficiency (1st cycle) | 75 | 70 | 67 |
| charge-and-discharge efficiency (3rd cycle) | 97 | 97 | 97 |
| discharged capacity (mAh/g) | 280 | 240 | 240 |
| charging and discharging cycle life | 4.6 | 2.7 | 3.7 |

NOTE:
Each value of the charging and discharging cycle life is a value relative to the cycle number when the battery reached its life time in Reference Example 3, which is set at 1.0.

EXAMPLE 9

Description will be made of amorphization of an alloy particulate as an electrode material to be used as an anode of a rechargeable lithium battery in the present invention and battery characteristics of a rechargeable lithium battery having an anode in which said electrode material is used in the present invention.

As shown in Table 5, there was prepared a Sn—Co alloy powder in the same manner as in Example 1, except for changing the elemental ratio of the powdery Sn material and the powdery Co material.

Using the Sn—Co alloy powder obtained in the above and in accordance with the procedures of Example 1, there was prepared an anode, and using the resultant anode, there was prepared a rechargeable lithium battery.

For the resultant rechargeable lithium battery, evaluation was conducted with respect to battery capacity, charge-and-discharge Coulombic efficiency, and charging and discharging cycle life, obtained by performing alternately charging and discharging, in the same manner as in Example 1. The evaluated results obtained are collectively shown in Table 5 together with those obtained previous Example 4.

Figure 12:
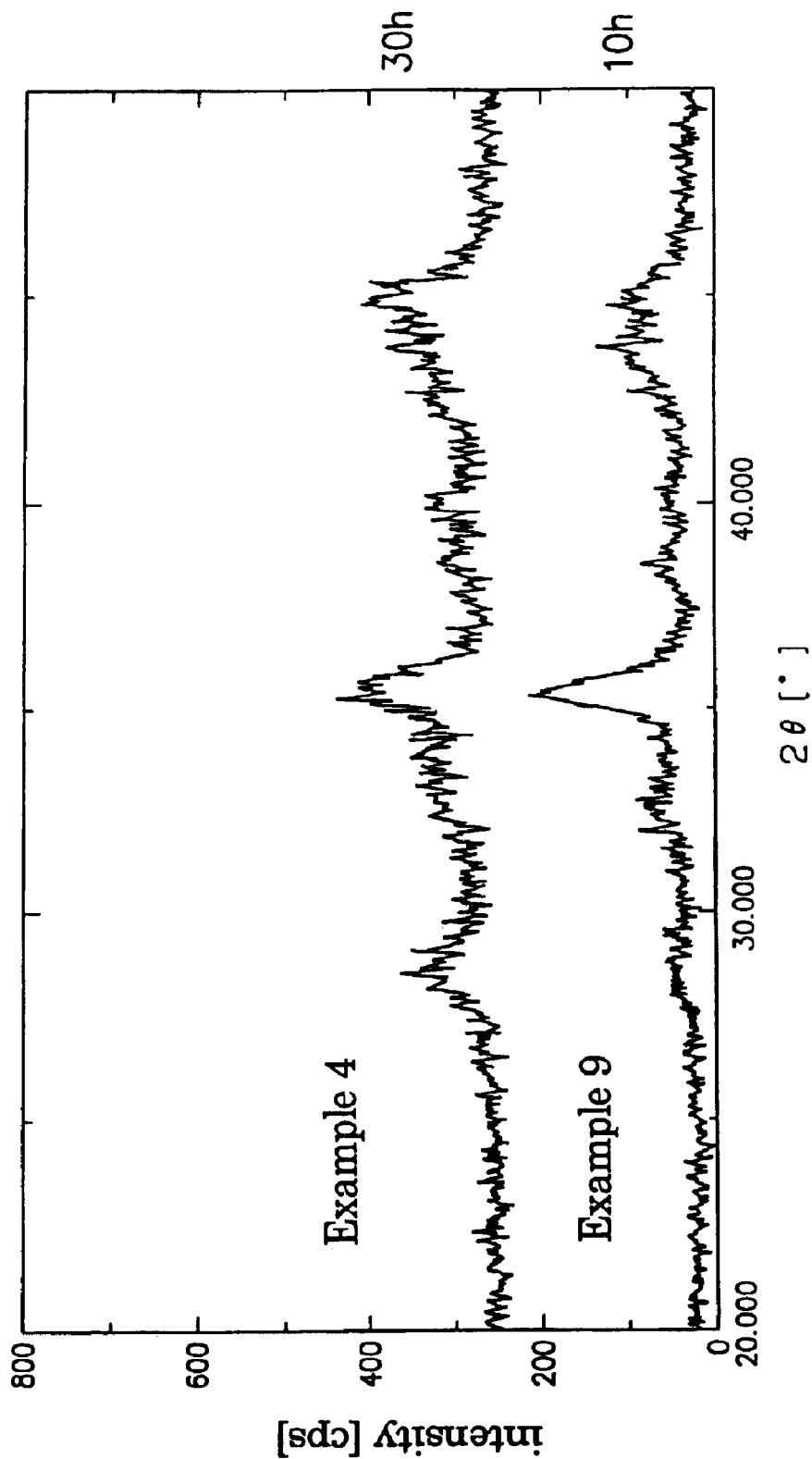
FIG. 12 collectively shows X-ray diffraction charts after the treatment by a vibration mill in Examples 4 and 9 which will be later described.

FIG. 12 collectively shows a X-ray diffraction chart for the amorphous Sn—Co alloy powder after the treatment by the vibration mill in Example 9 and a X-ray diffraction chart for the amorphous Sn—Co alloy powder after the treatment by the vibration mill in Example 4.

Table 5 collectively illustrates the amorphization level for the amorphous Sn—Co alloy powder prepared under given condition in this example (Example 9) and that for the amorphous Sn—Co alloy powder prepared under given condition in Example 4 and the battery characteristics of the rechargeable lithium batteries prepared using these alloy powders.

From the results shown in Table 5, it is understood that as long as the Sn content is substantially the same, when the amorphization of an amorphous Sn series alloy powder proceeds, the charging and discharging cycle life of a rechargeable lithium battery in which such alloy powder is used is prolonged. And it seems that the crystallite size calculated from the charging and discharging cycle and the half width of the peak 2 at a diffraction angle 2θ=42° to 45° has a stronger correlation in comparison with that in the case of the half width of the peak 1 at a diffraction angle $2\theta=28°$ to $36°$.

Separately, although not shown here, for alloys of tin element with other transition metal element(s) than cobalt element, there were obtained similar results.

TABLE 5

| $Sn_x$—$Co_y$ | Example 9 | Example 4 |
|---|---|---|
| laying-in ratio atomic ratio | Sn:Co = 61:39 | Sn:Co = 61:39 |
| composition | $Sn_{61}Co_{39}$ | $Sn_{61}Co_{39}$ |
| preparation condition | vibration mill | vibration mill |
| treatment time (h) | 10 h | 30 h |
| 2 θ of peak 1 (deg.) | 35.3 | 35.3 |
| half width of peak 1 (deg.) | 0.9 | 1.0 |
| crystallite size of peak 1 (Å) | 101 | 92 |
| 2 θ of peak 2 (deg.) | 43.6 | 44.8 |
| half width of peak 2 (deg.) | 1.0 | 1.6 |
| crystallite size of peak 2 (Å) | 87 | 58 |
| normalized charging and discharging cycle life | 1.0 | 1.7 |
| referred drawing | FIG. 12 | FIG. 12 |

NOTE:
(1). As a result of the ICP analysis in any case, the contaminated impurity was principally Fe in an amount of less than 0.4 atomic %.
(2). Each value of the charging and discharging cycle life is a value relative to the cycle number when the battery reached its life time in Example 9, which is set at 1.0.

EXAMPLES 10 AND 11

Description will be made of amorphization of an alloy particulate as an electrode material to be used as an anode of a rechargeable lithium battery in the present invention and battery characteristics of a rechargeable lithium battery having an anode in which said electrode material is used in the present invention.

As shown in Table 6, a powdery Sn material having an average particle size of 10 μm and a powdery Co material having an average particle size in a range of 1 to 3 μm were mixed at an elemental ratio of 60:40 to obtain a mixture. 5 g of the resultant mixture and 12 balls made of stainless steel and having a diameter of 15 mm were introduced into a vessel with a volume of 45 cc made of a stainless steel (comprising 85.3% Fe-18% Cr-9% Ni-2% Mn-1% Si-0.15% S-0.07% C) provided in a planetary type ball mill P-5 (produced by Fritch Company of Germany), where the inside atmosphere of the vessel was substituted by argon gas and the vessel was closed, and the treatment of the mixture by the planetary ball mill was conducted at an acceleration of 17 G for 4 hours (Example 10) and for 10 hours (Example 11). By this, there were obtained two Sn—Co alloy powders.

A sample of each of the resultant alloy powders was subjected to composition analysis by way of X-ray microanalysis (XMA). From the analyzed results by the XMA, there was obtained a finding that components of the vessel and balls of the planetary ball mill are contaminated depending upon the treatment condition.

Figure 13:
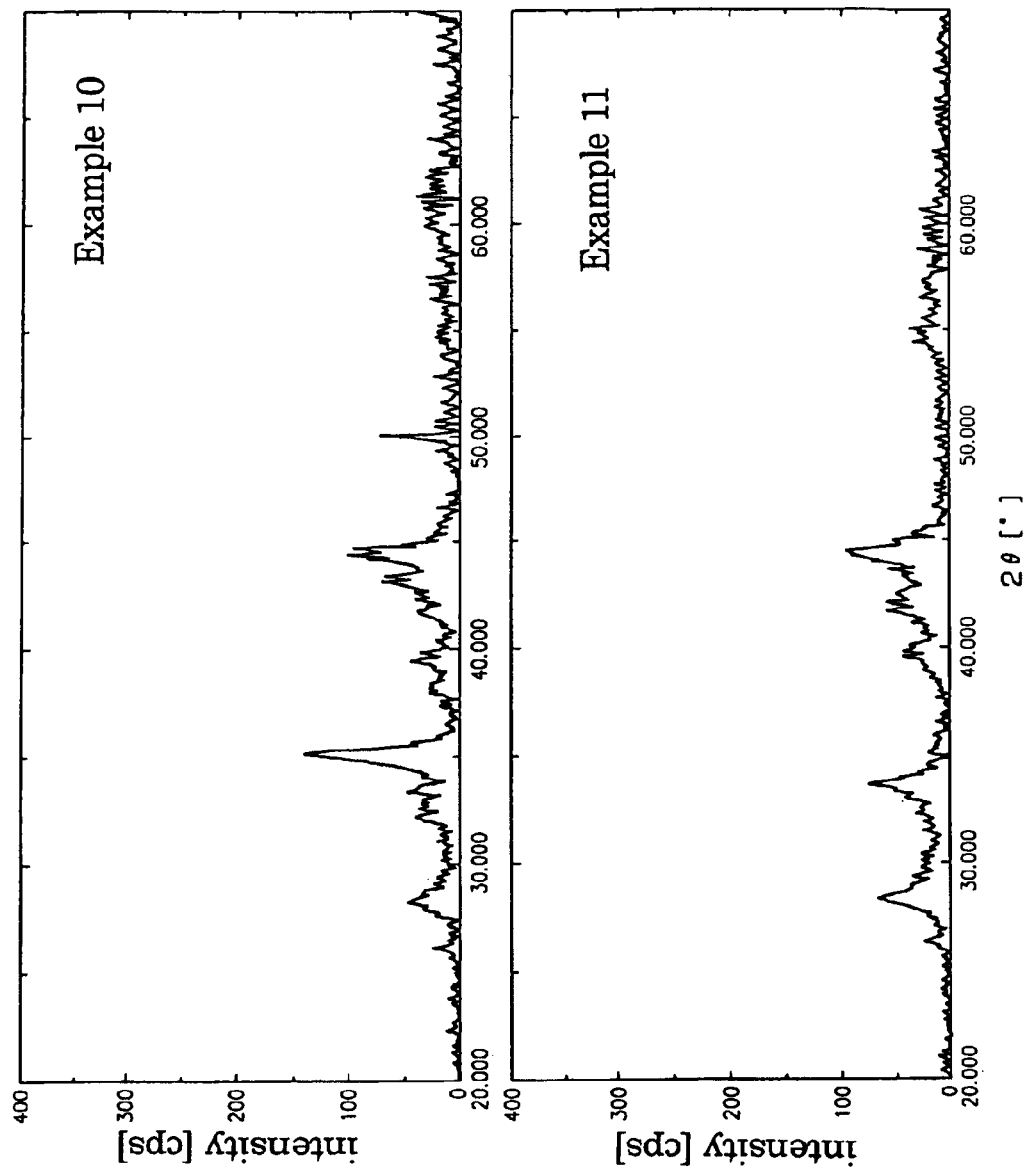
FIG. 13 collectively shows X-ray diffraction charts after the treatment by a planetary ball mill in Examples 10 and 11 which will be later described.

A sample of each of the resultant alloy powders was subjected to wide angle X-ray diffraction analysis using Kα-rays of Cu as a radiation source. FIG. 13 collectively shows a X-ray diffraction chart for the alloy powder obtained in Example 10 and another X-ray diffraction chart for the alloy powder obtained in Example Using each of the Sn—Co alloy powders obtained in the above and in accordance with the procedures of Example 1, there were prepared two anodes, and using each of the resultant anodes, there were prepared two rechargeable lithium batteries.

For each of the resultant rechargeable lithium batteries, evaluation was conducted with respect to battery capacity, charge-and-discharge Coulombic efficiency, and charging and discharging cycle life, obtained by performing alternately charging and discharging, in the same manner as in Example 1. The evaluated results obtained are collectively shown in Table 6.

Table 6 collectively illustrates the amorphization level for the amorphous Sn—Co alloy powder prepared under given condition in Example 10 and that for the amorphous Sn—Co alloy powder prepared under given condition in Example 11 and the battery characteristics of the rechargeable lithium batteries prepared using these alloy powders.

From the results shown in Table 6, it is understood that as long as the Sn content is substantially the same, when the amorphization of an amorphous Sn series alloy powder proceeds, the charging and discharging cycle life of a rechargeable lithium battery in which such alloy powder is used is prolonged. And it seems that the crystallite size calculated from the charging and discharging cycle and the half width of the peak 2 at a diffraction angle $2\theta=42°$ to $45°$ has a stronger correlation in comparison with that in the case of the half width of the peak 1 at a diffraction angle $2\theta=28°$ to $36°$.

Separately, although not shown here, for alloys of tin element with other transition metal element(s) than cobalt element, there were obtained similar results.

TABLE 6

| $Sn_x$—$Co_y$ | Example 10 | Example 11 |
|---|---|---|
| laying-in ratio atomic ratio | Sn:Co = 60:40 | Sn:Co = 60:40 |
| XMA composition | $Sn_{51.9}Co_{36.7}Fe_{8.3}Cr_{2.1}$ | $Sn_{45.9}Co_{35.5}Fe_{14.6}Cr_{3.8}$ |
| preparation condition | planetary ball mill | planetary ball mill |
| treatment time (h) | 17 G 4 h | 17 G 10 h |
| 2 θ of peak 1 (deg.) | 35.5 | 33.8 |
| half width of peak 1 (deg.) | 0.8 | 0.9 |
| crystallite size of peak 1 (Å) | 110 | 98 |
| 2 θ of peak 2 (deg.) | 44.7 | 44.5 |
| half width of peak 2 (deg.) | 0.9 | 1.3 |
| crystallite size of peak 2 (Å) | 104 | 68 |
| normalized charging and discharging cycle life | 1.0 | 1.2 |
| referred drawing | FIG. 13 | FIG. 13 |

NOTE:
(1). Each value of the charging and discharging cycle life is a value relative to the cycle number when the battery reached its life time in Example 10, which is set at 1.0.
(2). As the planetary ball mill used in the preparation of the alloy power, there was used a planetary type ball mill P-7 (produced by Fritch Company of Germany).

EXAMPLES 12 TO 15

Description will be made of amorphization of an alloy particulate as an electrode material to be used as an anode of a rechargeable lithium battery in the present invention and battery characteristics of a rechargeable lithium battery having an anode in which said electrode material is used in the present invention.

As shown in Tables 7 and 8, using a powdery Sn material, using a powdery Co material and a powdery carbon material and using a planetary ball mill or a rotating grinder, there were prepared a plurality of Sn—Co alloy powders.

Using each of the Sn—Co alloy powders obtained in the above and in accordance with the procedures of Example 1, there were prepared a plurality of anodes, and using each of the resultant anodes, there were prepared a plurality of rechargeable lithium batteries.

For each of the resultant rechargeable lithium batteries, evaluation was conducted with respect to battery capacity, charge-and-discharge Coulombic efficiency, and charging and discharging cycle life, obtained by performing alternately charging and discharging, in the same manner as in Example 1. The evaluated results obtained are collectively shown in Tables 7 and 8.

Figure 14:
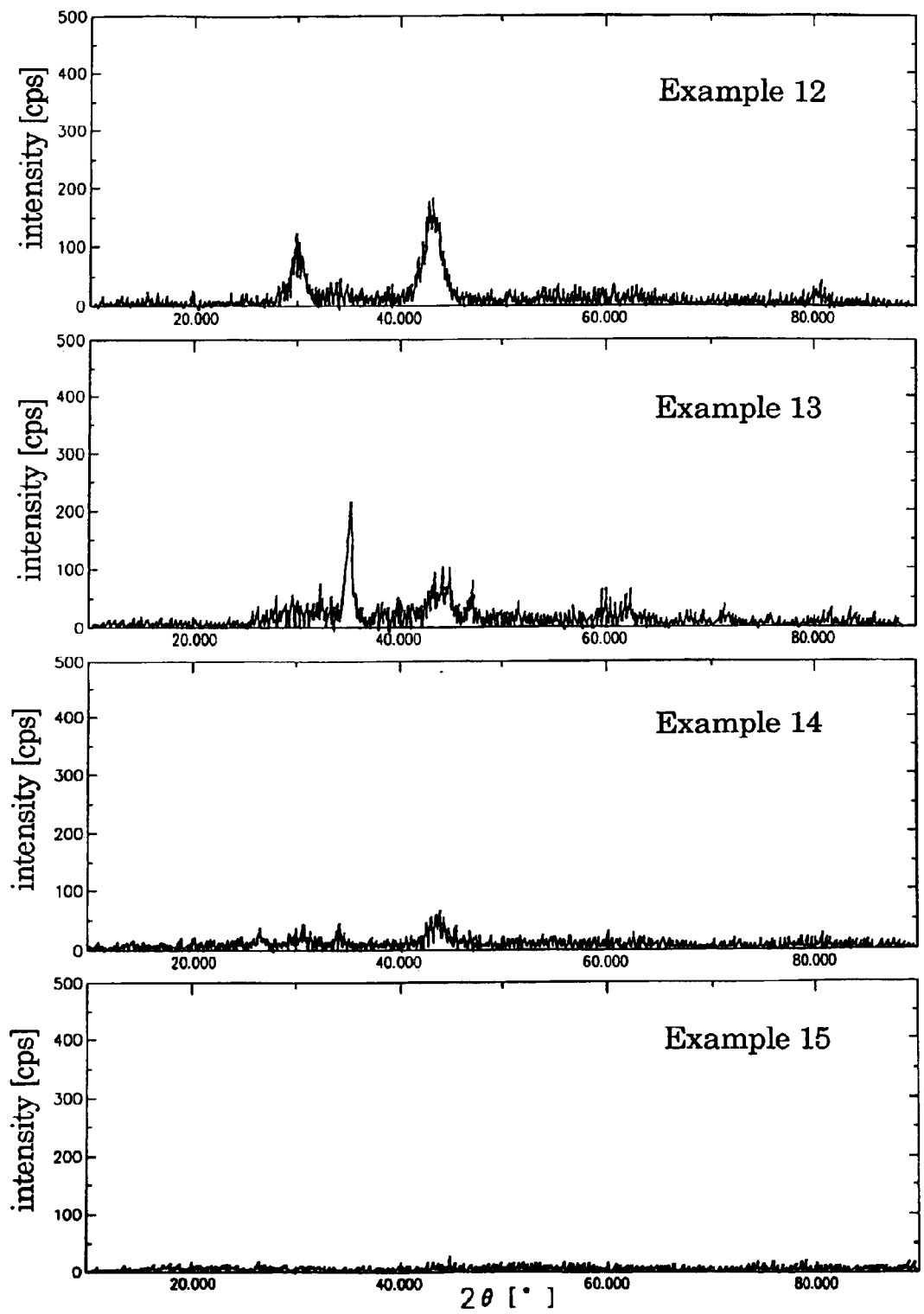
FIG. 14 collectively shows X-ray diffraction charts after the grinding treatment (amorphization) in Examples 12–15 which will be later described.

FIG. 14 collectively shows a X-ray diffraction chart for the alloy powder after the treatment by the planetary ball mill in Example 12, a X-ray diffraction chart for the alloy powder after the treatment by the rotating grinder in Example 13, a X-ray diffraction chart for the alloy powder after the treatment by the rotating grinder in Example 14, and a X-ray diffraction chart for the alloy powder after the treatment by the rotating grinder and the planetary ball mill in Example 15. These results are collectively shown in Tables 7 and 8.

Tables 7 and 8 collectively illustrate the amorphization level for each of the amorphous Sn—Co alloy powders respectively prepared under given is condition in each of Examples 12 to 15 and the battery characteristics of the rechargeable lithium batteries prepared using these alloy powders.

Figure 15:
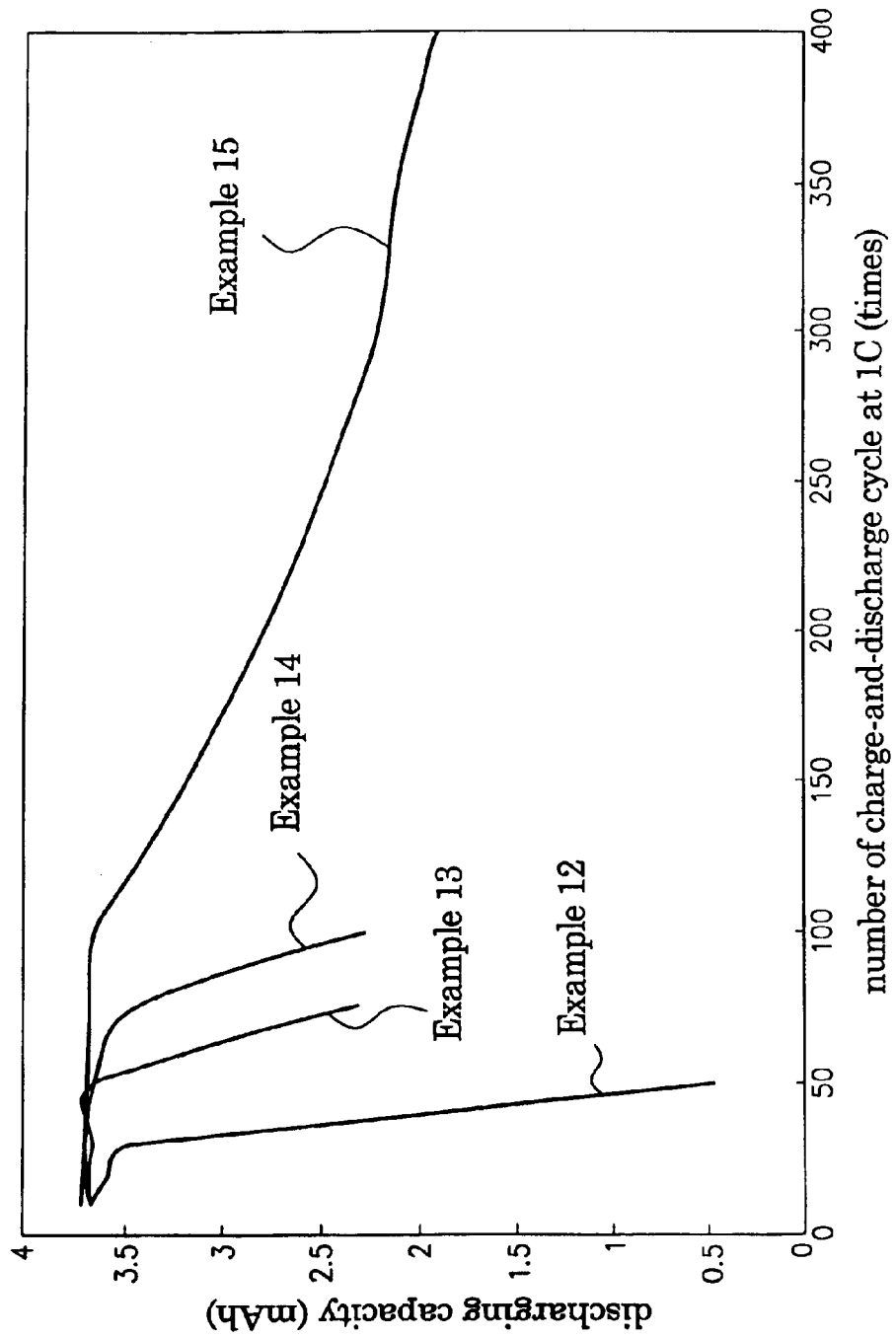
FIG. 15 is a graph collectively showing 1 C charging and discharging cycle life curves of rechargeable lithium batteries in Examples 12–14 which will be later described.

FIG. 15 collectively shows graphs respectively of the charging and discharging cycle life with 1 C for each of the rechargeable lithium batteries obtained in Examples 12 to 15.

From the results shown in Tables 7 and 8, it is understood that as long as the Sn content is substantially the same, when the amorphization of an amorphous Sn series alloy powder proceeds, the charging and discharging cycle life of a rechargeable lithium battery in which such alloy powder is used is prolonged. And it seems that the crystallite size calculated from the charging and discharging cycle and the half width of the peak 2 at a diffraction angle 2θ=42° to 45° has a stronger correlation in comparison with that in the case of the half width of the peak 1 at a diffraction angle 2θ=28° to 36°.

Separately, although not shown here, for alloys of tin element with other transition metal element(s) than cobalt element, there were obtained similar results.

TABLE 7

| $Sn_x$—$Co_y$ | Example 12 | Example 13 |
|---|---|---|
| laying-in ratio | Sn:Co:C = | Sn:Co:C = |
| atomic ratio | 40.5:53.9:5.6 | 40.5:53.9:5.6 |
| composition | not measured | not measured |
| preparation condition treatment time (h) | planetary ball mill 17.5 G × 2 h | ring medium rotating grinder 1500 rpm × 1 h |
| 2 θ of peak 1 (deg.) | 30.4 | 35.6 |
| half width (deg.) | 0.8 | 0.7 |
| crystallite size (Å) | 111 | 118 |
| 2 θ of peak 1 (deg.) | 43.3 | 44.4 |
| half width (deg. ) | 1.7 | 1.8 |
| crystallite size (Å) | 54 | 51 |
| normalized charging and discharging cycle life | 1.0 | 2.0 |
| referred drawing | FIG. 14, 15 | FIG. 14, 15 |

TABLE 8

| $Sn_x$—$Co_y$ | Example 14 | Example 15 |
|---|---|---|
| laying-in ratio | Sn:Co:C = | Sn:Co:C = |
| atomic ratio | 40.5:53.9:5.6 | 40.5:53.9:5.6 |
| composition | not measured | not measured |
| preparation condition treatment time (h) | ring medium rotating grinder 1800 rpm × 1 h | ring medium rotating grinder 1500 rpm × 1 h planetary ball mill 17.5 G × 2 h |
| 2 θ of peak 1 (deg.) | 30.8 | the peak was too broad to measure. |
| half width (deg.) | 1.05 | — |
| crystallite size (Å) | 82 | ~0 |
| 2 θ of peak 1 (deg.) | 43.9 | the peak was too broad to measure. |
| half width (deg.) | 1.8 | — |
| crystallite size (Å) | 46 | ~0 |
| normalized charging and discharging cycle life | 2.7 | 9.5 |
| referred drawing | FIG. 14, 15 | FIG. 14, 15 |

NOTE:
(1). Each value of the charging and discharging cycle life is a value relative to the cycle number when the battery reached its life time in Example 12, which is set at 1.0.
(2). As the planetary ball mill used in the preparation of the alloy powder, there was used a planetary type ball mill P-7 (produced by Fritch Company of the Germany), and as the ring medium rotating grinder, there was used a ring medium rotating grinder MICROS (produced by Kabusiki kaisha Nara Kikai Seisakusho).

REFERENCE EXAMPLE 5

An anode was prepared in the same manner as in Example 10, except that the binder comprising 2 wt. % of carboxymethyl cellulose (CMC) and 3 wt. % of polyvinyl alcohol (PVA) was changed to 5 wt. % of polyvinylidene fluoride (PVDF) and the water as the solvent was changed to N-methyl-2-pyrrolidone. Then, using the anode, there was prepared a rechargeable lithium battery as well as in the case of Example 10.

For the resultant rechargeable lithium battery, evaluation was conducted with respect to battery capacity, charge-and-discharge Coulombic efficiency, and charging and discharging cycle life, obtained by performing alternately charging and discharging, in the same manner as in Example 1. The evaluated results obtained are collectively shown in Table 9 together with those obtained in previous Example 10.

Table 9 illustrates comparison of the battery charge-and-discharge characteristics of the rechargeable battery prepared by changing the binder comprising the water-soluble high molecular material of the electrode in Example 10 to the polyvinylidene fluoride (PVDF) with those of the rechargeable battery of Example 10.

From the results shown in Table 9, it is understood that in the case where the anode is formed of the amorphous Sn series alloy powder using a water-soluble polymer series binder rather than using a fluororesin series binder, the charging and discharging cycle life of the resulting rechargeable battery is more prolonged. For the reason of this, it is considered such that in comparison with an anode formed using a conventional carbonous material such as graphite or the like, the anode formed using the Sn series alloy powder is liable to more expand when the Sn series alloy powder is alloyed with lithium upon charging and the Sn series alloy powder is rather difficult to absorb an electrolyte solution in comparison with the carbonous material, and therefore, to use the water-soluble polymer series binder which has a high adhesion with the alloy powder would make it possible to form a porous active material layer (an electrode material layer) having a high liquid-retaining property.

TABLE 9

| $Sn_x$—$Co_y$ | Example 10 | Reference Example 5 |
|---|---|---|
| laying-in ratio atomic ratio | Sn:Co = 60:40 | Sn:Co = 60:40 |
| XMA composition | $Sn_{51.9}Co_{36.7}Fe_{8.3}Cr_{2.1}$ | $Sn_{51.9}Co_{36.7}Fe_{8.3}Cr_{2.1}$ |
| preparation condition | planetary ball mill | planetary ball mill |
| treatment time (h) | 17 G × 4 h | 17 G × 4 h |
| binder for the formation of an electrode material layer | CMC:2 wt % PVA:3 Wt % | PVDF:5 wt % |
| charge-and-discharge efficiency (1$^{st}$ cycle) | 76 | 15 |
| charge-and-discharge efficiency (3$^{rd}$ cycle) | 98 | 23 |
| normalized charging and discharging cycle life | 1.0 | 0.05 |

NOTE:
Each value of the charging and discharging cycle life is a value relative to the cycle number when the battery reached its life time in Example 10, which is set at 1.0.

EXAMPLE 16
[Evaluation of Other Amorphous Phase-Bearing Alloy Particulate]

As other alloy particulate to be used in the electrode structural body of the present invention, those alloy materials shown in Tables 10 and 11 were prepared in the same manner as in Examples 1 to 15. For each of these alloy materials, there were obtained its peak's half width and crystallite size by way of X-ray diffraction analysis. And separately using these alloy materials, there were prepared a plurality of anodes, followed by preparing a plurality of rechargeable lithium batteries.

For each of the resultant rechargeable lithium batteries, evaluation was conducted with respect to battery capacity, charge-and-discharge Coulombic efficiency, and charging and discharging cycle life, obtained by performing alternately charging and discharging, in the same manner as in Example 1. The evaluated results obtained are collectively shown in Tables 10 and 11.

Each of FIGS. 16 to 36 shows a X-ray diffraction chart for each of the foregoing alloy materials after the treatment by the planetary ball mill.

Figure 16:
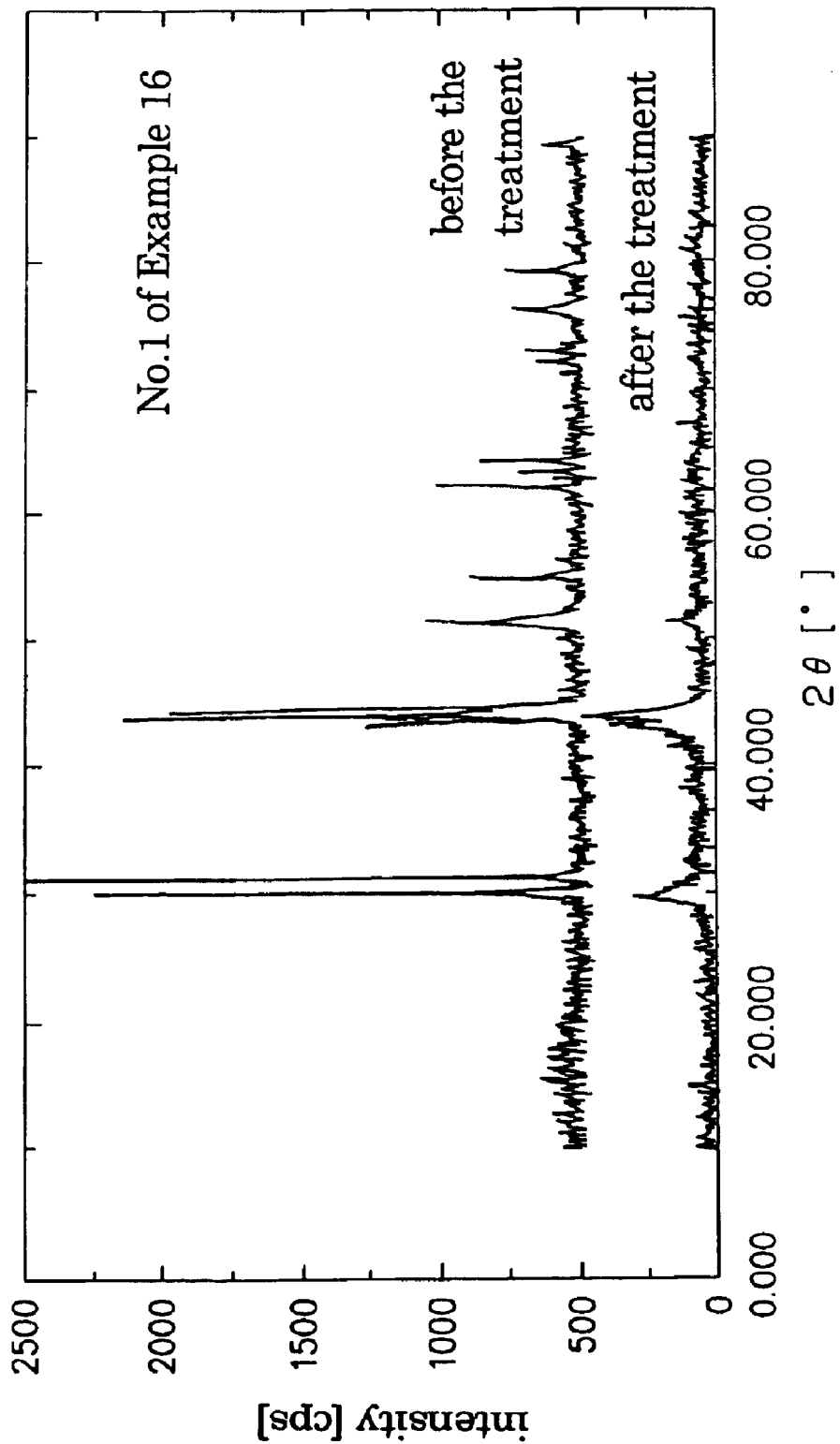
FIG. 16 shows X-ray diffraction charts before and after the treatment by a planetary ball mill for a No. 1 material in Example 16 which will be later described.
Figure 17:
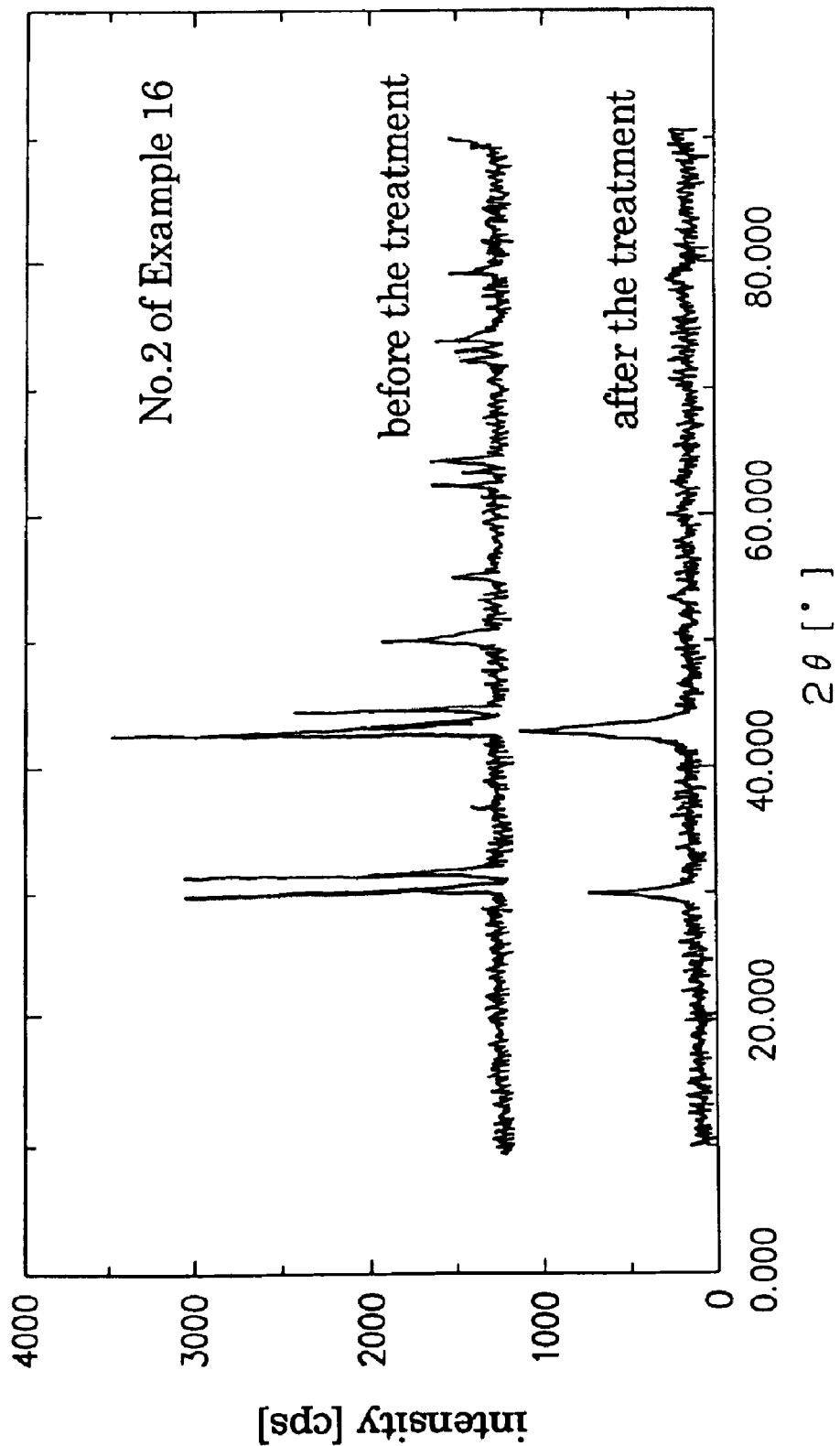
FIG. 17 shows X-ray diffraction charts before and after the treatment by a planetary ball mill for a No. 2 material in Example 16 which will be later described.
Figure 18:
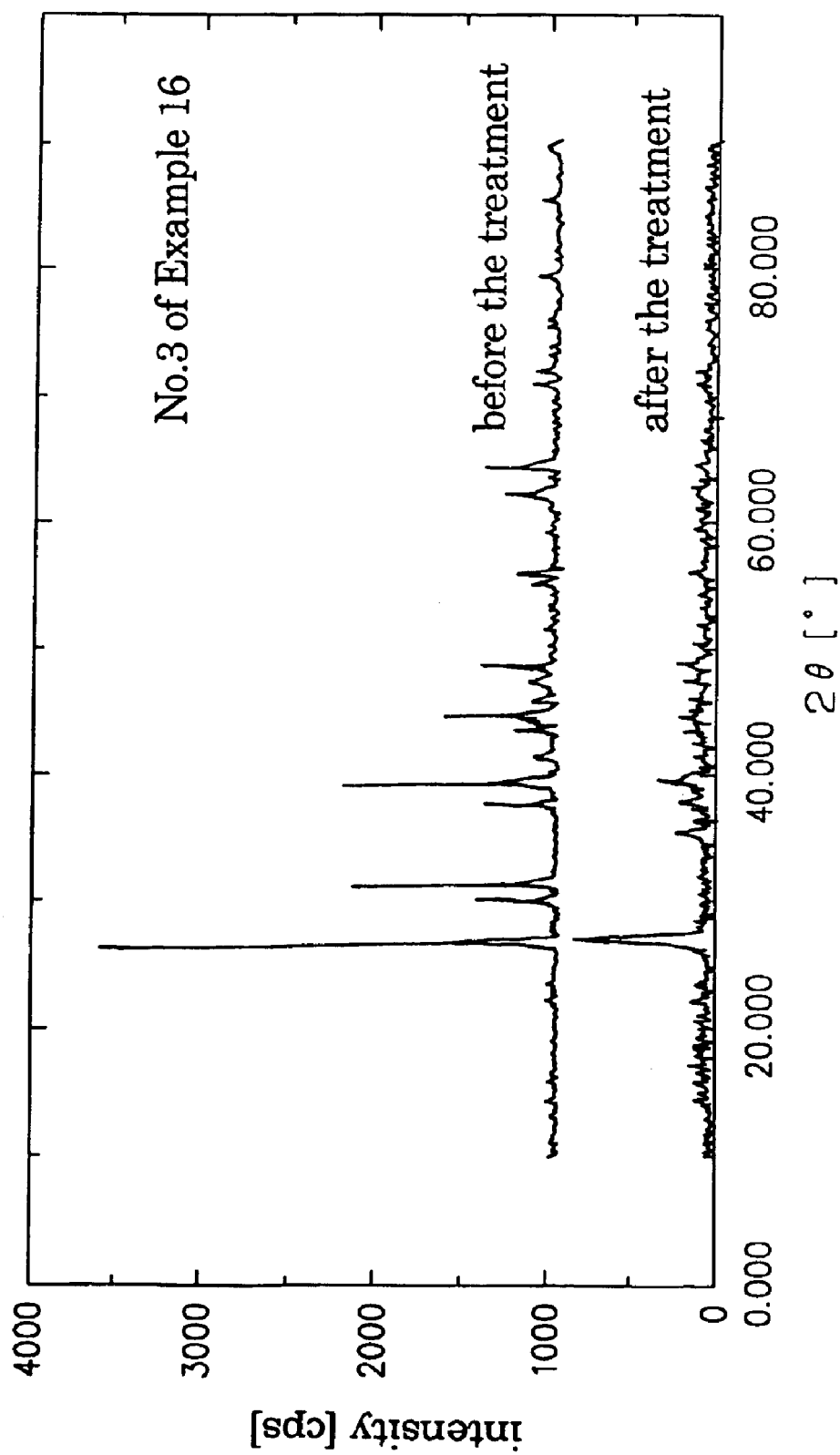
FIG. 18 shows X-ray diffraction charts before and after the treatment by a planetary ball mill for a No. 3 material in Example 16 which will be later described.
Figure 19:
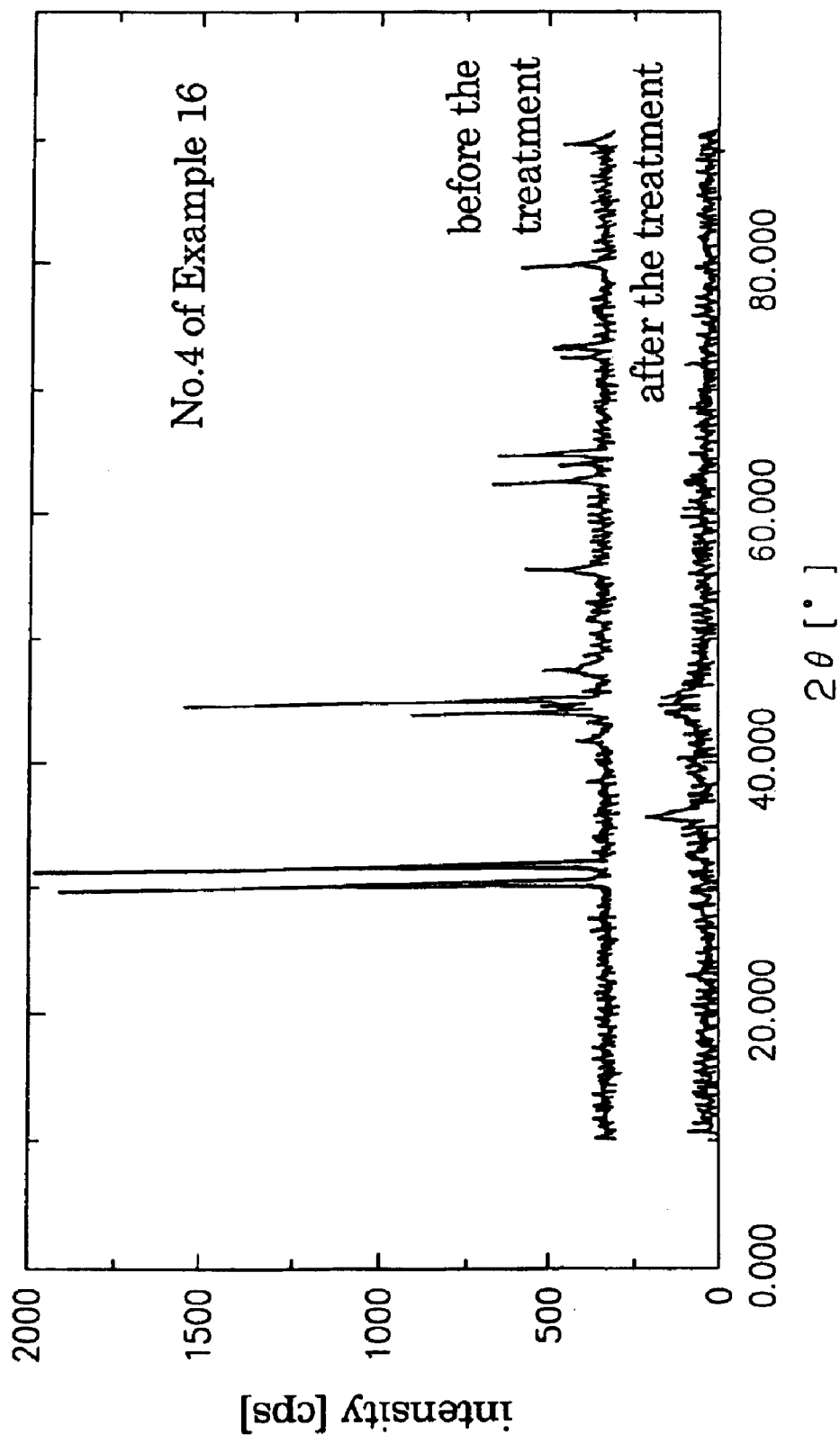
FIG. 19 shows X-ray diffraction charts before and after the treatment by a planetary ball mill for a No. 4 material in Example 16 which will be later described.
Figure 20:
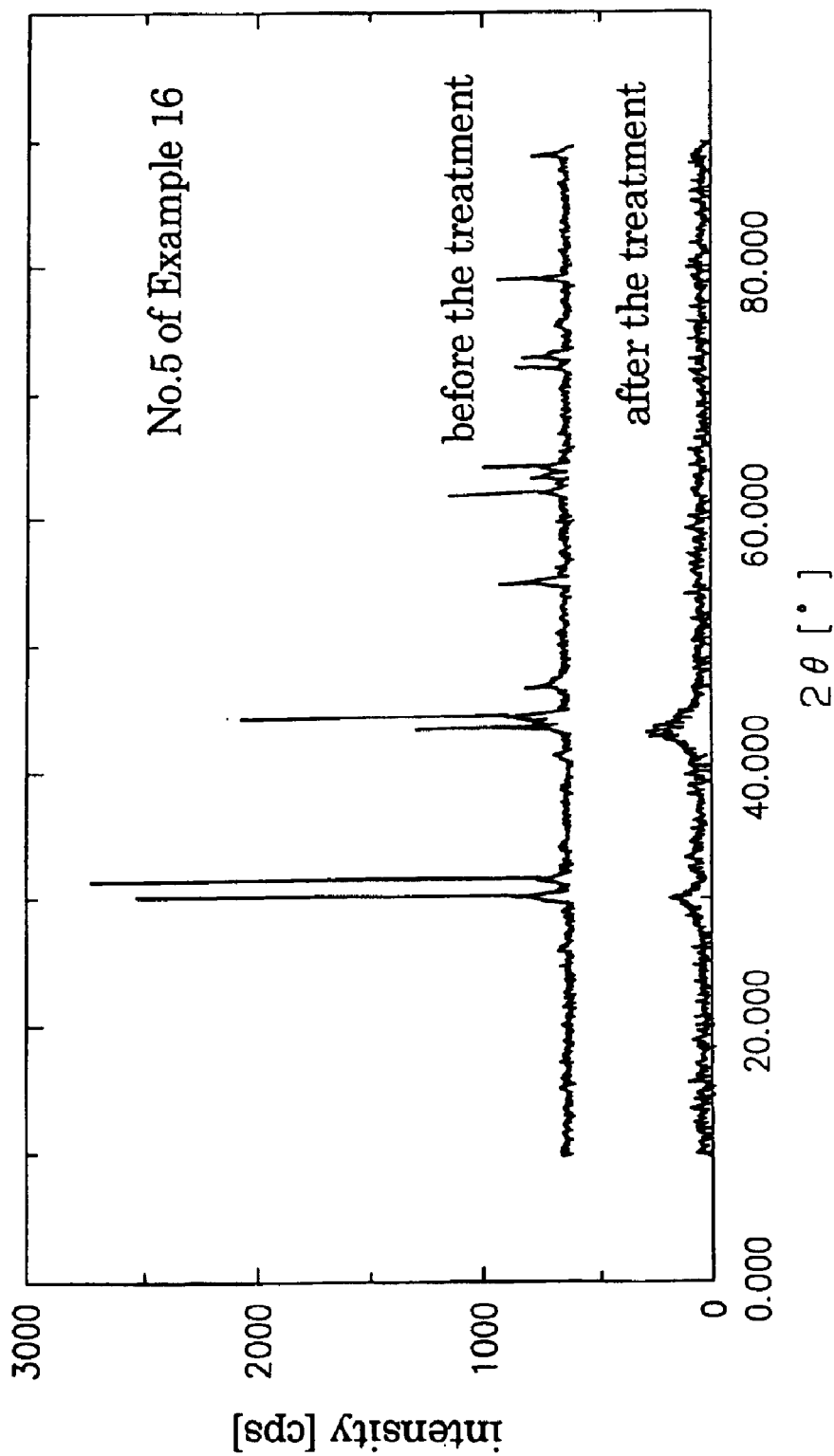
FIG. 20 shows X-ray diffraction charts before and after the treatment by a planetary ball mill for a No. 5 material in Example 16 which will be later described.

Particularly, FIG. 16 collectively shows two X-ray diffraction charts before and after the treatment by the planetary ball mill for the alloy material of No. 1 in Example 16. FIG. 17 collectively shows two X-ray diffraction charts before and after the treatment by the planetary ball mill for the alloy material of No. 2 in Example 16. FIG. 18 collectively shows two X-ray diffraction charts before and after the treatment by the planetary ball mill for the alloy material of No. 3 in Example 16. FIG. 19 collectively shows two X-ray diffraction charts before and after the treatment by the planetary ball mill for the alloy material of No. 4 in Example 16. FIG. 20 collectively shows two X-ray diffraction charts before and after the treatment by the planetary ball mill for the alloy material of No. 5 in Example 16.

Figure 21:
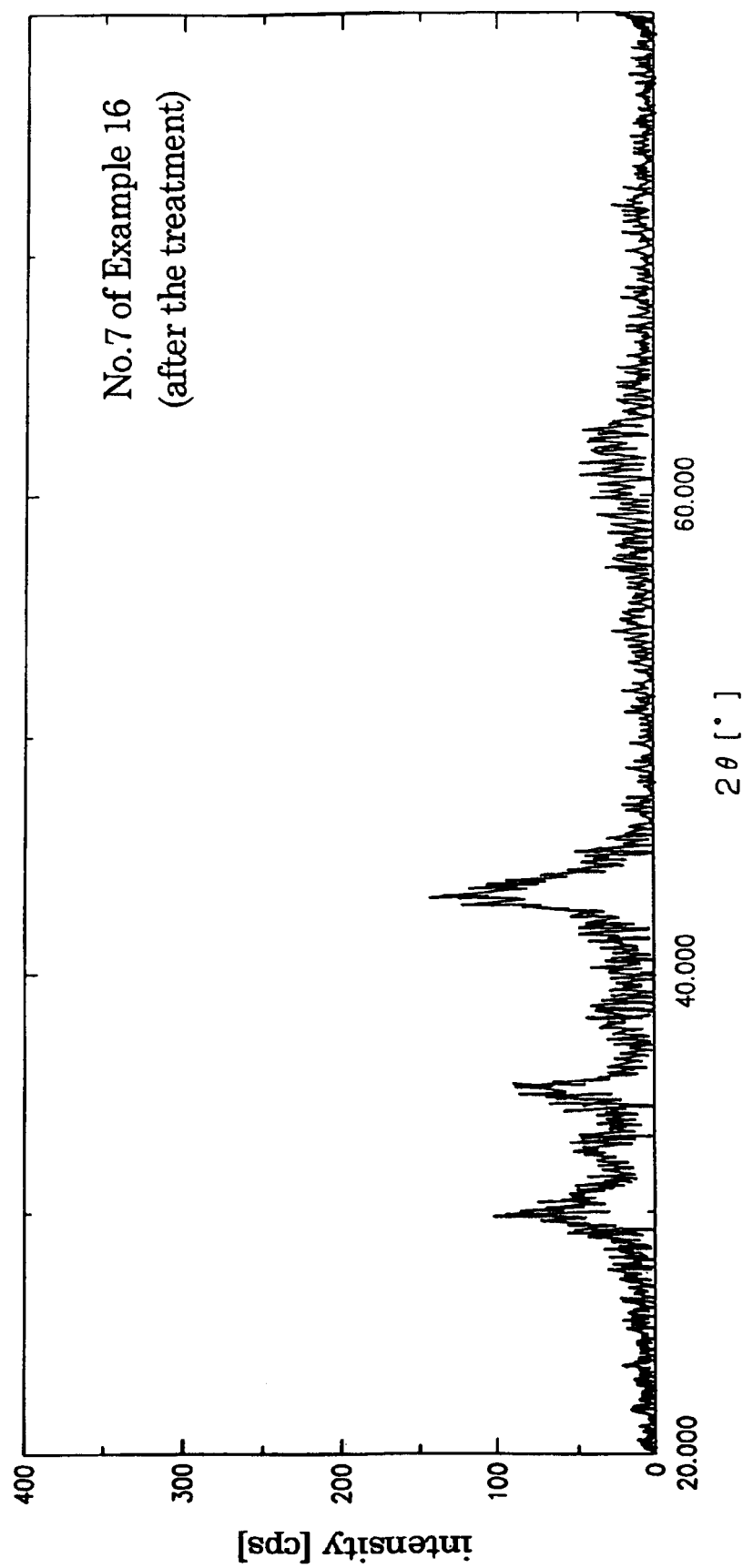
FIG. 21 shows X-ray diffraction charts before and after the treatment by a planetary ball mill for a No. 7 material in Example 16 which will be later described.
Figure 22:
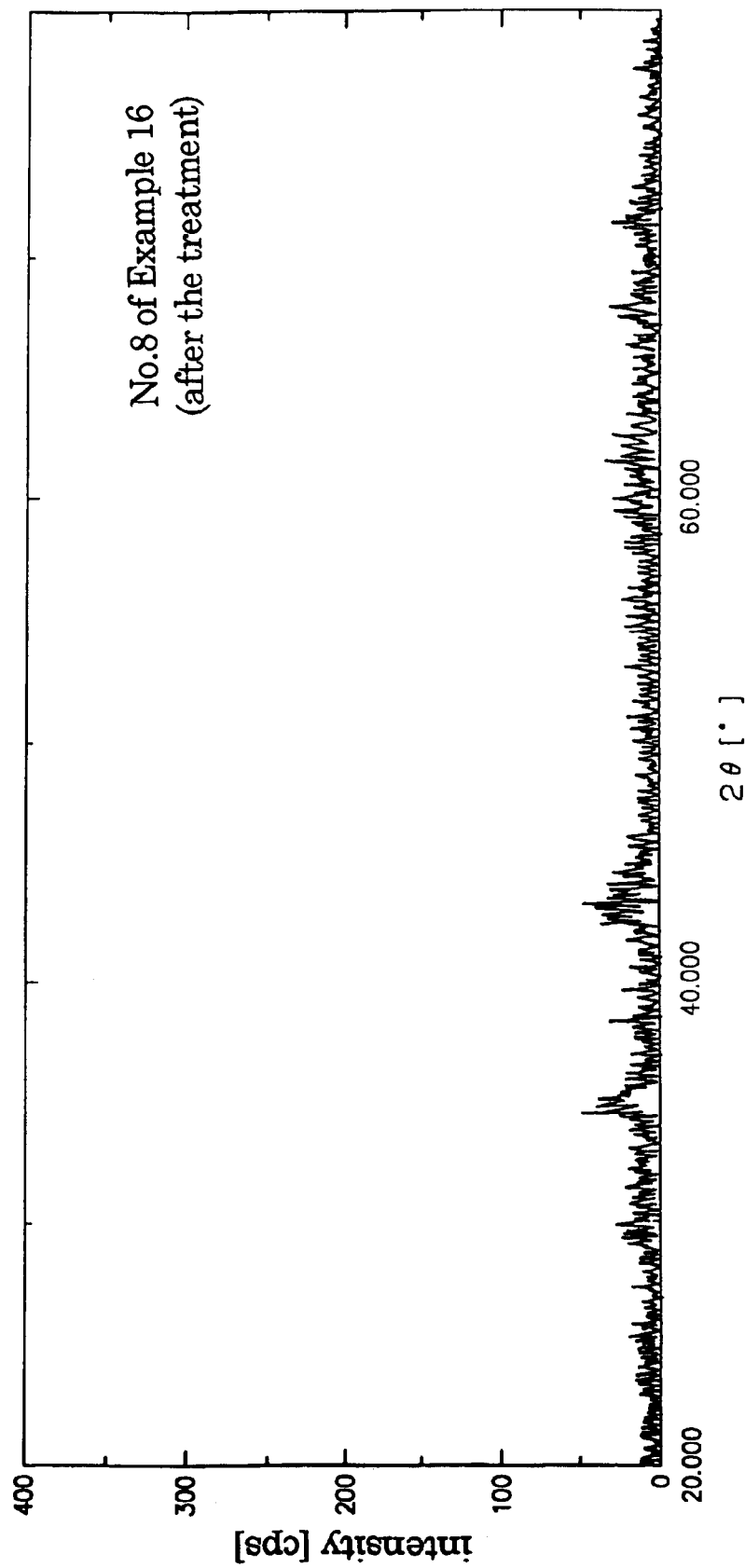
FIG. 22 shows X-ray diffraction charts before and after the treatment by a planetary ball mill for a No. 8 material in Example 16 which will be later described.
Figure 23:
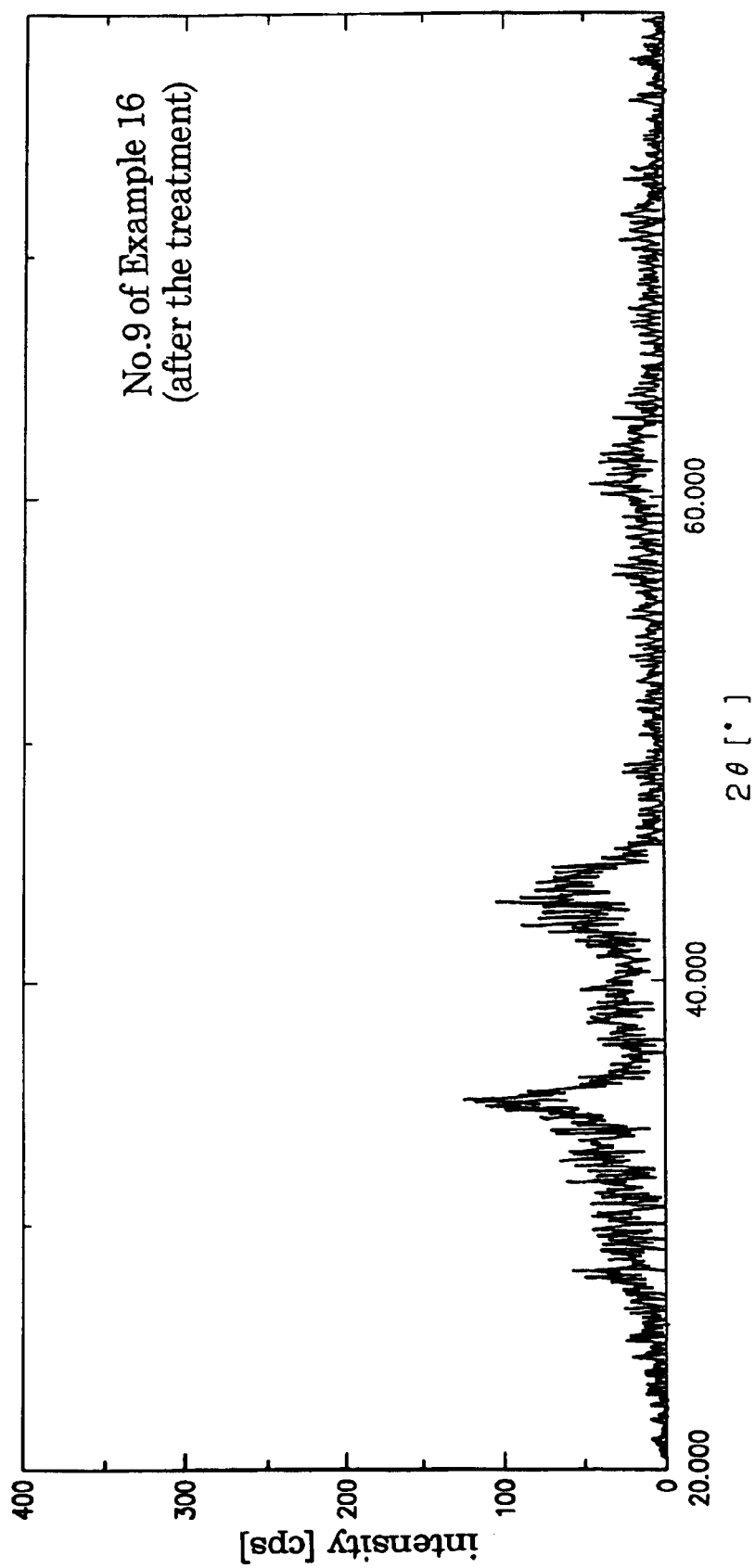
FIG. 23 shows X-ray diffraction charts before and after the treatment by a planetary ball-mill for a No. 9 material in Example 16 which will be later described.
Figure 24:
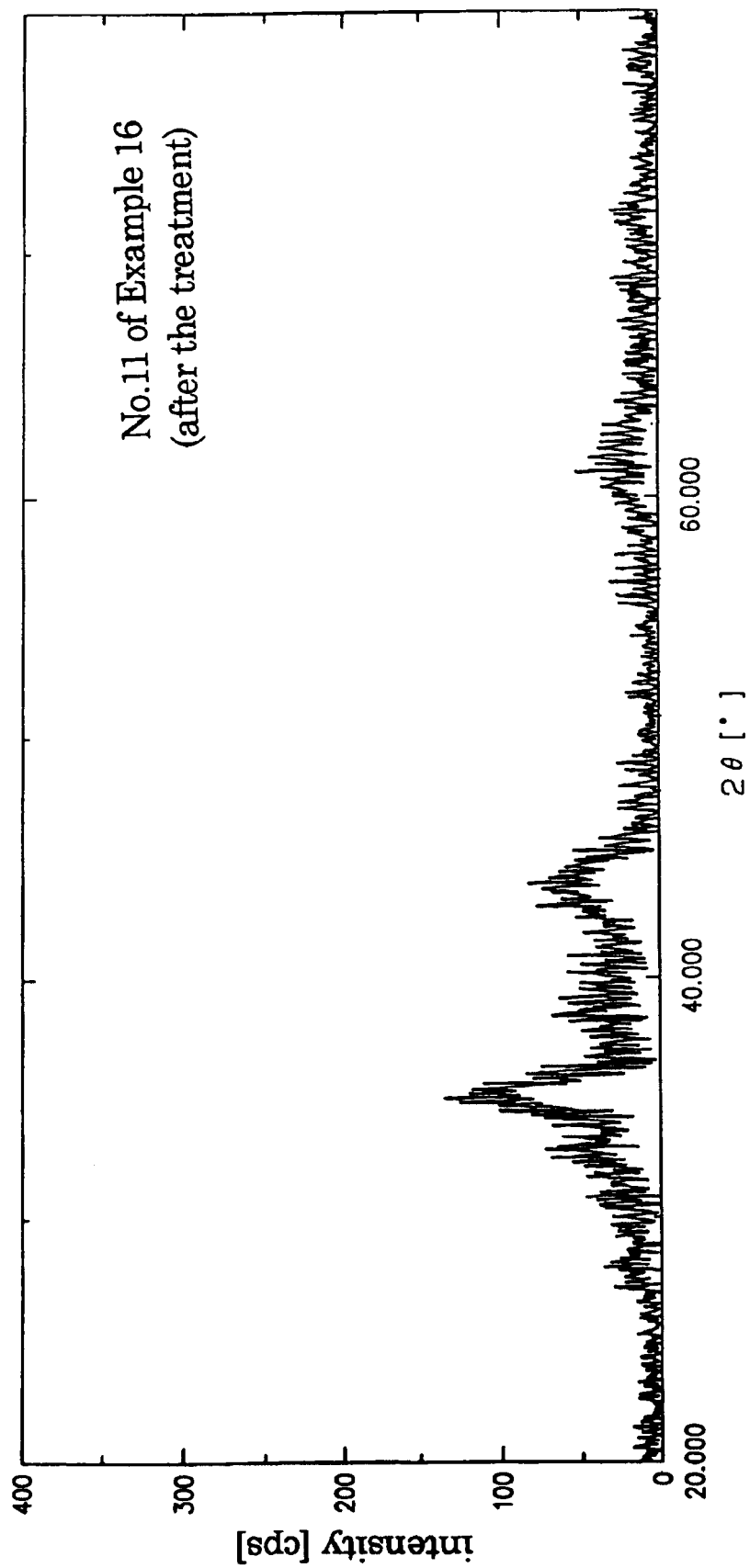
FIG. 24 shows X-ray diffraction charts before and after the treatment by a planetary ball mill for a No. 11 material in Example 16 which will be later described.

FIG. 21 shows a X-ray diffraction chart for the alloy material of No. 7 in Example 16 after the treatment by the planetary ball mill. FIG. 22 shows a X-ray diffraction chart for the alloy material of No. 8 in Example 16 after the treatment by the planetary ball mill. FIG. 23 shows a X-ray diffraction chart for the alloy material of No. 9 in Example 16 after the treatment by the planetary ball mill. FIG. 24 shows a X-ray diffraction chart for the alloy material of No. 11 in Example 16 after the treatment by the planetary ball mill.

Figure 25:
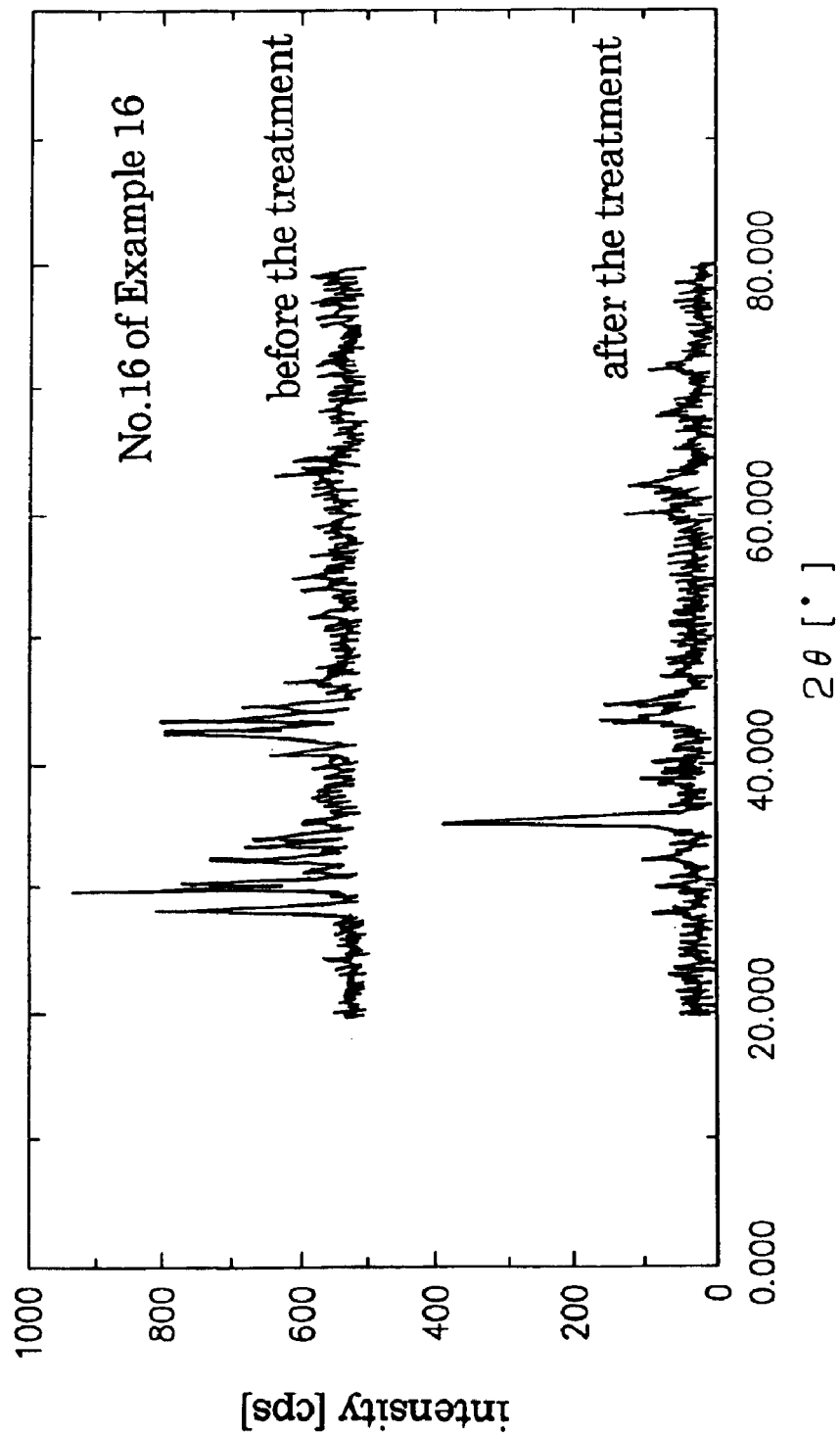
FIG. 25 shows X-ray diffraction charts before and after the treatment by a planetary ball mill for a No. 16 material in Example 16 which will be later described.
Figure 26:
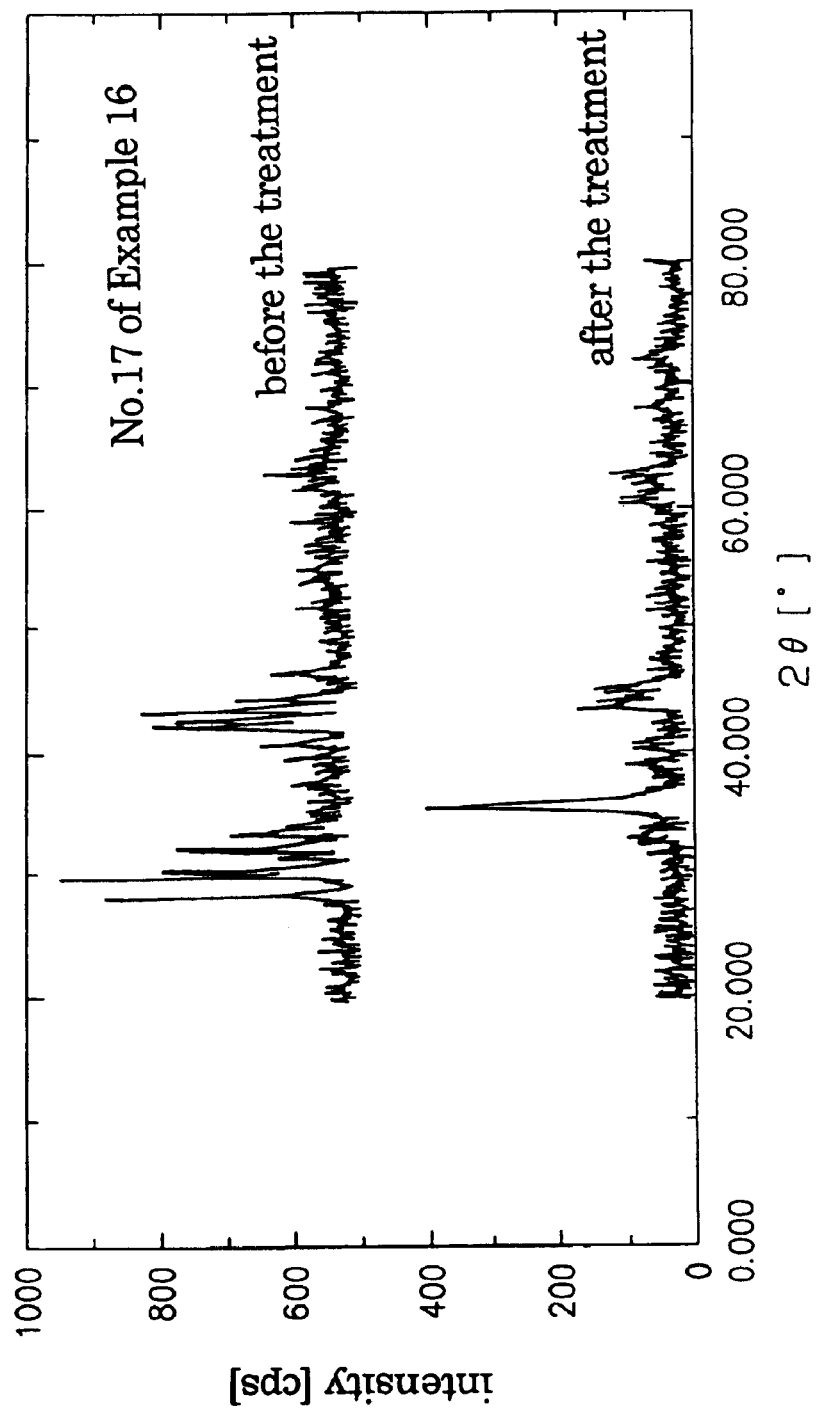
FIG. 26 shows X-ray diffraction charts before and after the treatment by a planetary ball mill for a No. 17 material in Example 16 which will be later described.
Figure 27:
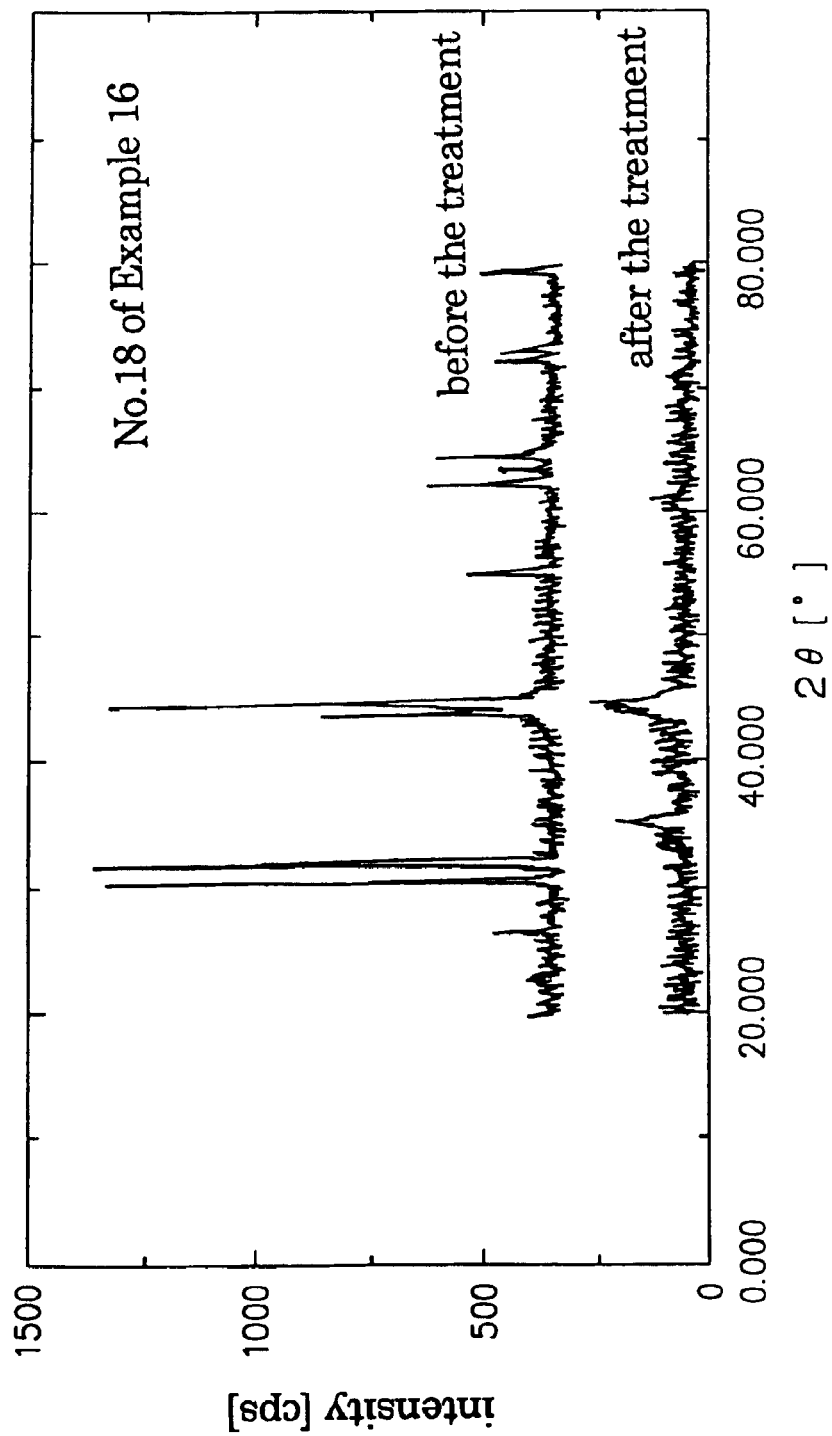
FIG. 27 shows X-ray diffraction charts before and after the treatment by a planetary ball mill for a No. 18 material in Example 16 which will be later described.

FIG. 25 collectively shows two X-ray diffraction charts before and after the treatment by the planetary ball mill for the alloy material of No. 16 in Example 16. FIG. 26 collectively shows two X-ray diffraction charts before and after the treatment by the planetary ball mill for the alloy material of No. 17 in Example 16. FIG. 27 collectively shows two X-ray diffraction charts before and after the treatment by the planetary ball mill for the alloy material of No. 18 in Example 16.

Figure 28:
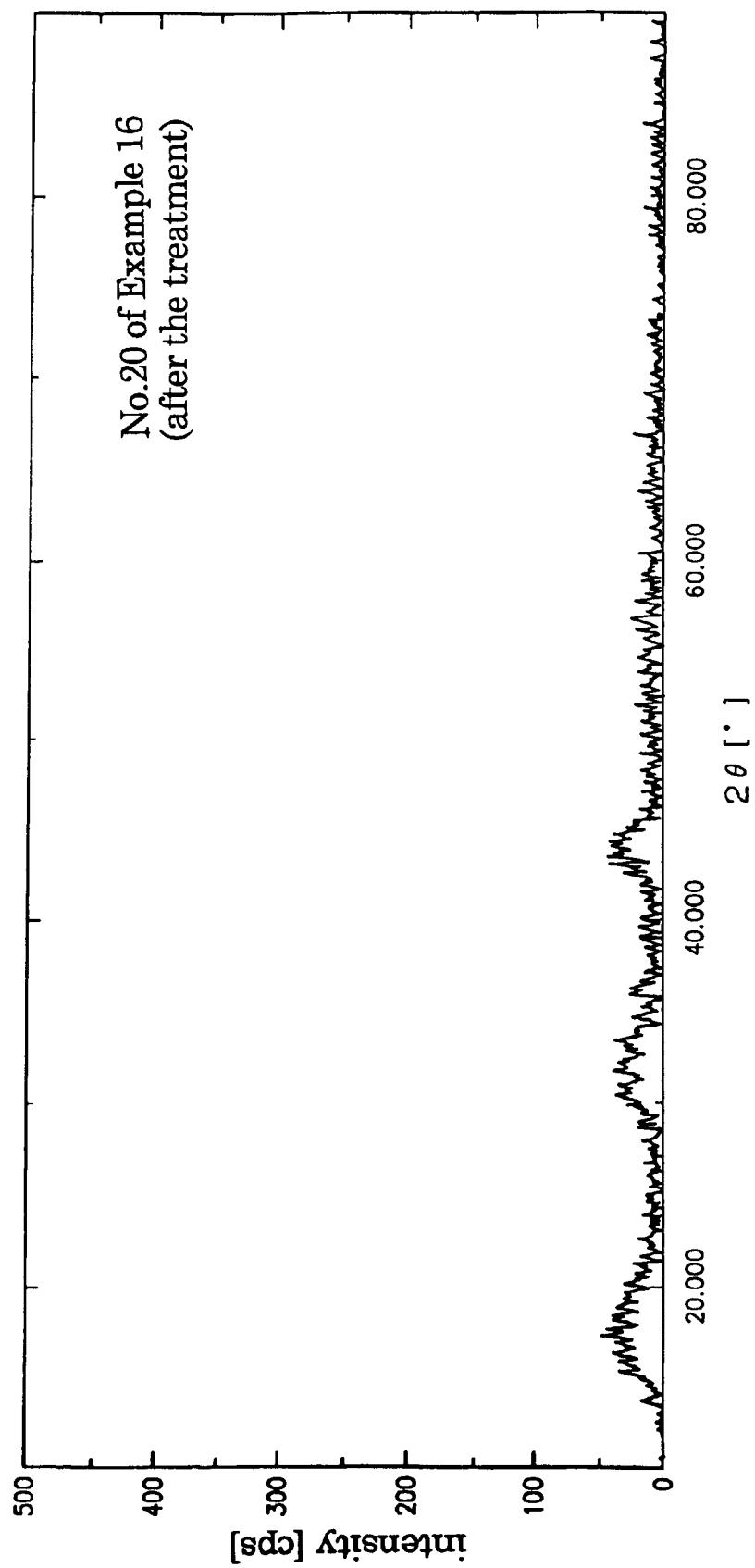
FIG. 28 shows X-ray diffraction charts before and after the treatment by a planetary ball mill for a No. 20 material in Example 16 which will be later described.
Figure 29:
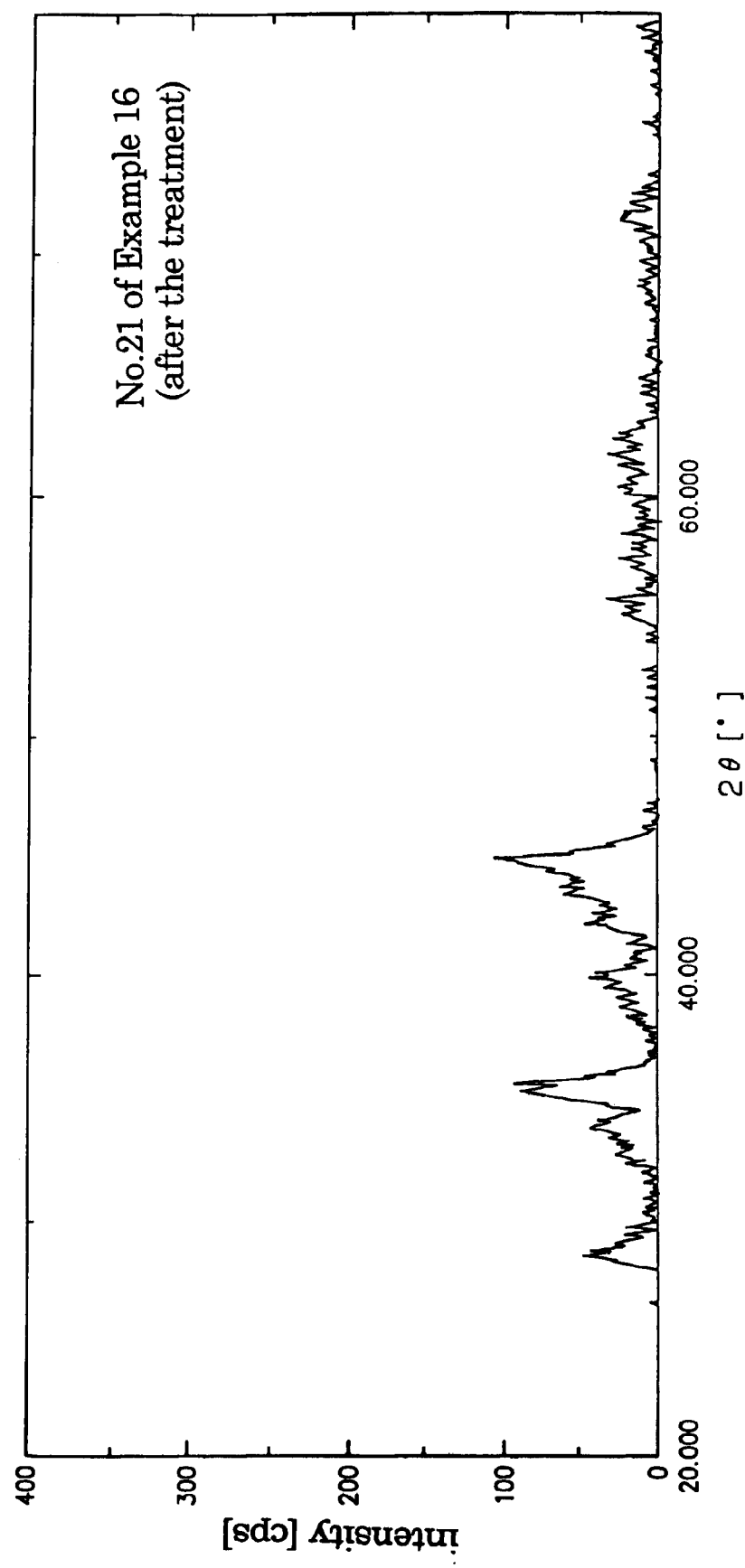
FIG. 29 shows a X-ray diffraction chart after the treatment by a planetary ball mill for a No. 21 material in Example 16 which will be later described.
Figure 30:
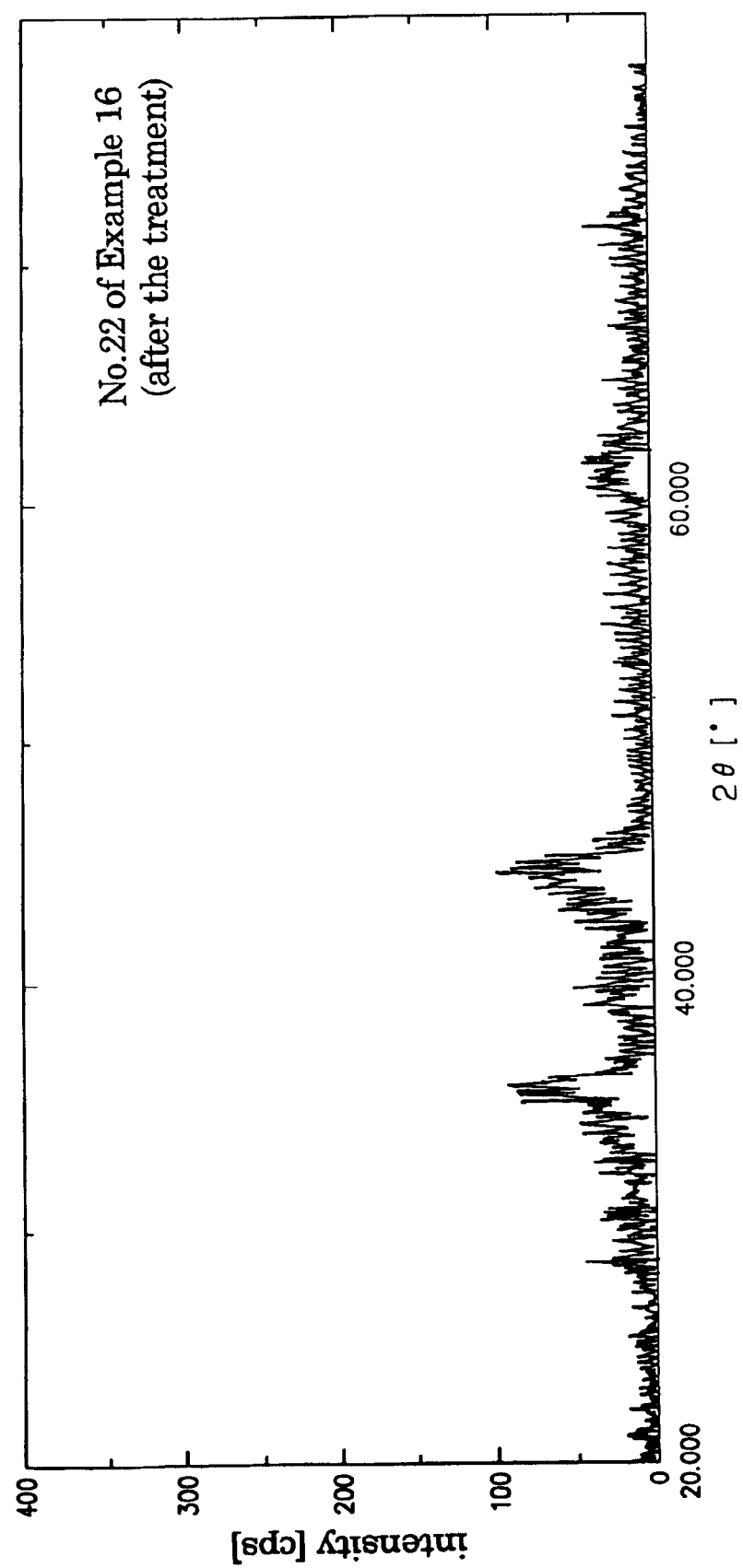
FIG. 30 shows a X-ray diffraction chart after the treatment by a planetary ball mill for a No. 22 material in Example 16 which will be later described.
Figure 31:
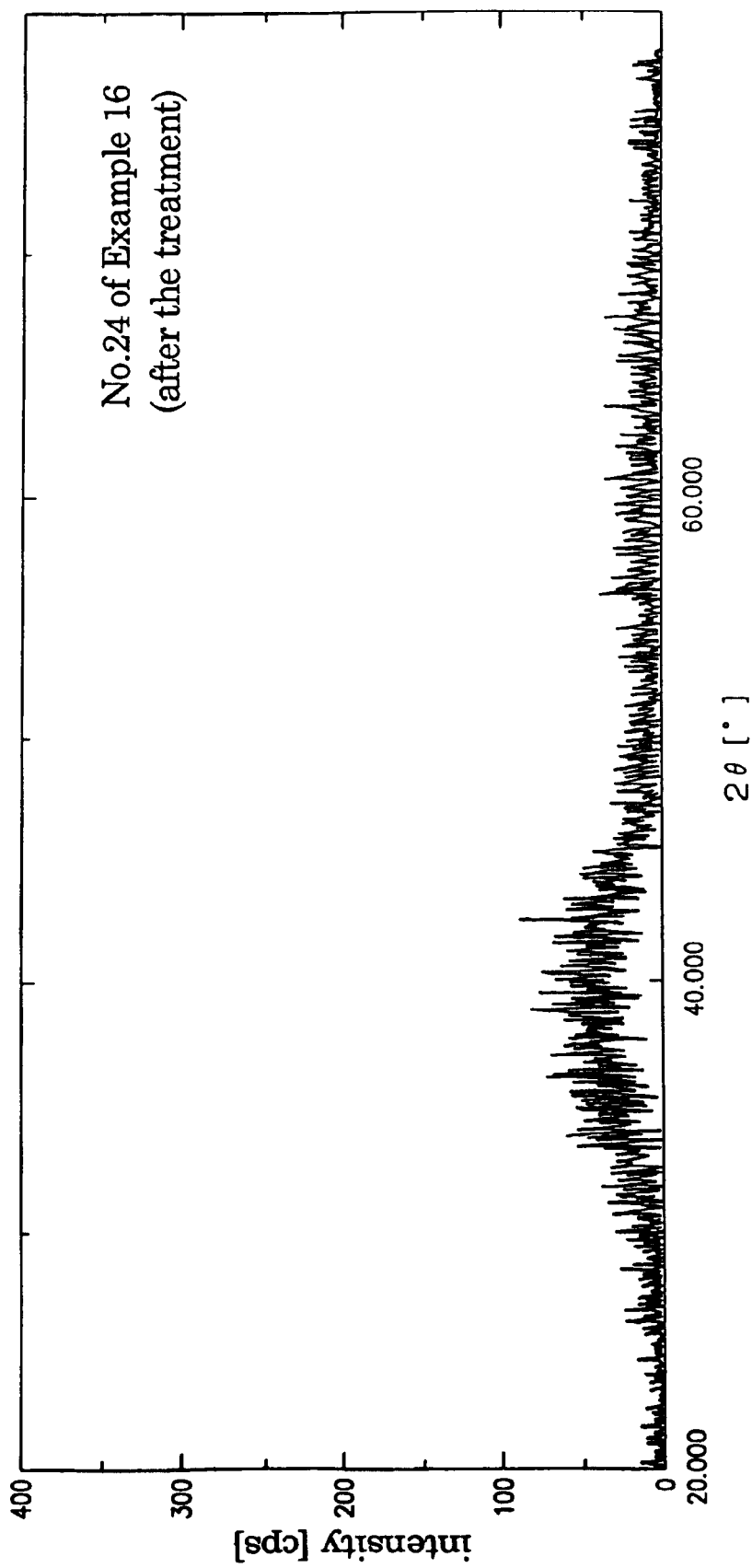
FIG. 31 shows a X-ray diffraction chart after the treatment by a planetary ball mill for a No. 24 material in Example 16 which will be later described.
Figure 32:
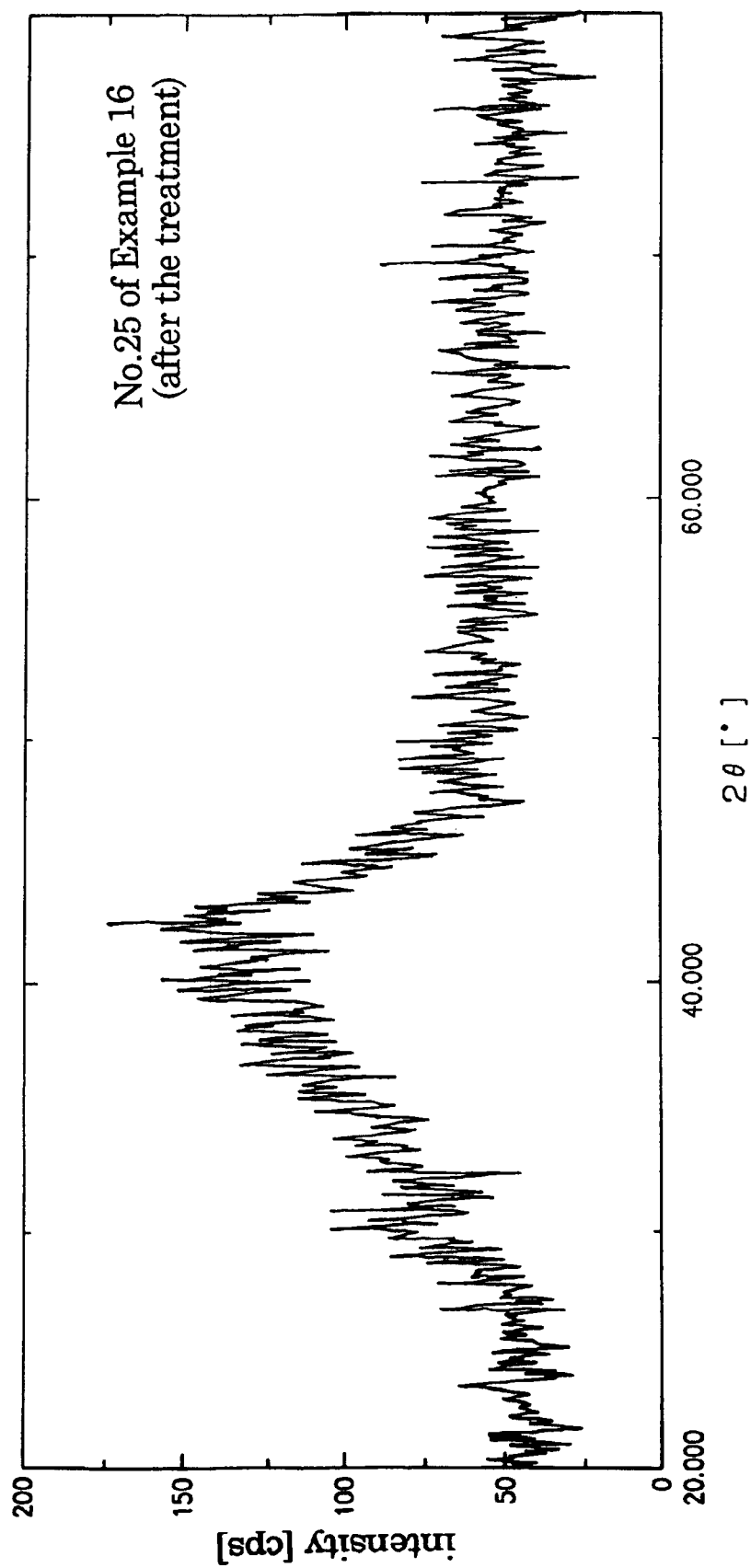
FIG. 32 shows a X-ray diffraction chart after the treatment by a planetary ball mill for a No. 25 material in Example 16 which will be later described.
Figure 33:
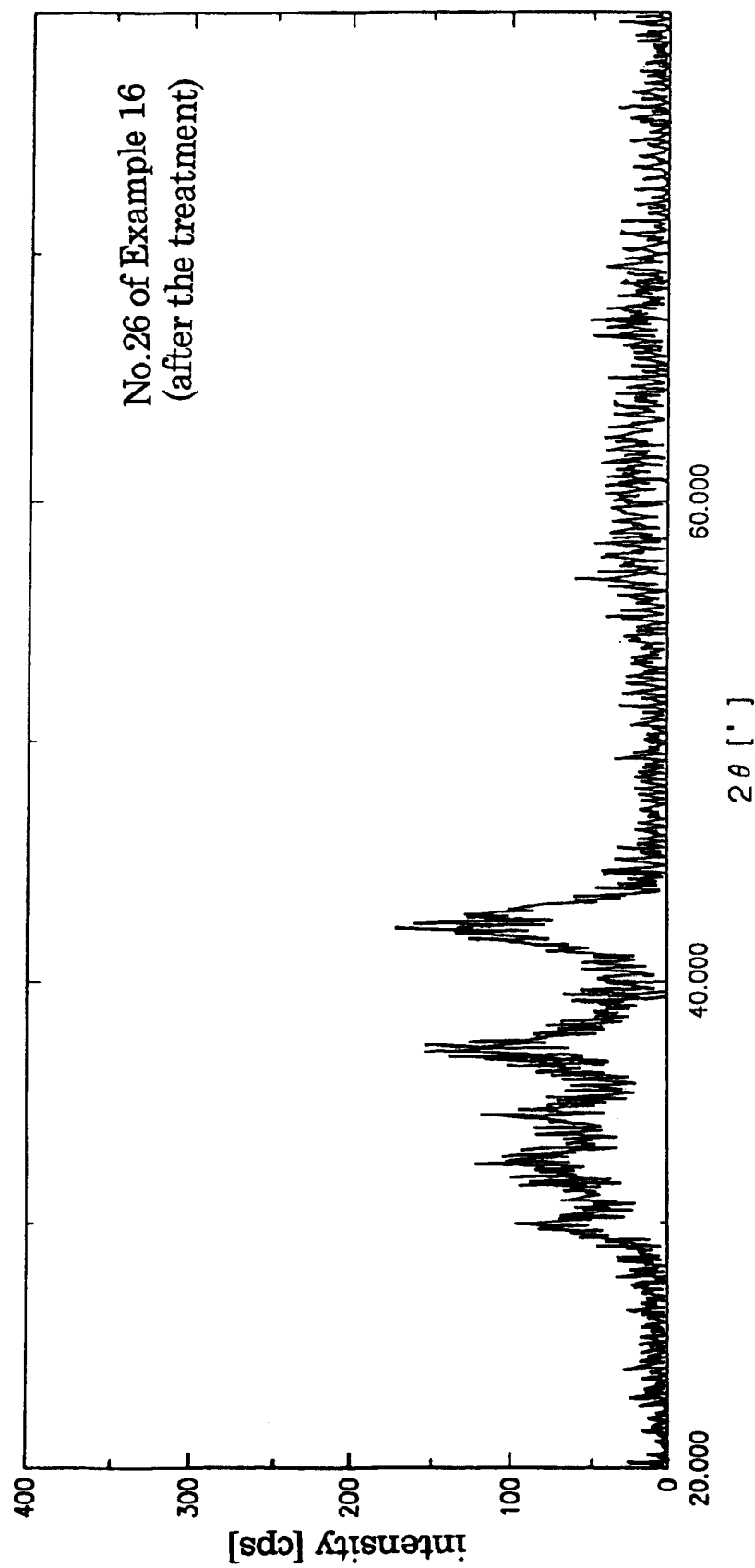
FIG. 33 shows a X-ray diffraction chart after the treatment by a planetary ball mill for a No. 26 material in Example 16 which will be later described.
Figure 34:
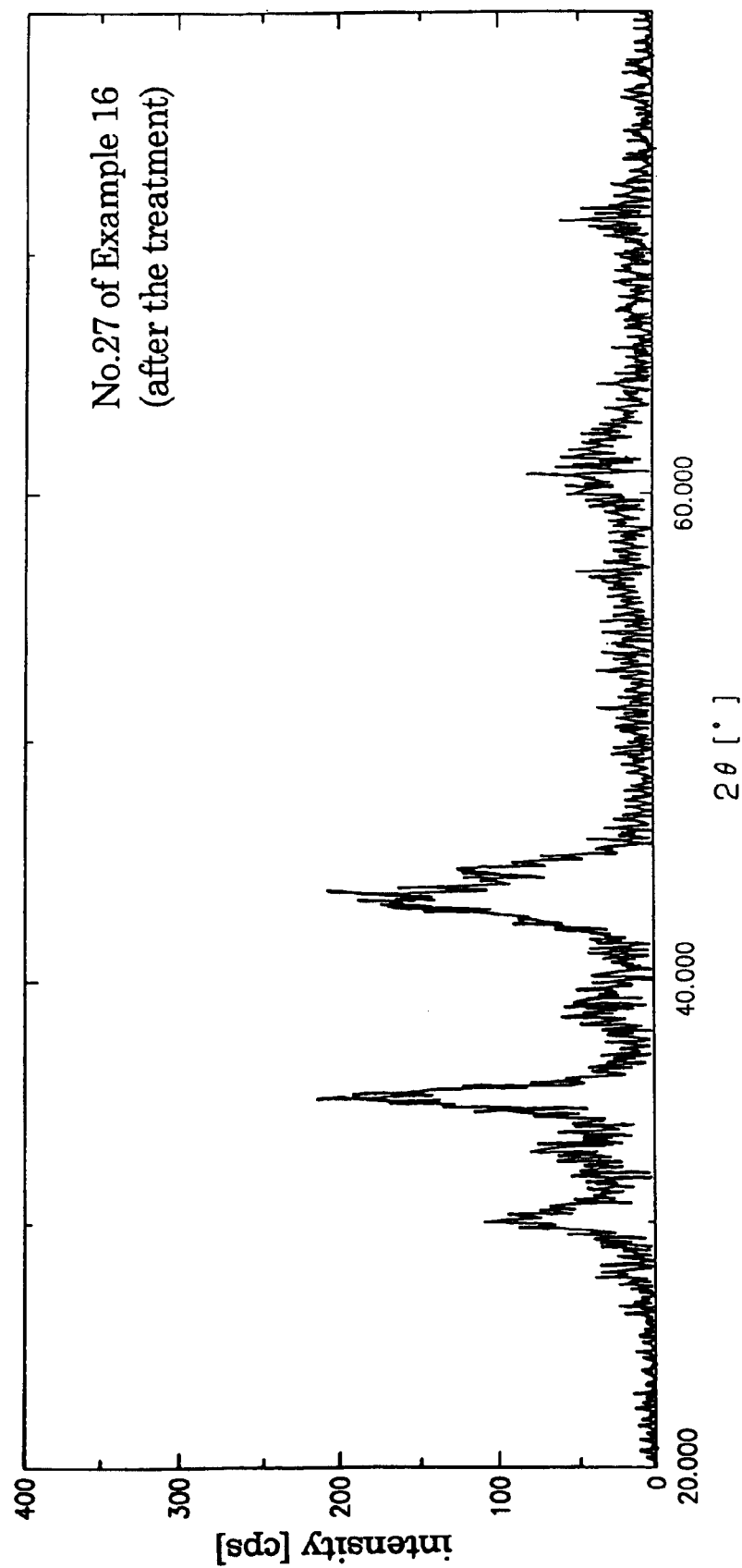
FIG. 34 shows a X-ray diffraction chart after the treatment by a planetary ball mill for a No. 27 material in Example 16 which will be later described.
Figure 35:
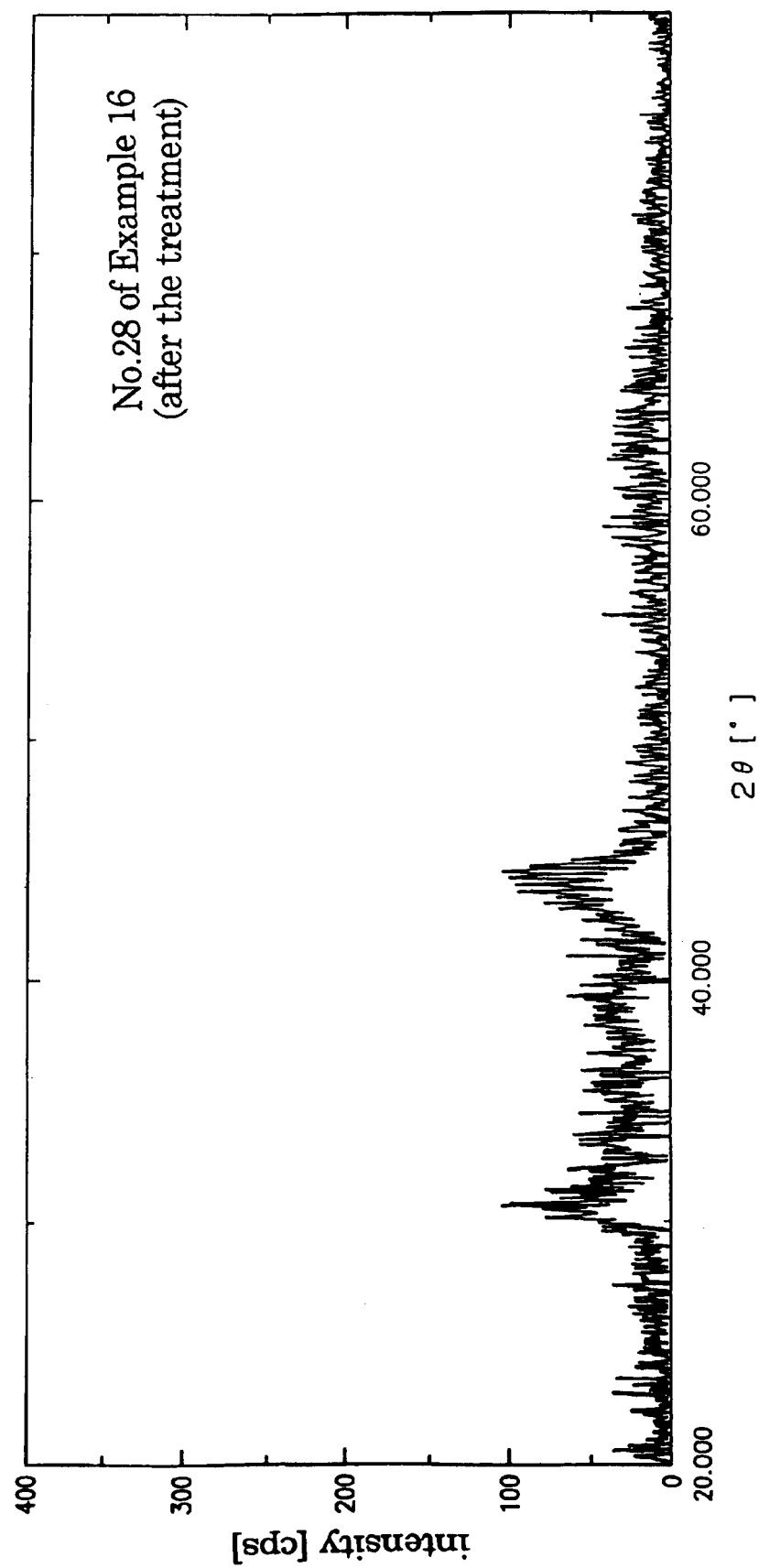
FIG. 35 shows a X-ray diffraction chart after the treatment by a planetary ball mill for a No. 28 material in Example 16 which will be later described.
Figure 36:
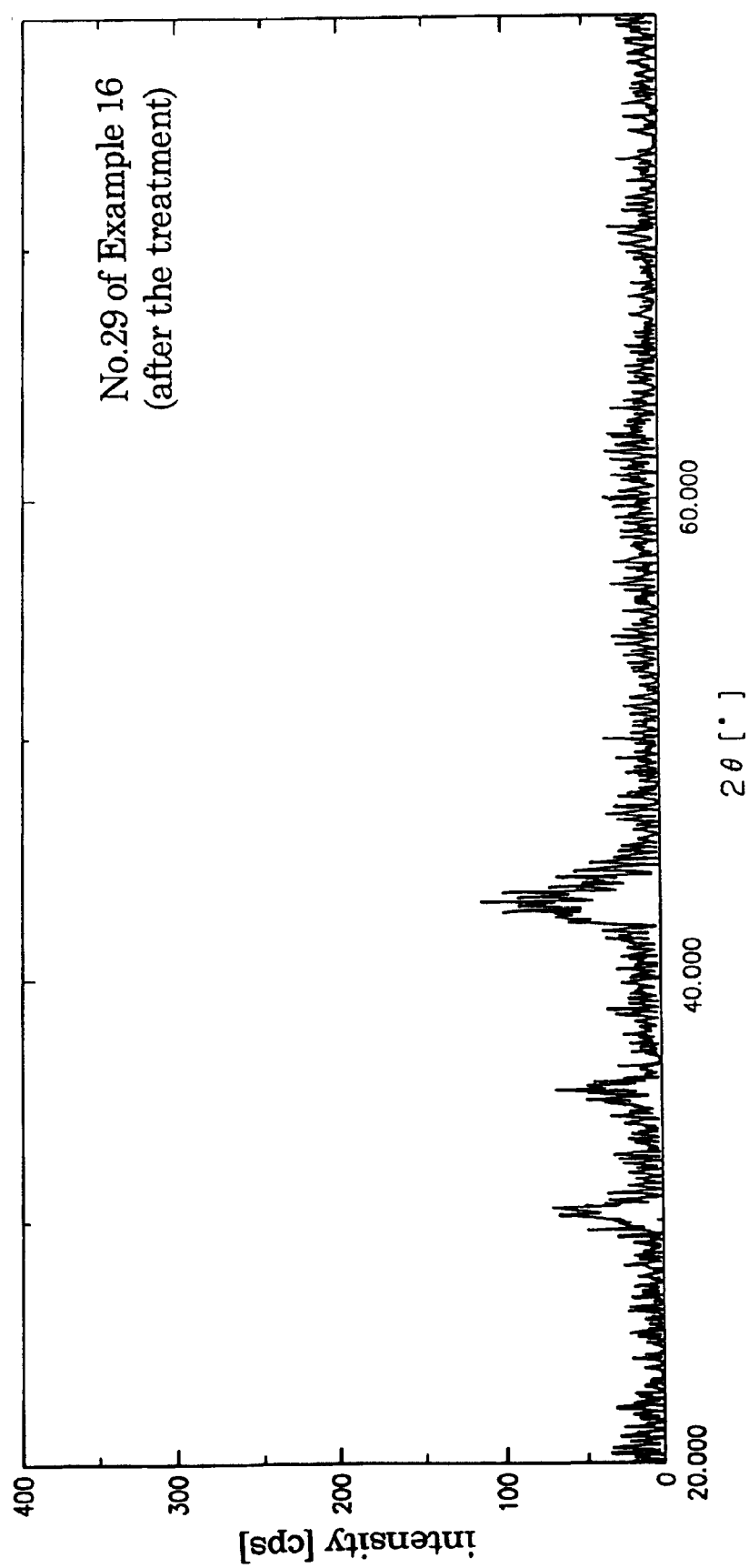
FIG. 36 shows a X-ray diffraction chart after the treatment by a planetary ball mill for a No. 29 material in Example 16 which will be later described.

FIG. 28 shows a X-ray diffraction chart for the alloy material of No. 20 in Example 16 after the treatment by the planetary ball mill. FIG. 29 shows a X-ray diffraction chart for the alloy material of No. 21 in Example 16 after the treatment by the planetary ball mill. FIG. 30 shows a X-ray diffraction chart for the alloy material of No. 22 in Example 16 after the treatment by the planetary ball mill. FIG. 31 shows a X-ray diffraction chart for the alloy material of No. 24 in Example 16 after the treatment by the planetary ball mill. FIG. 32 shows a X-ray diffraction chart for the alloy material of No. 25 in Example 16 after the treatment by the planetary ball mill. FIG. 33 shows a X-ray diffraction chart for the alloy material of No. 26 in Example 16 after the treatment by the planetary ball mill. FIG. 34 shows a X-ray diffraction chart for the alloy material of No. 27 in Example 16 after the treatment by the planetary ball mill. FIG. 35 shows a X-ray diffraction chart for the alloy material of No. 28 in Example 16 after the treatment by the planetary ball mill. FIG. 36 shows a X-ray diffraction chart for the alloy material of No. 29 in Example 16 after the treatment by the planetary ball mill.

Tables 10 and 11 collectively illustrate characteristics of various amorphous Sn series alloy powders other than those previously prepared shown in Tables 1 to 9. In Tables 10 and 11, there are shown a half width for a given X-ray diffraction peak and a crystallite size obtained by way of calculation for each alloy powder, a charge-and-discharge Coulombic efficiency at the third cycle for each rechargeable battery, and a charging and discharging cycle life for each rechargeable battery in a normalized value obtained by setting the cycle number when the rechargeable battery whose anode comprising the alloy powder of No. 3 reached its life time at 1.0.

As the alloy preparation apparatus, there was mainly used a planetary ball mill in each case. As the starting material, except for having used a $Sn_{73}Bi_{27}$ alloy in the preparation of the alloy powder of No. 3, a $Li_3N$ alloy in the preparation of the alloy powder of No. 4, and a $Li_{50}Al_{50}$ alloy in the preparation of the alloy powder of No. 19, adequate pure metal powders were used.

In aforesaid tables, no analyzed value was shown for the composition of each of the alloy powders prepared. However, as the vessel and balls of the planetary mill, those made of stainless steel were used, and because this, the alloy powders are contaminated with Fe as a main contaminant and Ni and Cr as minor contaminants. Further, in the case where Zn or/and Ti capable of being readily bonded with oxygen were used at the starting materials, the contaminated amount of aforesaid stainless material was increased. And for the alloy powder of No. 24, being somewhat different depending upon a sampling position, it was found to substantially comprise 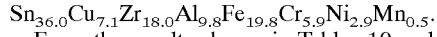
$Sn_{36.0}Cu_{7.1}Zr_{18.0}Al_{9.8}Fe_{19.8}Cr_{5.9}Ni_{2.9}Mn_{0.5}$.

From the results shown in Tables 10 and 11, it is understood that by selecting adequate kinds of elements in addition to Sn element and their ratio, it is possible to diminish the crystallite size and to promote the amorphization, and it is possible to prolong the charging and discharging cycle life for the resulting rechargeable battery.

TABLE 10

| No. | Starting material laying-in (atomic ratio) | Peak at a diffraction angle of $2\theta$ (deg.) | Half width (deg.) | Crystallite size (Å) | Charge-and-discharge efficiency (%) | Normalized charging and discharging cycle life |
|---|---|---|---|---|---|---|
| 1 | $Sn_{35}Ni_{65}$ | 30.3 | 1.1 | 125 | 97 | 5.2 |
| 2 | $Sn_{35}Cu_{65}$ | 30.0 | 0.5 | 123 | 95 | 6.2 |
| 3 | $Sn_{43.8}Bi_{16.2}Co_{40}$ | 27.1 | 0.2 | 431 | 84 | 1.0 |
| 4 | $Sn_4Co_5Li_3N$ | 35.0 | 1.0 | 92 | 86 | 5.0 |
| 5 | $Sn_{35.6}Co_{47.5}C_{4.9}Mg_{12.0}$ | 43.3 | 2.31 | 50 | 100 | 26.2 |
| 6 | $Sn_{59.7}Co_{30}Fe_{10.3}$ | 35.4 | 0.7 | 144 | 98 | 12.5 |
| 7 | $Sn_{60}Co_{30.2}Ni_{9.9}$ | 43.3 | 1.1 | 68 | 98 | 13.2 |
| 8 | $Sn_{60.4}Co_{30.4}Cu_{9.2}$ | 43.2 | 1.4 | 65 | 98 | 28.7 |
| 9 | $Sn_{59.9}Co_{30.1}Ti_{10}$ | 43.4 | 2.3 | 40 | 99 | 15.5 |
| 10 | $Sn_{62.1}Co_{31.3}Zr_{6.6}$ | 44.7 | 1.1 | 85 | 98 | 10.5 |
| 11 | $Sn_{62.1}Co_{30.2}Nb_{9.8}$ | 35.3 | 0.5 | 174 | 98 | 12.5 |
| 12 | $Sn_{60.4}Co_{30.4}Mo_{9.2}$ | 35.32 | 0.6 | 177 | 99 | 8.5 |
| 13 | $Sn_{59.9}Co_{30.2}Ag_{9.9}$ | 35.3 | 0.59 | 173 | 99 | 15.0 |
| 14 | $Sn_{52.6}Co_{26.5}Mg_{20.9}$ | 35.4 | 0.6 | 169 | 100 | 20.0 |

TABLE 11

| No. | Starting material laying-in (atomic ratio) | Peak at a diffraction angle of $2\theta$ (deg.) | Half width (deg.) | Crystallite size (Å) | Charge-and-discharge efficiency (%) | Normalized charging and discharging cycle life |
|---|---|---|---|---|---|---|
| 15 | $Sn_{46.8}Co_{23.6}Si_{29.7}$ | 35.3 | 0.4 | 248 | 99 | 7.5 |
| 16 | $Sn_{55.9}Co_{28.1}Ni_{12.0}P_{4.0}$ | 35.3 | 0.7 | 144 | 98 | 15.0 |
| 17 | $Sn_{55.2}Co_{27.8}Fe_{11.7}P_{5.3}$ | 35.7 | 0.7 | 140 | 98 | 13.5 |
| 18 | $Sn_{1.1}Fe_{3.0}C_{1.0}$ | 44.8 | 1.3 | 89 | 100 | 7.8 |
| 19 | $Sn_{33.6}Co_{44.9}C_{4.7}Li_{16.8}Al_{16.8}$ | 43.7 | 1.8 | 64 | 99 | 11.5 |
| 20 | $Sn_{43}Co_{42}La_{15}C_5$ | 44.0 | 2.5 | 36 | 100 | 27.5 |
| 21 | $Sn_{57.1}Co_{38.1}Zn_{4.8}$ | 44.9 | 1.1 | 106 | 98 | 15.0 |
| 22 | $Sn_{6.0}Fe_{3.0}Co_{1.0}$ | 44.5 | 1.1 | 61 | 98 | 11.0 |
| 23 | $Sn_{5.0}Cu_{3.0}Zr_{2.0}$ | 37.6 | 10 | 9 | 98 | 10.0 |
| 24 | $Sn_{60}Cu_{11}Zr_{26}Al_3$ | 38.9 | 8.0 | 11 | 99 | 18.7 |
| 25 | $Sn_{57.4}Cu_{10.5}Zr_{24.9}Al_{2.9}C_{4.4}$ | 42.5 | 3.4 | 26 | 99 | 20.0 |
| 26 | $Sn_{60}Cu_{24}Nb_{16}$ | 42.2 | 1.5 | 61 | 98 | 15.7 |
| 27 | $Sn_{60}Ni_{16.6}Fe_{16.6}B_{6.8}$ | 43.7 | 1.1 | 81 | 98 | 15.0 |
| 28 | $Sn_{60}Ni_{25}Nb_{15}$ | 43.6 | 1.7 | 52 | 98 | 14.1 |
| 29 | $Sn_{60}Co_2CuAl_3$ | 43.5 | 1.6 | 56 | 99 | 27.3 |

EXAMPLE 17

In this example, there were prepared a plurality of cells each comprising an electrode having an electrode material layer formed using one of the amorphous Sn series alloy powders prepared in Example 16 and other example of the present invention, a counter electrode comprising a lithium metal, the same electrolyte solution comprising 1M $LiBF_4$/EC-DMC as used in Example 1, and a separator comprising a 25 μm thick polypropylene film having a number of micropores and a 70 μm thick polypropylene nonwoven fabric. For each of the resultant cells, charging and discharging were alternatively repeated, where a maximum electrode capacity per unit weight for the electrode material layer was measured in each case. The measured results obtained are collectively shown in Table 12.

TABLE 12

| | Element composition ratio of alloy powder | Maximum electrode capacity per unit weight for the electrode material layer (mAh/g) |
|---|---|---|
| No. 6 in Table 10 (Example 16) | $Sn_{59.7}Co_{30}Fe_{10.3}$ | 490 |
| Example 9 | $Sn_{60}Co_{40}$ | 520 |
| No. 7 in Table 10 | $Sn_{60}Co_{30.2}Ni_{9.9}$ | 280 |

TABLE 12-continued

| | Element composition ratio of alloy powder | Maximum electrode capacity per unit weight for the electrode material layer (mAh/g) |
|---|---|---|
| No. 8 in Table 10 | $Sn_{60.4}Co_{30.4}Cu_{9.2}$ | 420 |
| No. 9 in Table 10 | $Sn_{59.9}Co_{30.1}Ti_{10}$ | 470 |
| No. 10 in Table 10 | $Sn_{62.1}Co_{31.3}Zr_{6.6}$ | 410 |
| No. 11 in Table 10 | $Sn_{62.1}Co_{30.2}Nb_{9.8}$ | 470 |
| No. 12 in Table 10 | $Sn_{60.4}Co_{30.4}Mo_{9.2}$ | 470 |
| No. 13 in Table 10 | $Sn_{59.9}Co_{30.2}Ag_{9.9}$ | 440 |
| — | $Sn_{59.9}Co_{30.2}C_{9.9}$ | 550 |
| No. 15 in Table 11 (Example 16) | $Sn_{46.8}Co_{23.6}Si_{29.7}$ | 700 |

The theoretical capacity of a graphite which is used as the anode material of a commercial lithium ion battery is about 372 mAh/g and the capacity per unit weight for the electrode material layer comprising said graphite is about 300 mAh/g. In comparison with this, it is understood that the capacities of the alloy materials of the present invention excluding the alloy material No. 7 in Table 10 are surpassingly high.

Figure 37:
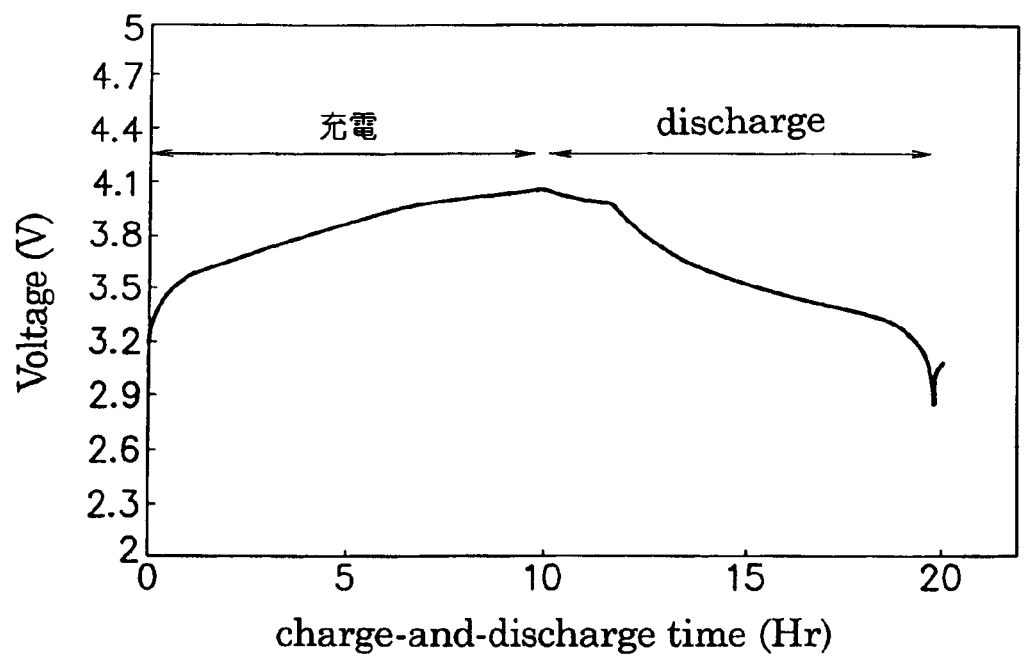
FIG. 37 is a graph showing a charge-and-discharge curve of a rechargeable battery having an anode comprising a No. 1 material shown in Table 10 (which will be later described) of Example 16 which will be later described.
Figure 38:
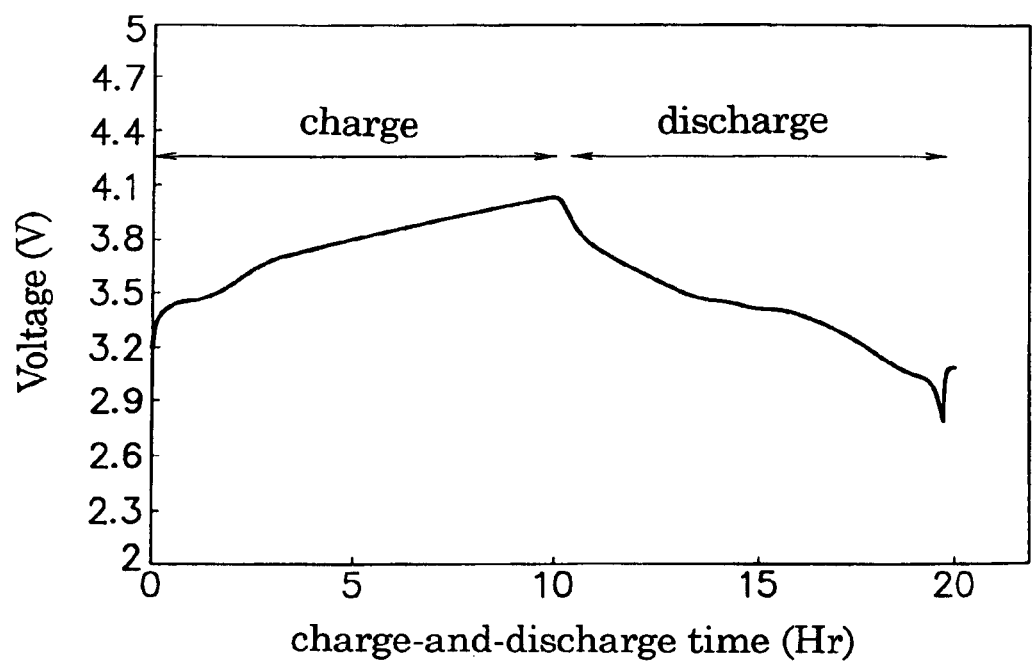
FIG. 38 is a graph showing a charge-and-discharge curve of a rechargeable battery having an anode comprising a No. 2 material shown in Table 10 (which will be later described) of Example 16 which will be later described.
Figure 39:
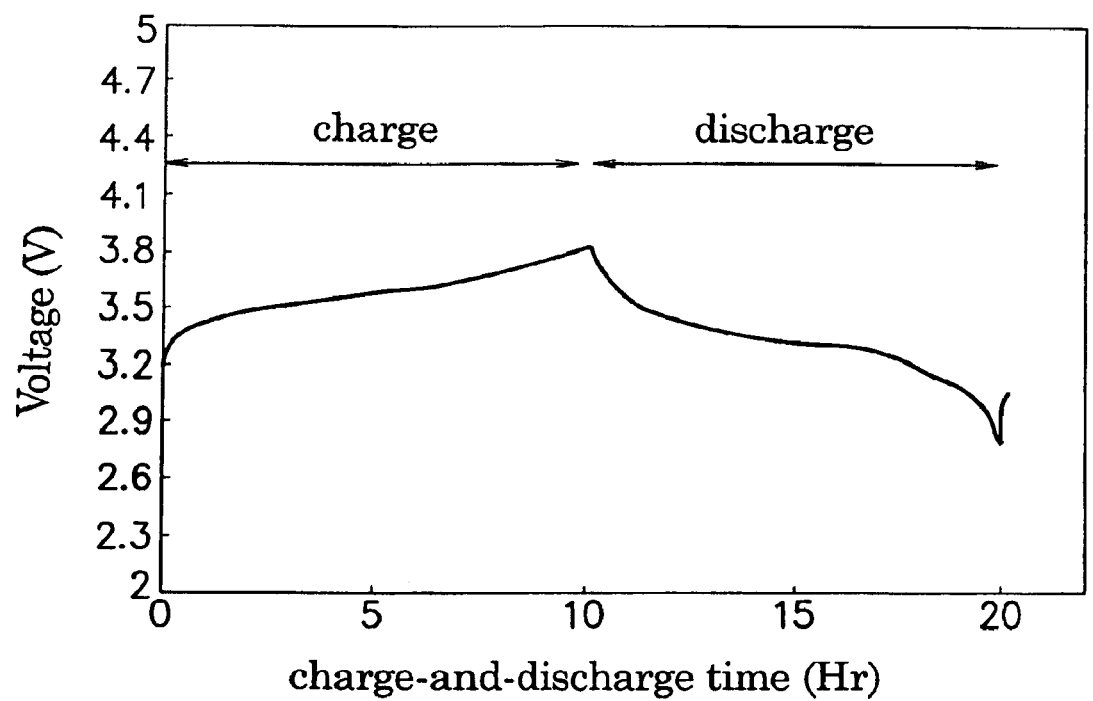
FIG. 39 is a graph showing a charge-and-discharge curve of a rechargeable battery in Example 2 which will be later described.

For reference, there are shown a charge-and-discharge curve for the rechargeable battery in which the alloy material No. 1 in Table 10 was used in FIG. 37, a charge-and-discharge curve for the rechargeable battery in which the alloy material No. 2 in Table 1.0 was used in FIG. 38, and a charge-and-discharge curve for the rechargeable battery of Example 2 in FIG. 39.

Figure 40:
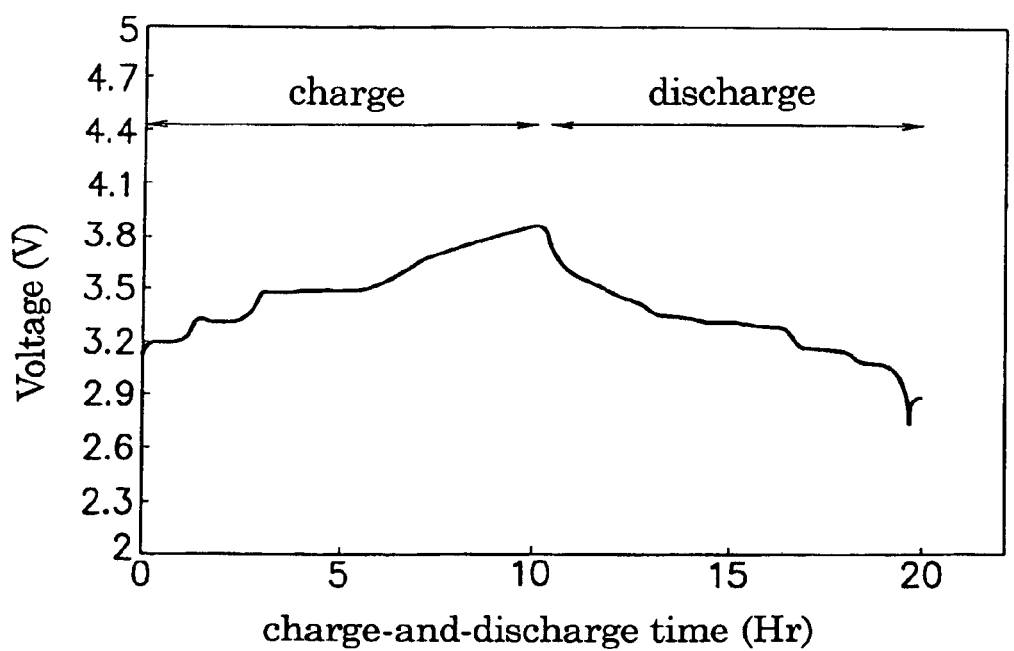
FIG. 40 is a graph showing a charge-and-discharge curve of a rechargeable battery in Reference Example 6 which will be later described.

In addition, in FIG. 40, there is shown a charge-and-discharge curve for a rechargeable battery having an anode comprising a metallic tin electrode formed on a copper foil by way of electroplating, as Reference Example 6. Particularly, the metallic tin electrode was prepared in a manner as will be described below.

It is understood that any of the rechargeable batteries of the present invention exhibits a smoother charge-and-discharge curve in comparison with that exhibited by the rechargeable battery whose anode comprising the electroplated metallic tin electrode.

[Preparation of the Electroplated Metallic Tin Electrode in Reference Example 6]

A cathode comprising a 18 μm thick copper foil having been degreased and cleaned using acetone and isopropyl alcohol and dried and an anode comprising a tin metal plate were arranged in an electrolyte solution of the following composition containing no copper sulfate so as to have an interval of 6 cm between the cathode and the anode. The temperature of the electrolyte solution was adjusted to 25° C., and while stirring the electrolyte solution, a D.C. voltage was applied between the cathode and the anode so as to make the cathode have a currenTbensity of 10 mA/cm² and the application of the D.C. voltage was terminated when the energized coulomb to the cathode reached 20 C/cm², whereby a layer 102 comprising a metallic tin material was formed on the copper foil as the cathode by way of the electroplating. In this electroplating operation, the voltage between the cathode and the anode was 1 V.

The composition of the electrolyte solution is: stannous sulfate: 40 g/l, sulfuric acid: 60 g/l, gelatin: 2 g/l, and solvent: water.

The copper foil having the metallic tin material formed thereon obtained in the above was washed with water. The copper foil thus washed was treated by immersing it in an aqueous solution containing 60 g/l of $Na_3PO_4 \cdot 12H_2O$ dissolved therein maintained at 60° C. for 60 seconds. The copper foil thus treated was washed with water, followed by subjecting to vacuum-drying at 150° C. under reduced pressure, to obtain an electrode structural body. The electroplated electrode material layer comprising the metallic tin material of the electrode structural body thus obtained was found to have a thickness of 40 μm. And the electroplated layer was found to have a X-ray diffraction peak corresponding to a metallic tin, where said peak had a narrow half width which indicates that the layer comprises a crystalline phase.

[Evaluation of Layer Expansion Due to Electrochemical Insertion and Elimination of Lithium]

The electrode structural body obtained in the above as a cathode and a lithium metal as an anode were arranged in an electrolyte solution comprising 1 M (mol/1) of lithium tetrafluoroborate ($LiBF_4$) dissolved in a mixed solvent obtained by mixing ethylene carbonate and dimethyl carbonate at a mixing ratio of 1:1, where energization was performed for 1.5 hours at a cathode current density of 2 mA/cm² to subject the cathode to alloying with lithium deposited therein (lithium insertion reaction). and thereafter, the cathode was subjected to elimination reaction of lithium (the elution of the deposited lithium) until 1.2 V (v.s. Li/Li⁺) at a cathode current density of 1 mA/cm². And for the electrode material layer of the electrode structural body, a change rate between the original thickness of the electrode material layer and the thickness of the electrode material layer after the insertion reaction and the elimination reaction was measured, and the measured change rate was evaluated as an expansion ratio of the electrode after the insertion and elimination of the lithium.

Table 13 collectively illustrate evaluated results for the electrodes prepared in the examples of the present invention with respect to change ratio of their thickness, respectively obtained in the following manner. There were prepared a plurality of cells each comprising an electrode comprising one of said electrodes, a counter electrode comprising a lithium metal, the same electrolyte solution comprising 1M $LiBF_4$/EC-DMC as used in previous example, and a separator comprising a 25 μm thick polypropylene film having a number of micropores and a 70 μm thick polypropylene nonwoven fabric. For each of the resultant cells, discharging and charging were alternately repeated, where there was measured a change ratio between the original thickness of the electrode and the thickness of the electrode after the repetition of the charging and discharging cycle as an expansion ratio. The measured expansion ratio for the respective electrodes are collectively shown in Table 13 together with the measured expansion ratio obtained in Reference Example 6, where each of the values shown is a value relative to the expansion rate in Reference Example 6, which is set at 1.0.

From the results shown in the table, it is understood that any of the electrodes each comprising the amorphous alloy powder of the present invention has a quite small expansion in the thickness direction even upon the repetition of the charging and discharging cycle.

TABLE 13

| Example/Reference Example | Ratio of expansion coefficient |
|---|---|
| No. 1 in Table 10/Reference Example 6 | 0.30 |
| Example 2/Reference Example 6 | 0.41 |
| No. 2 in Table 10/Reference Example 6 | 0.64 |
| No. 4 in Table 10/Reference Example 6 | 0.32 |
| No. 19 in Table 11/Reference Example 6 | 0.23 |
| No. 5 in Table 10/Reference Example 6 | 0.25 |
| Reference Example 3/Reference Example 6 | 0.68 |
| Example 15/Reference Example 6 | 0.35 |

As detailed in the above, according to the present invention, there is attained an electrode structural body which solves the problems in a conventional rechargeable battery in which oxidation-reduction reaction of lithium is used in that when the rechargeable battery is subjected to repetition of the charging and discharging cycle over a long period of time, the anode is expanded to deteriorate the current-collecting performance and as a result, the charging and discharging cycle life of the battery is shortened. The use of the electrode structural body makes it possible to provide a rechargeable battery having a high battery capacity and a high energy density and which has a prolonged charging and discharging cycle life and exhibits a smooth discharge curve.

What is claimed is:

1. An electrode material for an anode of a rechargeable lithium battery, containing a particulate comprising an amorphous Sn.A.X alloy with a substantially non-stoichiometric ratio composition, wherein in said formula Sn.A.X, A indicates at least one kind of an element selected from the group consisting of transition metal elements, X indicates at least one kind of an element selected from the group consisting of O, F, N, Mg, Ba, Sr, Ca, La, Ce, Si, Ge, C, P, B, Pb, Bi, Sb, Al, Ga, In, Tl, Zn, Be, Pr, Nd, Sm, Eu, Gd, Tb, Dy, Ho, Er, Tm, Yb, Lu, As, Se, Te, Li and S, where the element X is optionally present and the content of the constituent element Sn of said amorphous Sn.A.X alloy is Sn/(Sn+A+X)=20 to 80 atomic %, wherein said particulate comprising said amorphous Sn.A.X alloy has a specific surface area of more than 1 m²/g, wherein if said particulate comprising said amorphous Sn.A.X alloy contains O, then said particulate comprising said amorphous Sn.A.X alloy contains O in an amount in the range of from 0.05% by weight to 5% by weight, and wherein if said particulate comprising said amorphous Sn.A.X alloy contains F, then said particulate comprising amorphous Sn.A.X alloy contains F in an amount in the range of from 0.05% by weight to 5% by weight.

2. An electrode material for an anode according to claim 1, wherein said amorphous Sn.A.X alloy has a peak in a range of 2θ=25° to 50° in X-ray diffraction pattern obtained using a CuKα radiation source, having a half width of more than 0.2°.

3. An electrode material for an anode according to claim 1, wherein said amorphous Sn.A.X alloy has a peak in a range of 2θ=25° to 50° in X-ray diffraction pattern obtained using a CuKα radiation source, having a half width of more than 0.5°.

4. An electrode material for an anode according to claim 1, wherein said amorphous Sn.A.X alloy has a peak in a range of 2θ=25° to 50° in X-ray diffraction pattern obtained using a CuKα radiation source, having a half width of more than 1.0°.

5. An electrode material for an anode according to claim 1, wherein said amorphous Sn.A.X alloy has a peak in a range of 2θ=40° to 50° in X-ray diffraction pattern obtained using a CuKα radiation source, having a half width of more than 0.5°.

6. An electrode material for an anode according to claim 1, wherein said amorphous Sn.A.X alloy has a peak in a range of 2θ=40° to 50° in X-ray diffraction pattern obtained using a CuKα radiation source, having a half width of more than 1.0°.

7. An electrode material for an anode according to claim 1, wherein said particulate comprising said amorphous Sn.A.X alloy has a crystallite size calculated from X-ray diffraction analysis, which is less than 500 Å.

8. An electrode material for an anode according to claim 1, wherein said particulate comprising said amorphous Sn.A.X alloy has a crystallite size calculated from X-ray diffraction analysis, which is less than 200 Å.

9. An electrode material for an anode according to claim 1, wherein said particulate comprising said amorphous Sn.A.X alloy has a crystallite size calculated from X-ray diffraction analysis, which is less than 100 Å.

10. An electrode material for an anode according to claim 1, wherein said particulate comprising said amorphous Sn.A.X alloy has an average particle size in a range of from 0.5 μm to 20 μm.

11. An electrode material for an anode according to claim 1, wherein said particulate comprising said amorphous Sn.A.X alloy has an average particle size in a range of from 0.5 μm to 10 μm.

12. An electrode material for an anode according to claim 1, wherein said transition metal element comprises at least one kind of an element selected from the group consisting of Cr, Mn, Fe, Co, Ni, Cu, Mo, Tc, Ru, Rh, Pd, Ag, Ir, Pt, Au, Ti, V, Y, Sc, Zr, Nb, Hf, Ta, and W.

13. An electrode material for an anode according to claim 1, wherein said particulate comprising said amorphous Sn.A.X alloy contains said alloy in an amount of more than 30% by weight.

14. An electrode material for an anode according to claim 1, wherein said electrode material for an anode contains a binder comprising a polymer which is either water-soluble or water-insoluble.

15. An electrode material for an anode according to claim 14, wherein the amount of said binder contained is in a range of from 1% by weight to 10% by weight.

16. An electrode material for an anode according to claim 1, wherein said particulate comprising said amorphous Sn.A.X alloy contains said alloy in an amount in a range of from 80% by weight to 100% by weight.

17. An electrode material for an anode of a rechargeable lithium battery, containing a particulate comprising an amorphous Sn.A.X alloy with a substantially non-stoichiometric ratio composition, wherein in said formula Sn.A.X, A indicates at least one kind of an element selected from the group consisting of transition metal elements, and X indicates at least one kind of an element selected from the group consisting of O, F, N, Mg, Ba, Sr, Ca, La, Ce, Si, Ge, C, P, B, Pb, Bi, Sb, Al, Ga, In, Tl, Zn, Be, Pr, Nd, Sm, Eu, Gd, Tb, Dy, Ho, Er, Tm, Yb, Lu, As, Se, Te, Li and S, where the element X is optionally present and the content of the constituent element Sn of said amorphous Sn.A.X alloy is Sn/(Sn+A+X)=20 to 80 atomic %, wherein said particulate comprising said amorphous Sn.A.X alloy contains C, and said particulate comprising said amorphous Sn.A.X alloy has a specific surface area of more than 1 m²/g, wherein if said particulate comprising said amorphous Sn.A.X alloy contains O, then said particulate comprising said amorphous Sn.A.X alloy contains O in an amount in the range of from 0.05% by weight to 5% by weight, and wherein if said particulate comprising said amorphous Sn.A.X alloy contains F, then said particulate comprising amorphous Sn.A.X alloy contains F in an amount in the range of from 0.05% by weight to 5% by weight.

18. An electrode material for an anode of a rechargeable lithium battery, containing a particulate comprising an amorphous Sn.A.X alloy with a substantially non-stoichiometric ratio composition, wherein in said formula Sn.A.X, A indicates at least one kind of a element selected from the group consisting of transition metal elements, and X indicates at least one kind of an element selected from a group (a) consisting of Pb, Bi, Al, Ga, In, Tl, Zn, Be, Mg, Ca, and Sr; a group (b) consisting of rare earth elements; and a group (c) consisting of metalloide elements, wherein said group (b) consisting of rare earth elements consists of La, Ce, Pr, Nd, Sm, Eu, Gd, Tb, Dy, Ho, Er, Tm, Yb, and Lu, and said group (c) consisting of metalloide elements consists of B, C, Si, P, Ge, As, Se, Sb, and Te, where the content of the constituent element Sn of the amorphous Sn.A.X alloy is Sn/(Sn+A+X)=20 to 80 atomic % and said particulate comprising said amorphous Sn.A.X has a specific surface area of more than 1 m²/g.

19. An electrode material for an anode according to claim 18, wherein said amorphous Sn.A.X alloy contains two kinds of elements selected from said group (a), said group (b), and said group (c).

20. An electrode material for an anode according to claim 18, wherein said amorphous Sn.A.X alloy contains three kinds of elements selected from said group (a), said group (b), and said group (c).

21. An electrode material for an anode of a rechargeable lithium battery, containing a particulate comprising an amorphous Sn.A.X alloy with a substantially non-stoichiometric ratio composition, wherein in said formula Sn.A.X, A indicates at least one kind of an element selected from the group consisting of transition metal elements, and X indicates one kind of an element selected from the group consisting of Pb, Bi, Al, Ga, In, T, Zn, Be, Mg, Ca, and Sr and one kind of an element selected from the group consisting of rare earth elements, wherein said group consisting of rare earth elements consists of La, Ce, Pr, Nd, Sm, Eu, Gd, Tb, Dy, Ho, Er, Tm, Yb, and Lu, and wherein the content of the constituent element Sn of said amorphous Sn.A.X alloy is Sn/(Sn+A+X)=20 to 80 atomic %.

22. An electrode material for an anode of a rechargeable lithium battery, containing a particulate comprising an amorphous Sn.A.X alloy with a substantially non-stoichiometric ratio composition, wherein in said amorphous Sn.A.X, A indicates at least one kind of a element selected from the group consisting transition elements, and X indicates one kind of an element selected from the group consisting of Pb, Bi, Al, Ga, In, Tl, Zn, Be, Mg, Ca, and Sr and one kind of an element selected a group consisting of metalloide elements in X, wherein said group consisting of metalloide elements consists of B, C, Si, P, Ge, As, Se, Sb, and Te, and wherein the content of the constituent element Sn of said amorphous Sn.A.X alloy is Sn/(Sn+A+X)=20 to 80 atomic %, and said particulate comprising said amorphous Sn.A.X alloy has a specific surface area of more than 1 m$^2$/g.

23. An electrode material for an anode of a rechargeable lithium battery, containing a particulate comprising an amorphous Sn.A.X alloy with a substantially non-stoichiometric ratio composition, wherein in said formula Sn.A.X, A indicates at least one kind of an element selected from the group consisting of transition metal elements, and X indicates at least one kind of an element selected from the group consisting of metalloide elements and one kind of an element selected from the group consisting of rare earth elements, wherein said group consisting of rare earth elements consists of La, Ce, Pr, Nd, Sm, Eu, Gd, Tb, Dy, Ho, Er, Tm, Yb, and Lu, and said group consisting of metalloide elements consists of B, C, Si, P, Ge, As, Se, Sb, and Te, and wherein the content of the constituent element Sn of said amorphous Sn.A.X alloy is Sn/(Sn+A+X)=20 to 80 atomic %.

24. An electrode material for an anode of a rechargeable lithium battery, containing a particulate comprising an amorphous Sn.A.X alloy with a substantially non-stoichiometric ratio composition, wherein in said formula Sn.A.X, A comprises one kind of an element selected from the group consisting of Co, Ni, Fe, Cr, and Cu, and X comprises one kind of an element selected from the group consisting of Si, Ge, Al, Zn, Ca, La, and Mg, and wherein the content of the constituent element Sn of said amorphous Sn.A.X alloy is Sn/(Sn+A+X)=20 to 80 atomic %.

25. An electrode material for an anode according to claim 24, wherein said amorphous Sn.A.X alloy further contains one kind of an element selected from the group consisting of C, B, and P.

26. An electrode material for an anode according to any of claims 21, 23, 24 and 25, wherein said particulate comprising said amorphous Sn.A.X alloy has a specific surface area of more than 1 m$^2$/g.

27. An electrode material for an anode according to any of claims 1, 17, 18, 21, 22, 23, 24 and 25, wherein said particulate comprising said amorphous Sn.A.X alloy has a specific surface area of more than 5 m$^2$/g.

28. An electrode material for an anode according to any of claims 1, 17, 18, 21, 22, 23, 24 and 25, wherein said amorphous Sn.A.X alloy contains Li in an amount in a range of from 2 atomic % to 30 atomic %.

29. An electrode material for an anode of a rechargeable lithium battery, containing a particulate comprising an amorphous Sn.A.X alloy with a substantially non-stoichiometric ratio composition, wherein in said formula Sn.A.X, A indicates at least one kind of an element selected from the group consisting of transition metal elements, X indicates at least one kind of an element selected from the group consisting of O, F, N, Mg, Ba, Sr, Ca, La, Ce, Si, Ge, C, P, B, Pb, Bi, Sb, Al, Ga, In, Tl, Zn, Be, Pr, Nd, Sm, Eu, Gd, Tb, Dy, Ho, Er, Tm, Yb, Lu, As, Se, Te, Li and S, where the element X is optionally present and the content of the constituent element Sn of said amorphous Sn.A.X alloy is Sn/(Sn+A+X)=20 to 80 atomic %, wherein said amorphous Sn.A.X alloy contains at least one kind of an element selected from the group consisting of N and S in an amount in a range of from 1 atomic % to 30 atomic %, wherein if said particulate comprising said amorphous Sn.A.X alloy contains O, then said particulate comprising said amorphous Sn.A.X alloy contains O in an amount in the range of from 0.05% by weight to 5% by weight, and wherein if said particulate comprising said amorphous Sn.A.X alloy contains F, then said particulate comprising amorphous Sn.A.X alloy contains F in an amount in the range of from 0.05% by weight to 5% by weight.

30. An electrode material for an anode according to claim 29, wherein said particulate comprising said amorphous Sn.A.X alloy has a specific surface area of more than 1 m$^2$/g.

31. An electrode material for an anode according to claim 29, wherein said particulate comprising said amorphous Sn.A.X alloy has a specific surface area of more than 5 m$^2$/g.

32. An electrode material for an anode according to claim 29, wherein said amorphous Sn.A.X alloy contains Li in an amount in a range of from 2 atomic % to 30 atomic %.

33. An electrode structural body comprising said electrode material for an anode according to any of claims 1, 17, 18, 21, 22, 23, 24, 25, and 29 and a collector comprising a material incapable of being alloyed with lithium in electrochemical reaction.

34. An electrode structural body according to claim 33, wherein the amount of said particulate comprising said amorphous Sn.A.X alloy in said electrode structural body is at least 25% by weight.

35. An electrode structural body according to claim 33, wherein said particulate comprising said amorphous Sn.A.X alloy in said electrode structural body contains at least 30% by weight of said amorphous Sn.A.X alloy.

36. An electrode structural body according to claim 33, wherein said electrode structural body has an electrode material layer comprising said electrode material for an anode and a binder on said collector.

37. An electrode structural body according to claim 36, wherein said binder comprises a polymer which is either water-soluble or water-insoluble.

38. A rechargeable lithium battery having an anode, an electrolyte, and a cathode and in which oxidation-reduction reaction of lithium is used, characterized in that said anode comprises said electrode structural body defined in claim 33.

39. A rechargeable lithium battery according to claim 38, wherein said cathode comprises a lithium element-containing material having a function of deintercalating lithium ion and intercalating said lithium ion in charge-and-discharge reaction.

40. A rechargeable lithium battery according to claim 38, wherein said lithium element-containing material as the constituent material of said cathode contains an amorphous phase.

41. A rechargeable lithium battery according to claim 38, wherein said lithium element-containing material as the constituent material of said cathode contains a metal oxide material containing an amorphous phase.

42. A process for producing an electrode structural body for a rechargeable lithium battery, said process comprises a step of arranging said electrode material for an anode according to any of claims 1, 17, 18, 21, 22, 23, 24, 25, and 29 on a collector.

43. A process for producing an electrode structural body for a rechargeable lithium battery according to claim 42, wherein said step includes a step of arranging said particulate comprising said amorphous Sn.A.X alloy on said collector by way of press forming.

44. A process for producing an electrode structural body for a rechargeable lithium battery according to claim 42, wherein said step includes a step of preparing a paste material by mixing said particulate comprising said amorphous Sn.A.X alloy with a binder and arranging said paste material on said collector.

45. A process for producing an electrode structural body for a rechargeable lithium battery according to claim 44, wherein a binder comprising a water-soluble polymer material is used as said binder.

46. A process for producing a rechargeable lithium battery having an anode, an electrolyte, and a cathode and in which oxidation-reduction reaction of lithium is used, said process comprising a step of forming said anode by arranging said electrode material for an anode according to any of claims 1, 17, 18, 21, 22, 23, 24, 25, and 29 on a collector.

47. A process for producing a rechargeable lithium battery according to claim 46, wherein said step of forming said anode includes a step of arranging said particulate comprising said amorphous Sn.A.X alloy on said collector by way of press forming.

48. A process for producing a rechargeable lithium battery according to claim 46, wherein said step of forming said anode includes a step of preparing a paste material by mixing said particulate comprising said amorphous Sn.A.X alloy with a binder and arranging said paste material on said collector.

49. A process for producing a rechargeable lithium battery according to claim 48, wherein a binder comprising a water-soluble polymer material is used as said binder.

50. An electrode material for an anode according to any of claims 17, 18, 21, 22, 23, 24, 25, and 29, wherein said amorphous Sn.A.X alloy has a peak in a range of $2\theta=25°$ to $50°$ in X-ray diffraction pattern obtained using a CuKα radiation source, having a half width of more than $0.2°$.

51. An electrode material for an anode according to any of claims 17, 18, 21, 22, 23, 24, 25 and 29, wherein said amorphous Sn.A.X alloy has a peak in a range of $2\theta=25°$ to $50°$ in X-ray diffraction pattern obtained using a CuKα radiation source, having a half width of more than $0.5°$.

52. An electrode material for an anode according to any of claims 17, 18, 21, 22, 23, 24, 25 and 29, wherein said amorphous Sn.A.X alloy has a peak in a range of $2\theta=25°$ to $50°$ in X-ray diffraction pattern obtained using a CuKα radiation source, having a half width of more than $1.0°$.

53. An electrode material for an anode according to any of claims 17, 18, 21, 22, 23, 24, 25 and 29, wherein said amorphous Sn.A.X alloy has a peak in a range of $2\theta=40°$ to $50°$ in X-ray diffraction pattern obtained using a CuKα radiation source, having a half width of more than $0.5°$.

54. An electrode material for an anode according to any of claims 17, 18, 21, 22, 23, 24, 25 and 29, wherein said amorphous Sn.A.X alloy has a peak in a range of $2\theta=40°$ to $50°$ in X-ray diffraction pattern obtained using a CuKα radiation source, having a half width of more than $1.0°$.

55. An electrode material for an anode according to any of claims 17, 18, 21, 22, 23, 24, 25 and 29, wherein said particulate comprising said amorphous Sn.A.X alloy has a crystallite size calculated from X-ray diffraction analysis, which is less than 500 Å.

56. An electrode material for an anode according to any of claims 17, 18, 21, 22, 23, 24, 25 and 29, wherein said particulate comprising said amorphous Sn.A.X alloy has a crystallite size calculated from X-ray diffraction analysis, which is less than 200 Å.

57. An electrode material for an anode according to any of claims 17, 18, 21, 22, 23, 24, 25 and 29, wherein said particulate comprising said amorphous Sn.A.X alloy has a crystallite size calculated from X-ray diffraction analysis, which is less than 100 Å.

58. An electrode material for an anode according to any of claims 17, 18, 21, 22, 23, 24, 25 and 29, wherein said particulate comprising said amorphous Sn.A.X alloy has an average particle size in a range of from 0.5 µm to 20 µm.

59. An electrode material for an anode according to any of claims 17, 18, 21, 22, 23, 24, 25 and 29, wherein said particulate comprising said amorphous Sn.A.X alloy has an average particle size in a range of from 0.5 µm to 10 µm.

60. An electrode material for an anode according to any of claims 17, 18, 21, 22, 23, 24, 25 and 29, wherein said particulate comprising said amorphous Sn.A.X alloy contains said alloy in an amount of more than 30% by weight.

61. An electrode material for an anode according to any of claims 17, 18, 21, 22, 23, 24, 25 and 29, wherein said electrode material for an anode contains a binder comprising a polymer which is either water-soluble or water-insoluble.

62. An electrode material for an anode according to claim 61, wherein the amount of said binder contained is in a range of from 1% by weight to 10% by weight.

63. An electrode material for an anode according to any of claims 17, 18, 21, 22, 23, 24, 25 and 29, wherein said particulate comprising said amorphous Sn.A.X alloy contains said alloy in an amount in a range of from 80% by weight to 100% by weight.

* * * * *

UNITED STATES PATENT AND TRADEMARK OFFICE
CERTIFICATE OF CORRECTION

PATENT NO. : 6,949,312 B1
APPLICATION NO. : 09/554794
DATED : September 27, 2005
INVENTOR(S) : Soichiro Kawakami et al.

It is certified that error appears in the above-identified patent and that said Letters Patent is hereby corrected as shown below:

COLUMN 1
Line 63, "has" should read --has been--.

COLUMN 2
Line 31, "practicalloy" should read --practically--; and
Line 34, "generalloy" should read --generally--.

COLUMN 3
Line 26, "used" should read --used for--;
Line 31, "respect" should read --respect to--; and
Line 60, "coase-grained" should read --coarse-grained--.

COLUMN 6
Line 42, "1 C" should read --1C--.

COLUMN 8
Line 23, "Al." should read --Al,--.

COLUMN 9
Line 2, "allow" should read --alloy--.

COLUMN 16
Line 28, "mixed" should read --mixed to--.

COLUMN 17
Line 25, "In" should read --in--.

COLUMN 19
Line 16, "described" should read --described,--; and
Line 49, "different" should read --different from--.

COLUMN 21
Line 21, "never" should read --never been--.

COLUMN 25
Line 63, "takes" should read --take--.

COLUMN 32
Line 53, "previous" should read --previously in--.

UNITED STATES PATENT AND TRADEMARK OFFICE
CERTIFICATE OF CORRECTION

PATENT NO. : 6,949,312 B1
APPLICATION NO. : 09/554794
DATED : September 27, 2005
INVENTOR(S) : Soichiro Kawakami et al.

It is certified that error appears in the above-identified patent and that said Letters Patent is hereby corrected as shown below:

COLUMN 34
Line 46, "previous" should read --previously in--.

COLUMN 35
Line 64, "Example" should read --Example 11.--.

COLUMN 38
Line 58, "For the reason of this," should read --For this reason,--.

COLUMN 40
Line 52, "because" should read --because of--.

COLUMN 43
Line 25, "currenTbensity" should read --current density--; and
Line 59, "reaction)." should read --reaction),--.

COLUMN 46
Line 38 (Claim 18, Line 5), "a" should read --an--.

COLUMN 47
Line 11 (Claim 22, Line 5), "a element" should read --an element--; and
Line 15 (Claim 22, Line 9), "selected " should read --selected from--.

Signed and Sealed this

First Day of August, 2006

JON W. DUDAS
*Director of the United States Patent and Trademark Office*